United States Patent [19]
Yamada et al.

[11] Patent Number: 5,609,652
[45] Date of Patent: Mar. 11, 1997

[54] METHOD OF MANUFACTURING A SYNTHETIC RESIN PART INTEGRALLY FORMED WITH METAL MEMBERS

[75] Inventors: Atsushi Yamada; Tadayuki Okuda; Masaki Hagiwara; Yoshihide Yoshida, all of Shimizu, Japan

[73] Assignee: Koito Manufacturing Co., Ltd., Tokyo, Japan

[21] Appl. No.: 418,410

[22] Filed: Apr. 7, 1995

[30] Foreign Application Priority Data

Apr. 13, 1994 [JP] Japan .................................. 6-097880
Mar. 16, 1995 [JP] Japan .................................. 7-084896

[51] Int. Cl.[6] .................................................. B29C 45/14
[52] U.S. Cl. .......................... 29/882; 29/856; 29/883; 29/884; 29/527.1; 29/411; 264/104; 264/157; 264/272.11; 264/328.8
[58] Field of Search ........................... 264/157, 104, 264/272.16, 272.11, 271.1, 328.8, 328.12; 29/827, 856, 883–4

[56] References Cited

U.S. PATENT DOCUMENTS

| | | | |
|---|---|---|---|
| 4,075,395 | 2/1978 | Ohnishi | 264/331.22 |
| 4,174,864 | 11/1979 | Viertel et al. . | |
| 4,227,242 | 10/1980 | Marcus . | |
| 4,364,597 | 12/1982 | Viertel et al. . | |
| 4,591,956 | 5/1986 | Majchrzak . | |
| 4,675,989 | 6/1987 | Galloway et al. | 264/272.16 |
| 4,683,522 | 7/1987 | Viertel et al. . | |
| 4,760,503 | 7/1988 | Vandenberge et al. | 362/137 |
| 4,764,852 | 8/1988 | Sakuma . | |
| 4,859,632 | 8/1989 | Lumbard | 264/272.11 |
| 5,003,438 | 3/1991 | Yoshida . | |
| 5,022,699 | 6/1991 | Yoshida . | |
| 5,029,052 | 7/1991 | Sakuma et al. . | |
| 5,062,818 | 11/1991 | Wasimoto et al. | 264/272.16 |
| 5,117,337 | 5/1992 | Sakuma . | |
| 5,184,888 | 2/1993 | Sakuma et al. | 362/136 |
| 5,207,501 | 5/1993 | Sakuma et al. . | |
| 5,413,743 | 5/1995 | Prophet | 264/328.8 |

FOREIGN PATENT DOCUMENTS

| | | | |
|---|---|---|---|
| 2520884A1 | 11/1976 | Germany . | |
| 3808795A1 | 9/1988 | Germany . | |
| 3924176C2 | 12/1990 | Germany . | |
| 4303761A1 | 8/1993 | Germany . | |
| 55-103923 | 8/1980 | Japan | 264/272.11 |
| 59-52632 | 3/1984 | Japan | 264/157 |
| 64-48387 | 2/1989 | Japan | 264/272.11 |
| 4-339614 | 11/1992 | Japan | 264/328.8 |

OTHER PUBLICATIONS

"Manufacturing Processes" by Myron L. Bergman and B. H. Amstead; Published in 1972; pp. 131, 148–151.

*Primary Examiner*—Jeffery R. Thurlow
*Attorney, Agent, or Firm*—Koda and Androlia

[57] ABSTRACT

Disclosed are a method of manufacturing a synthetic resin part integrally formed with metal members, including the steps of: integrally forming a plurality of metal member sets through coupling portions, each of the metal member sets including a plurality of coupled together metal members; inserting the metal member sets into the molding dies of a forming machine; injecting synthetic resin for molding into the molding die, and forming a synthetic resin part integrally formed with metal members in sequence to form a synthetic resin part continuum where a plurality of synthetic resin parts are connected; and cutting off the coupling portions to manufacture the plurality of synthetic resin parts, and a synthetic resin part manufactured according to the above-mentioned manufacturing method. With this manufacturing method, the assembling accuracy of the synthetic resin part to metal members is enhanced, there is no danger of unnecessary contact between metal members, and the time for assembling metal members is saved to contribute to cost reduction.

9 Claims, 44 Drawing Sheets

METHOD OF MANUFACTURING A SYNTHETIC RESIN PART INTEGRALLY FORMED WITH METAL MEMBERS

BACKGROUND OF THE INVENTION

1. Field of the Invention

The present invention relates to a synthetic resin part integrally formed with metal members and to a method of manufacturing a synthetic resin part integrally formed with metal members. More particularly, the invention relates to a synthetic resin part integrally formed with metal members and method of manufacturing a synthetic resin part integrally formed with metal members, in which the a sembling accuracy of the synthetic resin part to metal members is enhanced, there is no danger of unnecessary contact between metal members, and the time for assembling metal members is saved to contribute to cost reduction.

2. Description of the Related Art

A conventional lamp body for lamps, which is mounted in a room lamp or vanity mirror provided in the interior of an automobile, is shown in FIGS. 61 and 62, for example. The lamp body shown in FIGS. 62 and 63 is that used for vanity mirrors.

In the figures, reference character "a" denotes a lamp body in the form of a frame with a high height, which is mounted in an opening portion formed near a mirror mounting portion of a mirror body (not shown).

Metal fittings "b" and "c" for holding a bulb are fixed on the rear surface of the lamp body "a", and a bulb "f" is held in the holding pieces "d" and "e" of the metal fittings "b" and "c".

Reference character "g" denotes a switch, from which a terminal piece "h" projects. A contact portion "i" provided in the metal fitting "b" is in contact with a terminal (not shown) exposed to the lower surface of a box body "j" of the switch "g". If an operating rod "k" of the switch "g" is pushed, within the box body "j" of the switch "g" the terminal piece "h" will come into contact with the terminal (not shown) that the contact portion "i" is in contact with.

A terminal piece "1" of the metal fitting "c" and the terminal piece "h" of the switch "g" project into a bore "m" formed in the lamp body "a". This bore "m" and two terminal pieces "h" and "1" forms a connector "n".

When the vanity mirror (not shown) is attached to the sun visor (not shown), a connector provided on the distal end of a wire harness extending from the sun visor side is connected to the above-described connector "n", and the bulb "f" is connected through the switch "g" with a power supply on the frame side of the automobile.

In the above-described conventional lamp body "a", the metal fittings "b", "c" and switch "g" formed individually must be assembled into the lamp body "a" separately, so that the time for assembling becomes longer and cumbersome, and costs are increased.

In addition, since the metal fittings "b", "c" and the switch "g" are assembled into the lamp body "a" one by one, accuracy in assembling between the metal fittings "b", "c" and the switch "g" is difficult to obtain and, in some cases, there is an danger of short-circuit.

SUMMARY OF THE INVENTION

A synthetic resin part integrally formed with metal members and a method of manufacturing a synthetic resin part integrally formed with metal members have been provided according to the present invention to solve the above-described problems.

More specifically, it is a first object of the present invention to provide a synthetic resin part integrally formed with metal members in which a plurality of synthetic resin parts integrally formed by forming by insert molding each of a plurality of metal member sets each comprising a plurality of kinds of metal members integrally formed through coupling portions, are formed by cutting off said coupling portions.

It is a second object of the present invention to provide a method of manufacturing a synthetic resin part integrally formed with metal members which comprises the steps of: integrally forming a plurality of metal member sets through coupling portions, each of the metal member sets comprising a plurality of kinds of metal members; inserting the metal member sets into the molding dies of a forming machine; injecting synthetic resin for molding into the molding die, and forming a synthetic resin part integrally formed with metal members in sequence to form synthetic resin part continuum where a plurality of synthetic resin parts are connected; and cutting off the coupling portions to manufacture the plurality of synthetic resin parts.

In the synthetic resin part according to the present invention, since a plurality kinds of metal members to be assembled are formed as a synthetic resin part by insert molding, the time and cumbersome work required for individually assembling a plurality kinds of metal members into a synthetic resin part can be saved and cost reduction can be realized. Also, since each metal material are assembled by insert molding, the assembling accuracy between metal members is improved. Further, since unnecessary portions of each metal are covered with resin, there is no possibility that unnecessary contact occurs between metal members.

In the method according to the present invention, a plurality of metal member sets are integrally formed through coupling portions. The metal member sets are inserted into the molding dies of a forming machine, synthetic resin for molding is injected into the molding die, and a synthetic resin part integrally formed with metal members is formed in sequence to form a synthetic resin part continuum where a plurality of synthetic resin parts are connected. The coupling portions are then cut off to manufacture the plurality of synthetic resin parts. Accordingly, a synthetic resin part integrally formed with metal members can be manufactured with a high degree of efficiency, costs can be reduced, and the assembling accuracy between metal members can be improved.

BRIEF DESCRIPTION OF THE DRAWINGS

The above and other objects and advantages of the present invention will become apparent from the following detailed description when read in conjunction with the accompanying drawings.

FIG. 1 is a front elevational view, partly cut away, showing the synthetic resin part assembled into a vanity mirror attached to a sun visor;

FIG. 2 is an enlarged sectional view taken substantially along the line 2—2 of FIG. 1;

FIG. 3 is an enlarged sectional view taken substantially along the line 3—3 of FIG. 1;

FIG. 4 is a perspective view of the lamp body of FIG. 1;

FIG. 5 is a front elevational view of the lamp body of FIG. 1;

FIG. 6 is a sectional view taken substantially along the line 6—6 of FIG. 5;

FIG. 7 is a side view of the lamp body of FIG. 1;

FIG. 8 is an enlarged sectional view taken substantially along the line 8—8 of FIG. 5;

FIG. 9 is an enlarged sectional view taken substantially along the line 9—9 of FIG. 5;

FIG. 10 is an enlarged perspective view of the essential components in the first embodiment of FIG. 1;

FIG. 11 shows, together with FIGS. 12 through 15, the essential steps in a method of manufacturing a synthetic resin part integrally formed with metal members, and is a perspective view showing a material for manufacturing a metal member set continuum;

FIG. 12 is a perspective view showing a prototype metal member set continuum formed by cutting unnecessary portions out of the material of FIG. 11;

FIG. 13 is an enlarged front elevational view, partly cut away, showing the prototype metal member set continuum;

FIG. 14 is a perspective view showing a metal member set continuum formed by bending the prototype metal member set continuum;

FIG. 15 is a perspective view showing a lamp body continuum formed by inserting the metal member set continuum into a forming machine;

DETAILED DESCRIPTION OF THE PREFERRED EMBODIMENTS

The present invention will hereinafter be described based on preferred embodiments in which the details of a synthetic resin part integrally formed with metal members and of a method of manufacturing a synthetic resin part integrally formed with metal members are shown.

FIGS. 1 through 15 show a first embodiment of the present invention. The present invention is applied to a lamp body for vanity mirrors and a manufacturing method thereof.

First, a description will be given of a lamp body for vanity mirrors and then a manufacturing method thereof will follow.

Figure 1:
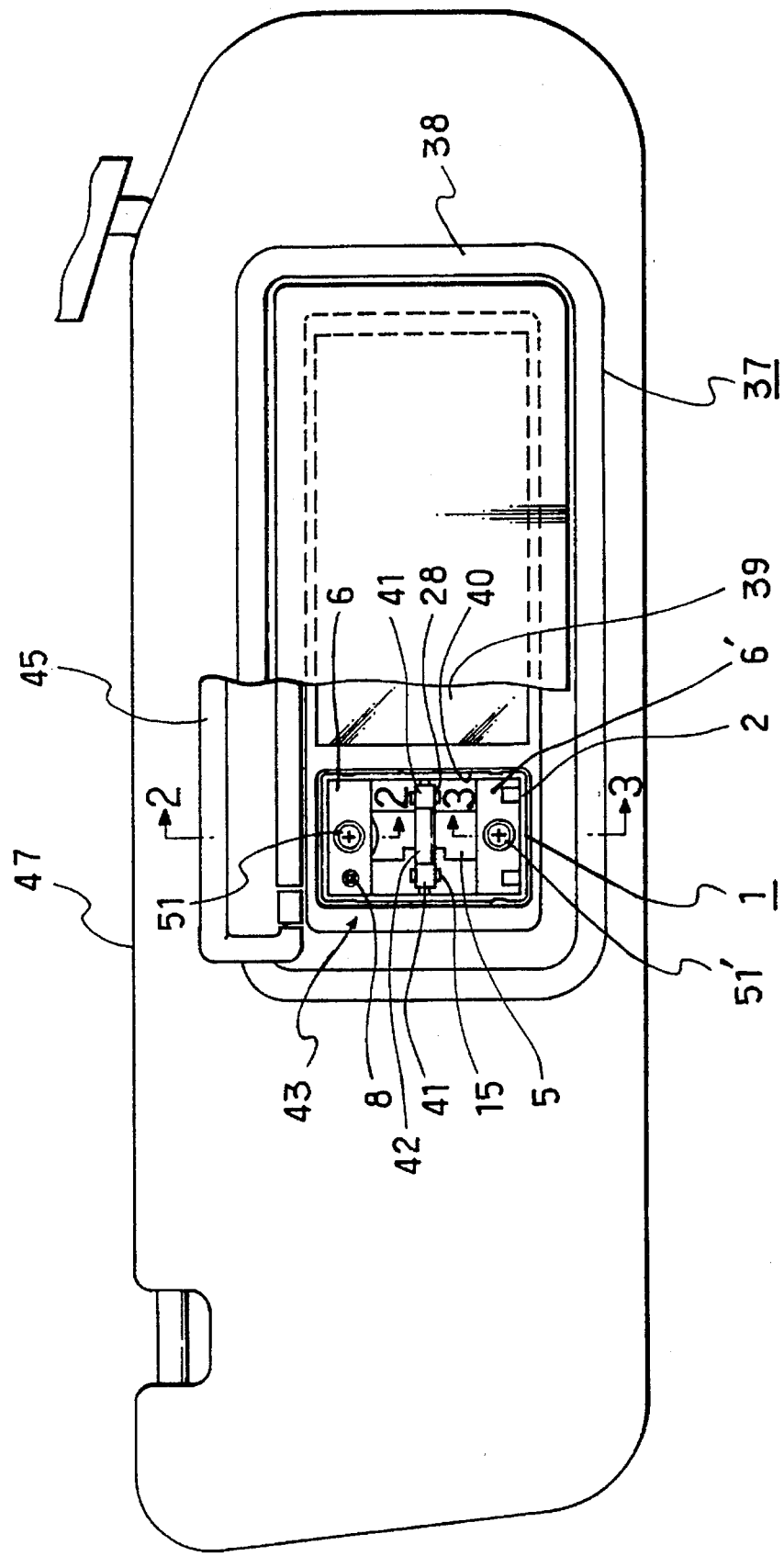
FIGS. 1 to 15 show a first embodiment of the invention in which a synthetic resin part integrally formed with metal members is applied to a lamp body for vanity mirrors and manufacturing method thereof.

In FIG. 1, reference numeral 1 denotes a lamp body for vanity mirrors. The lamp body 1 comprises a main body 2 made of a synthetic resin, and contacts 3, 4, and 5 assembled into the main body 2 by so-called insert molding.

The main body 2 is made of a synthetic resin, such as ABS resin, and formed into a shallow and flat box shape which is opened at its front surface and which, when looking at the front, is a vertically elongated rectangle.

At the upper and lower end portions of the inner bottom surface of the main body 2, there are formed rest portions 6 and 6' which project slightly forward. At the substantially central portions of the rest portions 6 and 6', there are formed through openings 7 and 7'. At a position closer to the left end of the upper rest portion 6, there is a cut-out bore 8.

Figure 4:
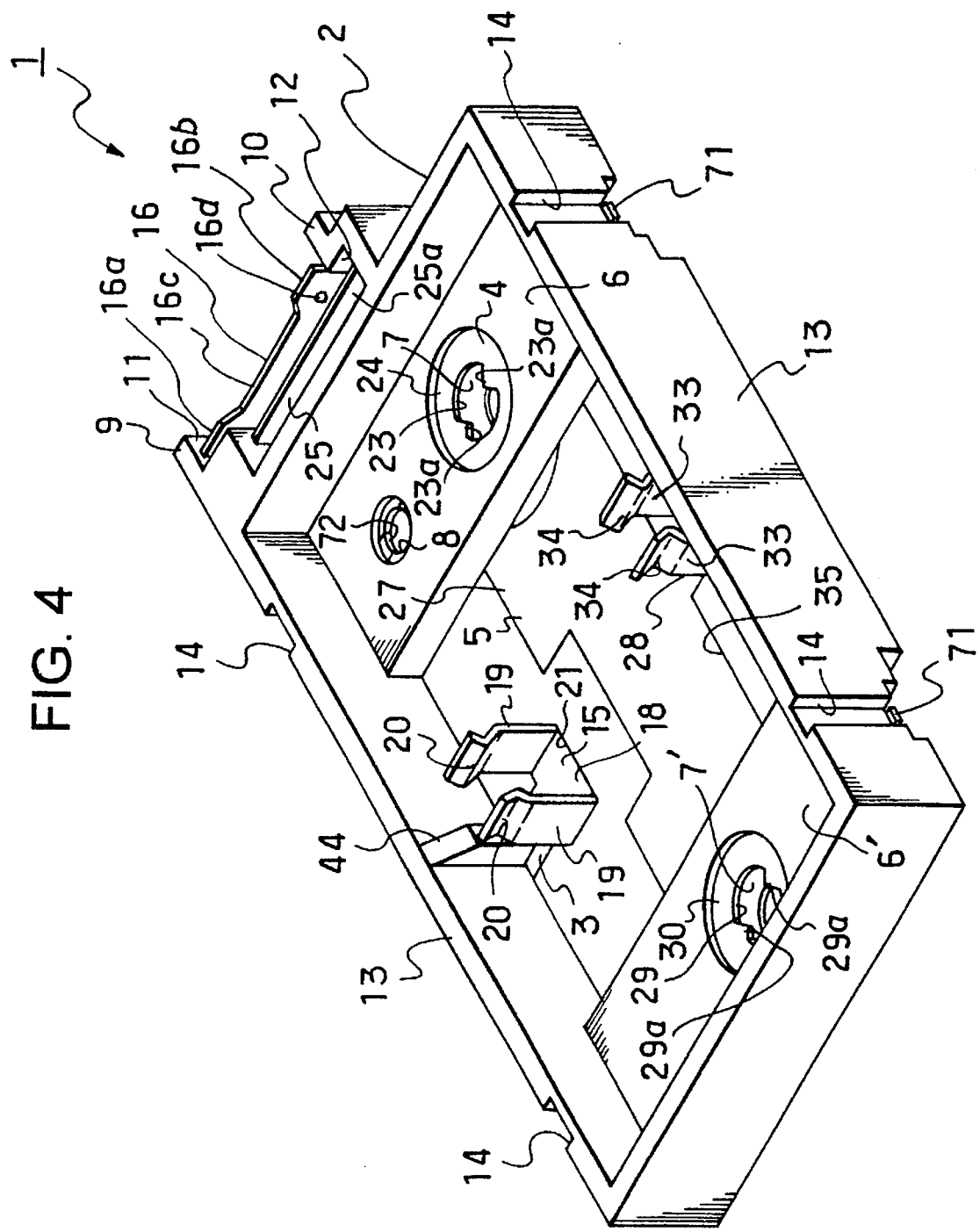
Figure 5:
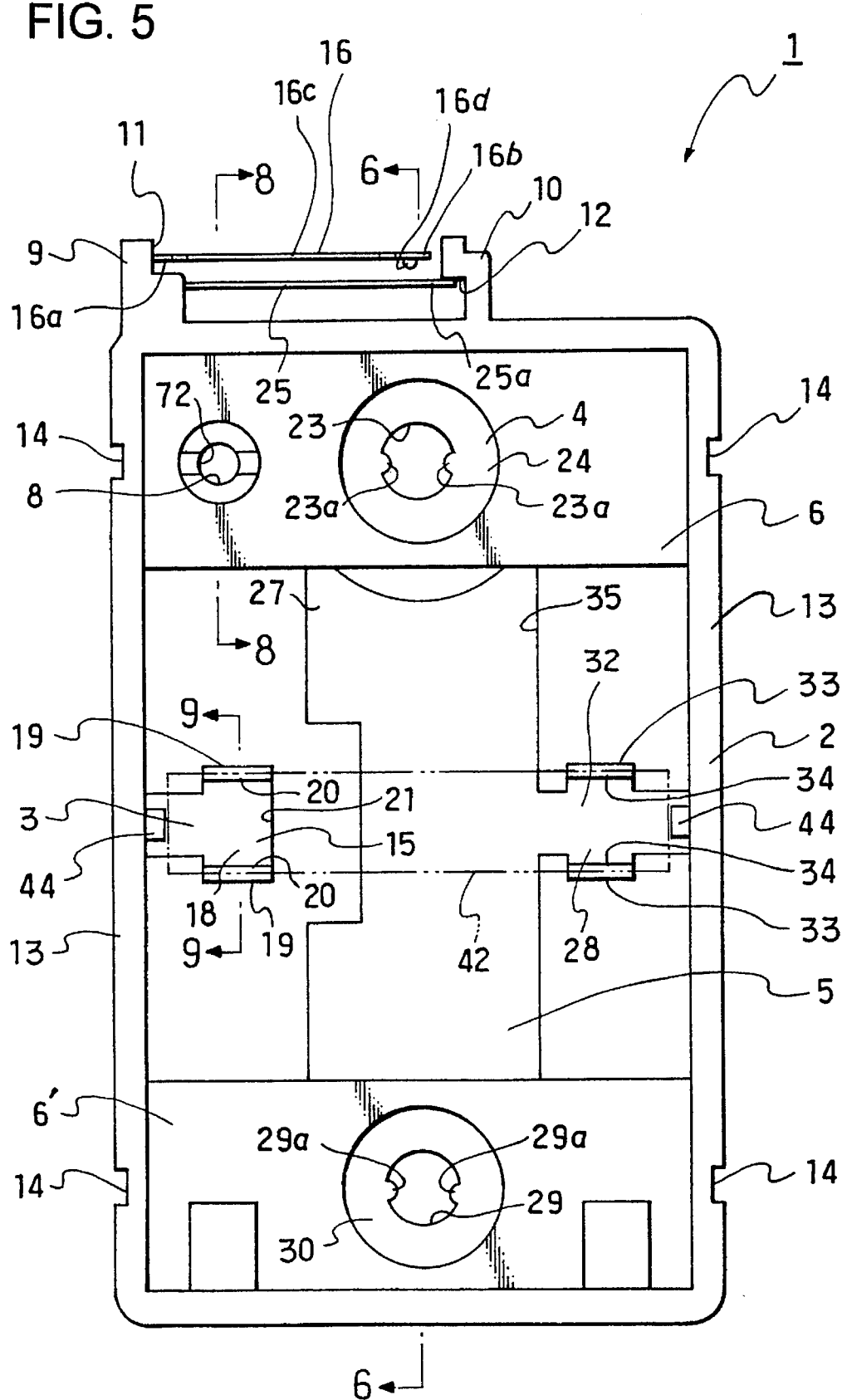

As shown in FIG. 4, a left projection 9 extends upwardly from the upper left end of the main body 2, and a right projection 10 extends upwardly from a position which is to the right of the central portion of the main body 2. The upper end of the right surface of the left projection 9 is formed with an L-shaped notch portion 11, while the upper end portion of the right projection 10 is bent into an L shape to form a lower engagement surface 12.

The left side wall 13 of the main body 2 is formed at upper and lower end portions with groove portions 14 and 14 extending therethrough in the fore-and-aft direction of the main body 2. Likewise, the right side wall 13 of the main body 2 is formed at upper and lower end portions with groove portions 14 and 14 extending therethrough in the fore-and-aft direction of the main body 2.

The contacts 3, 4, and 5 are formed of a metal material having electrical conductivity and elasticity, such as stainless steel (SUS 304, for example), but they may be formed of brass or phosphor bronze to increase conductivity or durability.

The contact 3 is integrally formed with a mouthpiece holder 15, an upper terminal piece 16, and a connection portion 17 (FIG. 10) connecting the holder 15 and the upper terminal piece 16. The mouthpiece holder 15 consists of a base portion 18 and snap pieces 19 and 19 rising from the upper and lower ends of the base portion 18. The snap pieces 19 and 19 are formed at the upper ends with fastening portions 20 and 20 which are so curved as to become close to each other.

The space between the distal ends of the snap pieces 19 and 19 is less than the vertical width of the base portion 18. The proximal ends 19' and 19' of the snap pieces 19 and 19 rising from the base portion 18 are formed into a so-called R-surface shape with a curve, not right angles.

The connection portion 17 of the contact 3 is buried in the bottom portion of the left side wall 13 of the main body 2, and the mouthpiece holder 15 is disposed in a shallow recess portion 21 formed in the right end portion of the vertically central portion of the inner bottom surface of the main body 2. The upper terminal piece 16 extends from the right surface of the notch 11 of the left projection 9 toward the right direction with the surface of the piece 16 held in the up-and-down direction of the main body 2. The right end of the upper terminal piece 16 is located near the left surface of the upper portion of the right projection 10.

It should be noted that the intermediate portion 16c of the upper terminal piece 16 is reduced in width, as compared with the proximal end portion 16a and the distal end portion 16b. Also, the distal end portion 16b is formed at its lower surface with a downward projection 16d.

Figure 10:
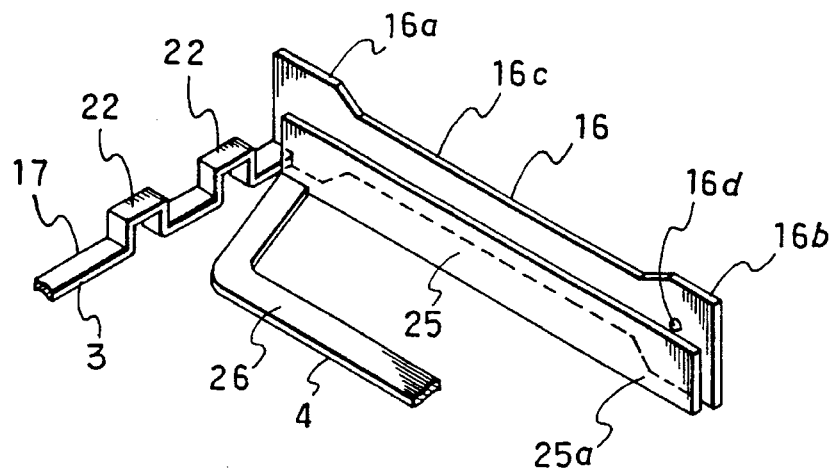
Figure 11:
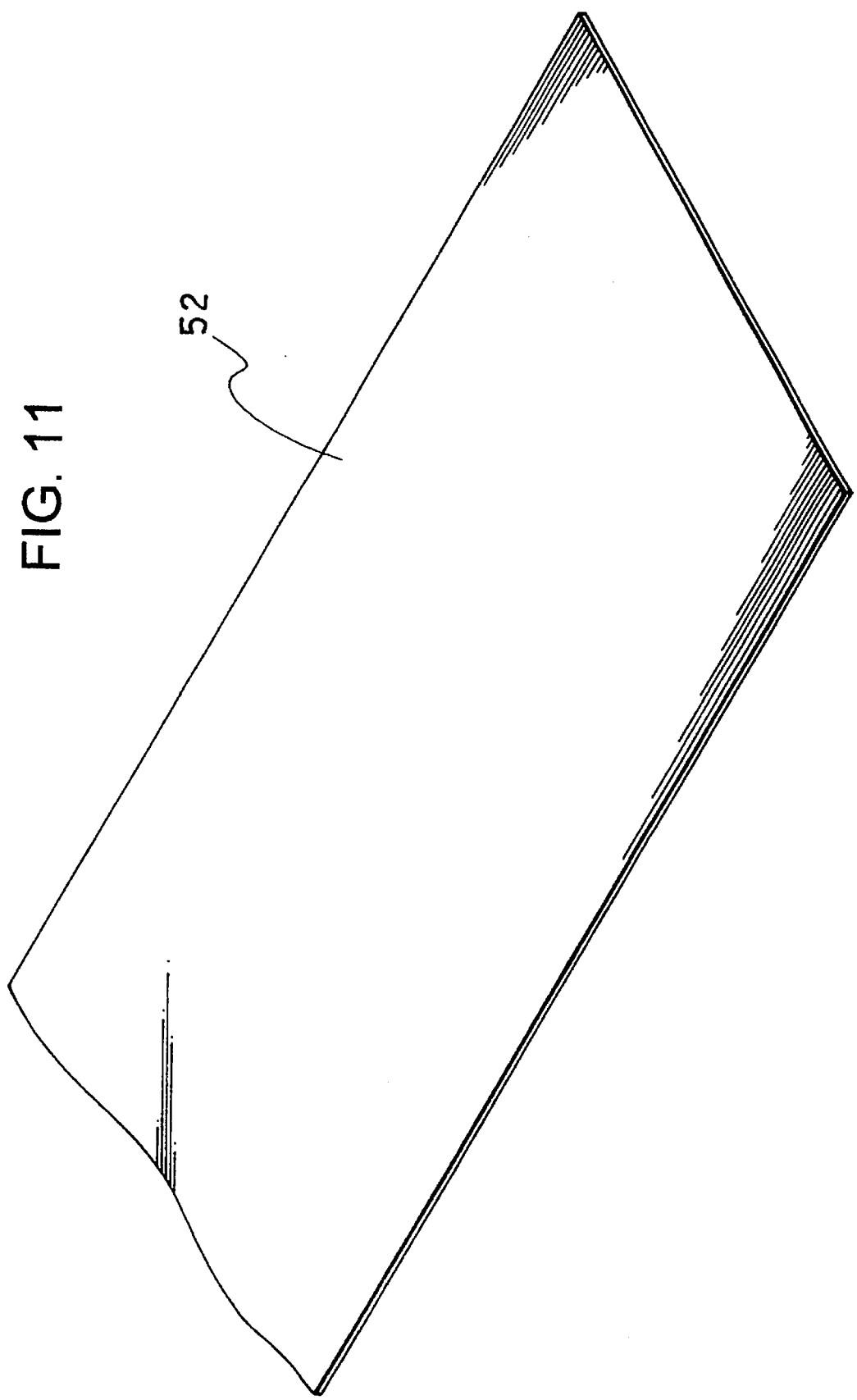
Figure 12:
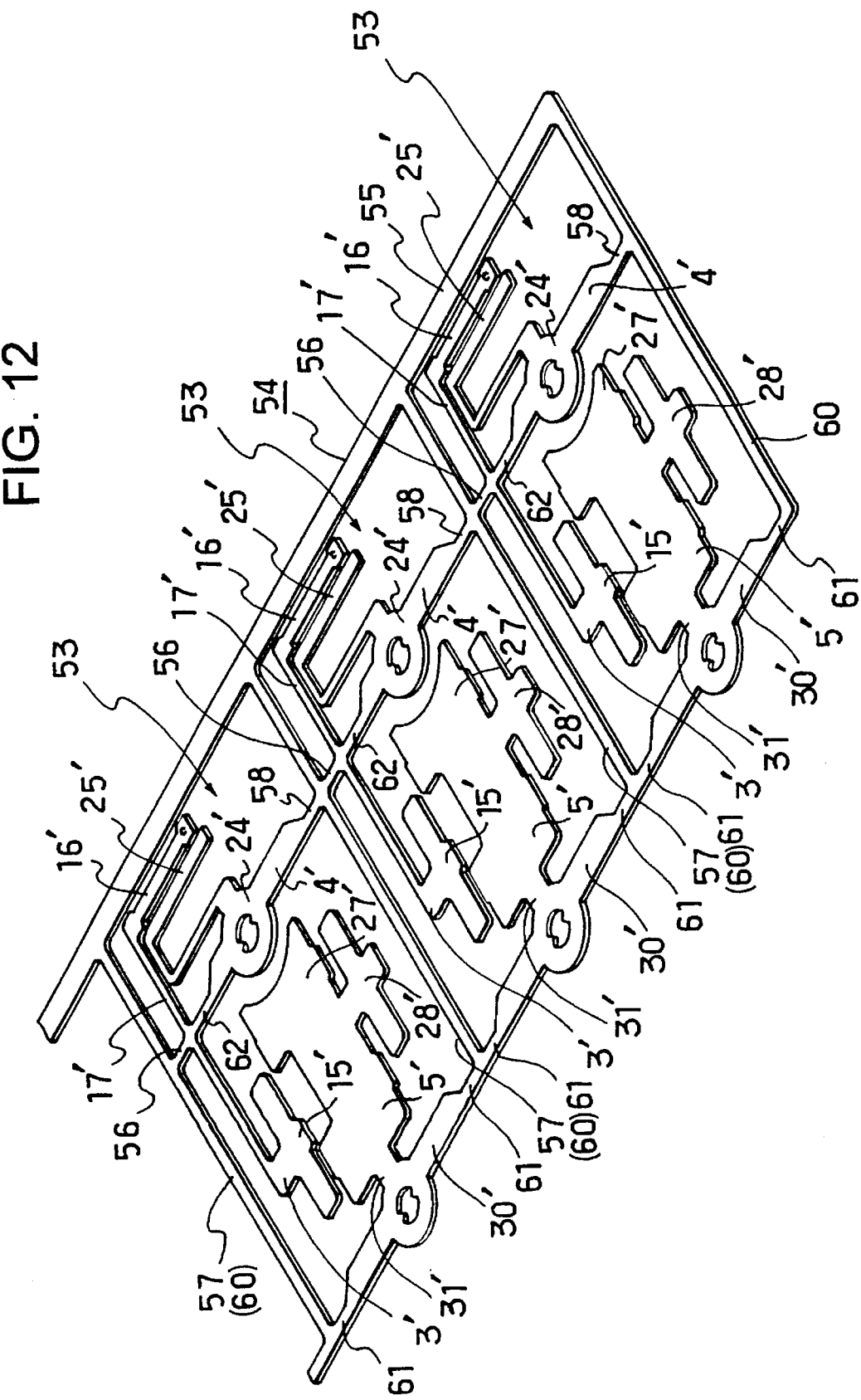

The upper end portion of the connection portion 17 adjacent to the upper terminal piece 16 is formed with bent portions 22 and 22 (FIG. 10). With this arrangement, the upper terminal piece 16 can be displaced slightly downward.

The contact 4 is integrally formed with a main portion 24 formed with a connection bore 23, a lower terminal piece 25, and a connection portion 26. Two opposed engagement projections 23a and 23a are formed on the margin of the connection bore 23 of the main portion 24. The connection portion 26 is formed into a low L-shape (FIG. 10) when viewed from the front side, and extends between the upper margin of the central portion of the main portion 24 and the left end of the lower terminal piece 25. Also, the lower terminal piece 25 is upwardly bent at the proximal portion thereof with respect to the connection portion 26 so that the surface of the piece 25 is directed in the up-and- down direction of the main body 2.

Figure 2:
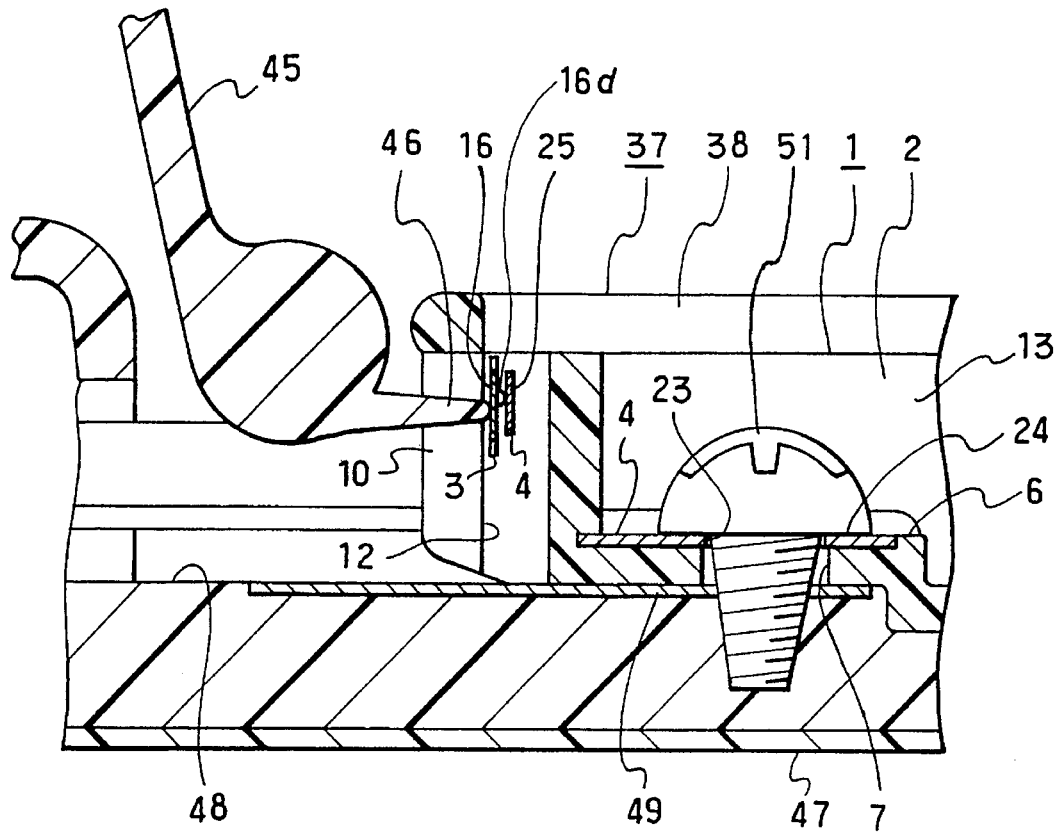

For the above-described contact 4, the main portion 24 except the peripheral portion of the connection bore 23 is buried in the upper rest portion 6 of the main body 2, and the connection bore 23 is aligned with the through bore 7 (FIG. 2). Note that the bore diameter of the connection bore 23 is slightly smaller than that of the through bore 7, and the bore margin of the connection bore 23 is located inside the bore margin of the through bore 7, when it is viewed in the fore-and-aft direction of the main body 2.

The connection portion 26 is buried in the upper rest portion 6, and the lower terminal piece 25 extends from a position just under the notch 11 of the left projection 9 toward the right direction. The lower terminal piece 25 is opposed in parallel with the lower surface of the upper terminal piece 16 of the above-described contact 3 to constitute the opening and closing contact portion of a switch.

Thus, by constituting the opening and closing contact portion of a switch by the respective terminal pieces 16 and 25 of the contacts 3 and 4, the separate switch part g found in the prior art can be omitted, thereby the time needed for assembling a switch part such as this can be saved and the production cost reduced.

In addition, the distal end 25a of the lower terminal piece 25 is located below the engagement surface 12 of the right projection 10 and limited to move upward by the engagement surface 12. With this arrangement, a predetermined clearance can be provided between the terminal pieces 16 and 25 so that they can be prevented from short-circuiting.

The contact 5 is integrally formed with a main portion 27 in the form of a substantially rectangular shape extending in the up-and-down direction of the main body 2, a mouthpiece holder 28 extending from the nearly central portion of the right edge of the main portion 27, and a connection piece portion 30 continuous to the lower end of the main portion 27 and having a connection bore 29 at its central portion.

Figure 3:
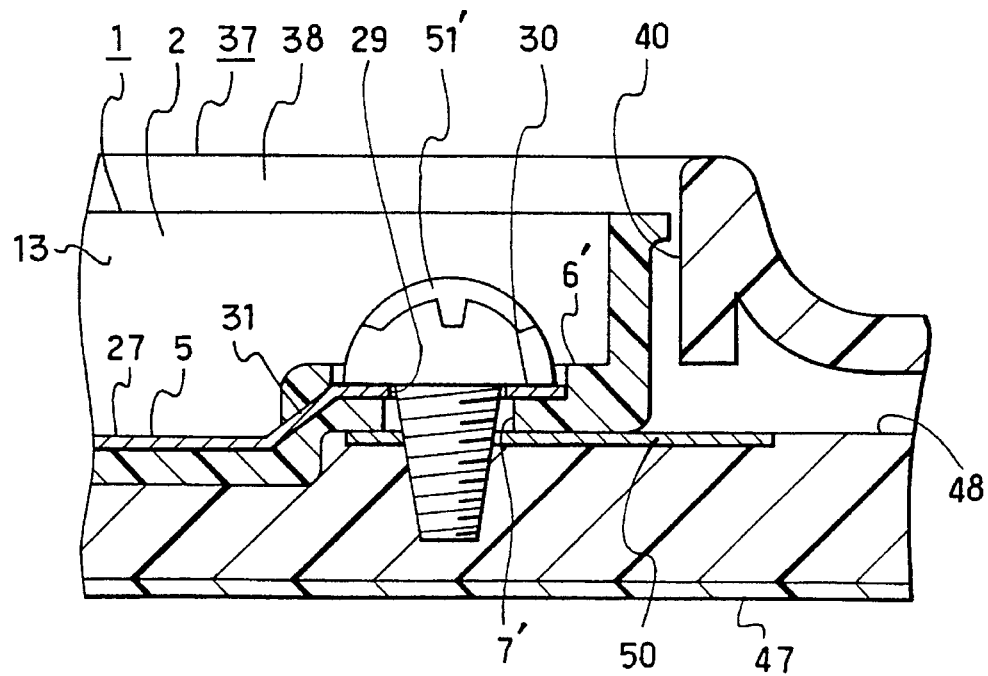

The connection piece portion 30 and the main portion 27 are connected by a connection portion 31 (FIG. 3). The connection portion 31 obliquely extends so that the connection piece portion 30 is located at a position slightly higher than the main portion 27, i.e., to the front side.

The mouthpiece holder 28 consists of a base portion 32 and snap pieces 33 and 33 rising from the upper and lower ends of the base portion 32. The snap pieces 33 and 33 are formed at the upper ends with fastening portions 34 and 34 which are so curved to become close to each other.

The space between the distal ends of the snap pieces 33 and 33 is less than the vertical width of the base portion 32. The proximal ends 33' and 33' of the snap pieces 33 and 33 rising from the base portion 32 are formed into a so-called R-surface shape with a curve, not right angles.

Two opposed engagement projections 29a and 29a are formed on the margin of the connection bore 29 of the connection piece portion 30.

For the above-described contact 5, the main portion 27 and the mouthpiece 28 are located in a shallow recess portion 35 formed in the inner bottom surface of the main body 2. The connection piece portion 30 except the peripheral portion of the connection bore 29 is buried in the lower rest portion 6' of the main body 2, and the connection bore 29 is aligned with the through bore 7' (FIG. 3) at the front side thereof. Note that the bore diameter of the connection bore 29 is slightly smaller than that of the through bore 7', and the bore margin of the connection bore 29 is located inside the bore margin of the through bore 7', when it is viewed in the fore-and-aft direction of the main body 2.

Reference numeral 36 (FIG. 6) denotes a small bore formed in the substantially central portion of the bottom wall of the main body 2. The small bore 36 is formed correspondingly to the substantially central portion of the main portion 27 of the contact 5.

Reference numeral 37 denotes a vanity mirror, 38 a body of the mirror, 39 a mirror attached to the body 38, and 40 a recess portion formed at the side of the mirror 39.

The above-described lamp body 1 for vanity mirrors is fixedly fitted in the recess portion 40. A tubular bulb 42 is firmly held at the mouthpieces 41 and 41 thereof by the snap pieces 19 and 19 of the mouthpiece holder 15 and the snap pieces 39 and 39 of the mouthpiece holder 28 and disposed in the lamp body 1. The front opening of the lamp body 1 is covered by a lens body (not shown), thereby constituting a lamp 43.

Reference numerals 44 and 44 (FIG. 5) denote bulb stoppers projecting from a position of the left side wall 13 of the main body 2 corresponding to the center between the snap pieces 19 and 19 of the mouthpiece holder 15 and from a position of the right side wall 13 of the main body 2 corresponding to the center between the snap pieces 33 and 33 of the mouthpiece holder 28, respectively. The bulb stoppers 44 and 44 are brought into contact with the end faces of the mouthpieces 41 and 41 of the tubular bulb 42 or located near the end faces so that unnecessary movement of the tubular bulb 42 can be limited to prevent failure such as a short circuit.

Reference numeral 45 denotes a cover, which is rotatably supported on the body 38 to open and close the front surface of the mirror 39 and lamp 43. If that cover 45 is opened, an actuating projection 46 (FIG. 2) will push the distal end 16a of the upper terminal 16 of the contact 3 from upward and the distal end 16a will be bent downward, so that the upper terminal piece 16 is brought into contact with the lower terminal piece 25 and power is supplied to the tubular bulb 41.

Since the intermediate portion 16c of the upper terminal piece 16 is reduced in width as compared with the proximal and distal end portions 16a and 16b, as described above, local stress concentration can be avoided when the upper terminal piece 16 is bent by the actuating projection 46 and the durability of the terminal piece 16 can be increased.

In addition, since the distal end portion 16b of the upper terminal piece 16 is formed with the projection 16d downwardly projecting toward the lower terminal piece 25, the upper and lower terminal pieces 16 and 25 can reliably contact with each other when the upper terminal piece 16 is bent toward the lower terminal piece 25, and defective contact by fluctuations in molding can be prevented.

Reference numeral 47 denotes a sun visor provided in the interior of an automobile. The sun visor 47 is formed with a recess 48 (FIG. 2) in which the vanity mirror 37 is mounted in the buried state.

In the recess 48 of the sun visor 47 there are disposed upper and lower structural members 49 and 50 having conductivity, which are respectively connected to the terminals of a power supply of an automobile. A screw 51 inserted into the connection bore 23 and the through bore 7 is screwed into the upper structural member 49 from the front side. Likewise, a screw 51' inserted into the connection bore 29 and the through bore 7' is screwed into the lower structural member 50 from the front side. The screws 51 and 51' are made of a material having conductivity, so that the contact 4 is electrically connected through the screw 51 to the upper structural member 49 and also the contact 5 is electrically connected through the screw 51' to the lower structural member 50. Therefore, if the above-described upper and lower terminal pieces 16 and 25 are in contact with each other, a closed path of power supply—structural member 49—contact 4—contact 3—one mouthpiece of tubular tube 42—another mouthpiece of tubular tube 42—contact 5—structural member 50—power supply will be formed and the tubular bulb 42 will light.

It should be noted that since the engagement projections 23a, 23a, 29a, and 29a of the connection bores 23 and 29 bite into the grooves of the screws 51 and 51' and reliably contact the contacts 4 and 5 with the screws 51 and 51' and also the bore diameters of the through bores 7 and 7' of the main body 2 are greater than those of the connection bores 23 and 29, the screws 51 and 51 would reliably be brought into contact with the opening margins of the connection bores 23 and 29 even if burr occurred on the opening margins of the through bores 7 and 7' when molding the main body 2.

Next, a description will be given of a method of manufacturing the above-described lamp body 1 for vanity mirrors.

First, a contact set continuum comprising a plurality of contact sets each including a plurality of kinds of contacts is formed.

Reference numeral 52 denotes a sheet material from which the contact set continuum is formed, such as a thin plate of SUS, brass, or phosphorus bronze, and the thickness thereof is about 0.25 mm.

The material 52 is cut by blanking to form a prototype contact set continuum 54 which comprises a plurality of prototype contact sets 53 each including prototype bodies 3', 4', and 5' which become the contacts 3, 4, and 5 of each contact set. The contact set continuum 54 has frame portions 55 for partitioning the contact sets 53. A connection portion-equivalent 17' of the prototype body 3' is connected at its substantially central portion to a left longitudinal frame 57 through a joint portion of the prototype body 3' and the left end of the main portion equivalent 24' of the prototype body 4' are connected by a joint portion 62. The contacts 3 and 4 have to be separated from each other, but if there are a few number of connection points to the frame portion 55, there will be the possibility that when blanking and bending, the contacts 3 and 4 are moved or detached from the frame portion 55. However, since the contacts 3 and 4 are connected by the joint portion 62, such possibility can be reduced.

Next, the prototype bodies 3', 4', and 5' of each prototype contact set 53 of the prototype contact set continuum 54 are bent and worked to form a contact set continuum 64 in which a plurality of contact sets 63 are continuously formed.

More particularly, for the prototype contact body 3, the mouthpiece holder equivalent 15' is bent to form the mouthpiece holder 15, the proximal portion of the terminal piece equivalent 16' is upwardly bent to form the terminal piece 16, and the connection portion equivalent 17' adjacent to the terminal piece equivalent 16' is bent to form the bent portions 22 and 22, thereby forming the connection portion 17.

For the prototype contact body 4, the proximal portion of the terminal piece equivalent 25' is upwardly bent to form the terminal piece 25.

Note that it is necessary that when the terminal pieces 16 and 25 are assembled into the main body 2, the respective surfaces of the terminal pieces be opposed and become close to each other. However, since the terminal piece equivalent 25' has a certain width in the direction away from the terminal piece equivalent 16' at the stage that the prototype contact set continuum 54 has been formed, both cannot be made close to each other. Therefore, when these equivalents are bent at the respective proximal portions thereof, there is often a great clearance between the terminal pieces 16 and 25. In such case, the bent portions 22 and 22 are formed in the connection portion 17 to regulate the clearance between the terminal pieces 16 and 17 to an appropriate range.

For the prototype contact body 5', the mouthpiece holder equivalent 28' is bent to form the mouthpiece holder 28, and the connection portion equivalent 31' is bent at the end on the side of the mouthpiece holder equivalent 28' and also at the end on the side of the connection piece equivalent 30' to provide a step portion between the mouthpiece holder equivalent 28' and the connection piece equivalent 30'.

The above-described contact set continuum 64 is inserted so that one of the contact sets 63 is positioned in the molding die for the main body of a forming machine, and a resin for the main body is injected into the molding die for the main body, so that there is formed a lamp body 1 in which the main body 2 made of the resin and the contact set 63 are integrally formed. The formation of the lamp body 1 is made in sequence for each contact set 63 of the contact set continuum 64, thereby forming a lamp body continuum 65 (FIG. 15) in which a plurality of lamp bodies 1 are continuously connected.

Note that reference numeral 66 (FIG. 6) denotes a press pin. The press pin 66 is inserted into a through bore 68 formed in one molding die 67, projects into the cavity, and pushes the rear surface of main portion 27 of the contact 5 so that the front surface of the main portion 27 is pressed against another molding die 69. Thus, the front surface of the main portion 27 of the contact 5 is pressed against another molding die 69, so that the resin for the main body 2 can reliably be prevented from flowing to the front side of the main portion 27, and the main portion 27 is exposed to the inner bottom surface of the body 1 and can function as a reflecting surface. Since the main portion 27 in the form of a large rectangle is exposed to the inner bottom surface of the body 1 in this way, the radiation of the heat of the tubular bulb 42 to the main body 2 during the time the bulb 42 lights can be prevented and therefore heat resistance of the lamp body 1 is enhanced.

The terminal piece 25 of the contact 4 is formed with the distal end portion 25a thereof contacted with the engagement surface 12 of the main body 2. Therefore, when the injection molding has been finished, the distal end portion 25a has been attached to the engagement surface 12. However, if the lamp body 1 is assembled into the vanity mirror 37 and the terminal piece 25 is bent (pushed down) once by the actuation projection 46 (FIG. 2) of the cover 45 through the terminal piece 16, then the distal end portion 25a of the terminal piece 25 will be separated from the engagement surface 12.

Figure 6:
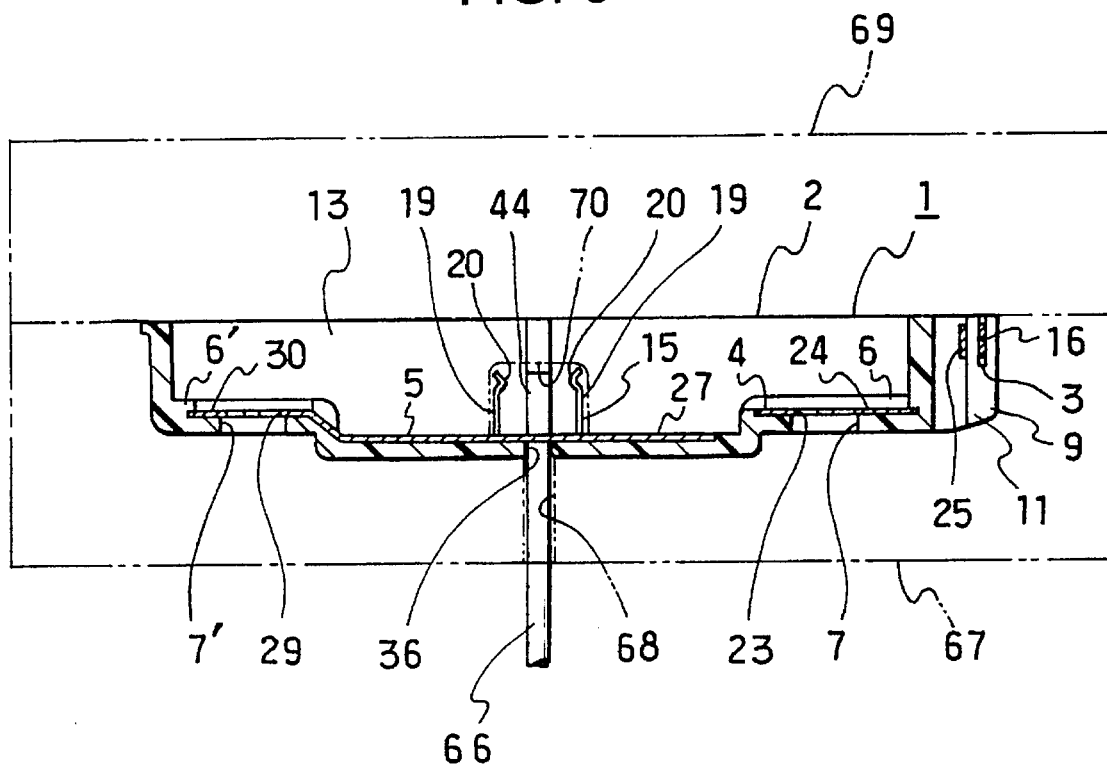
Figure 7:
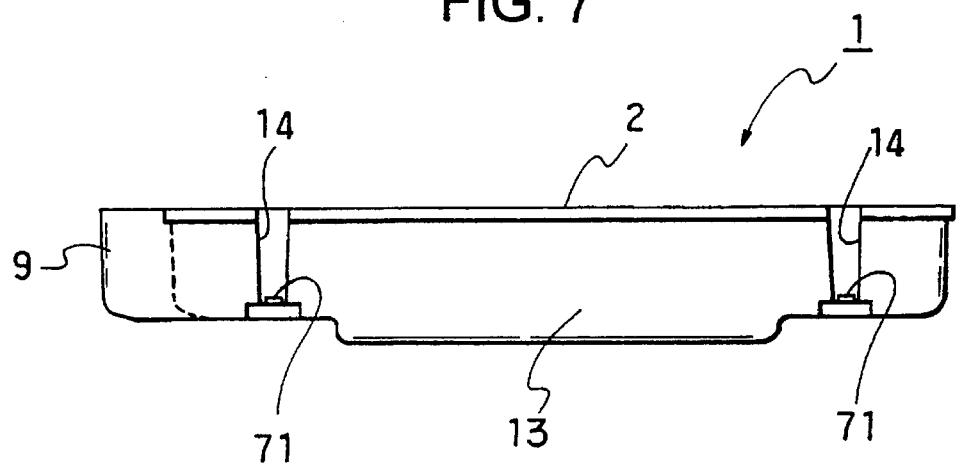
Figure 8:
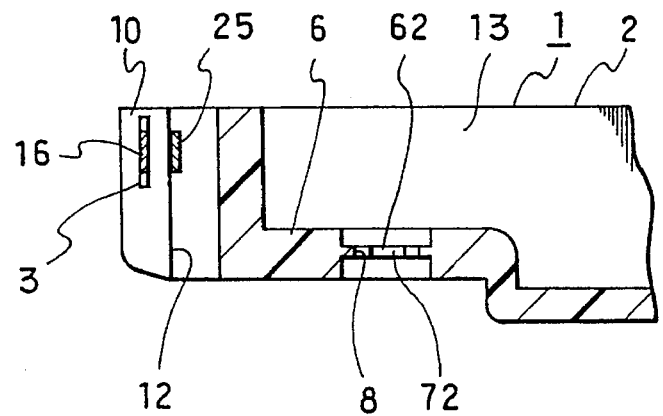
Figure 9:
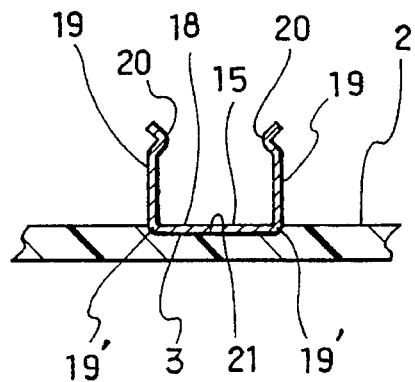

When the injection of the resin into the cavity is completed and the molding dies 69 and 67 are released, they can smoothly be released without using a slide core, since the space between the snap pieces 19 and 19 of the mouthpiece holder 15 is less than the vertical width of the base portion 18 and also the space between the snap pieces 33 and 33 of the mouthpiece holder 28 is less than the vertical width of the base portion 32. That is, if recess portions 70 and 70 (only one is shown in FIG. 6) at which the mouthpiece holders 15 and 28 are located are formed in the other molding die 69, the snap pieces 19, 19 and 33, 33 of the mouthpiece holders 15 and 28 can be removed from the recess portions 70 without getting caught on the inner surfaces of the recess portions 70 and 70.

In addition, in the mouthpiece holders 15 and 28, since the proximal portions 19', 19', 33', and 33' of the snap pieces 19, 19, 33, and 33 rising from the base portions 18 and 32 are not right angles but they are formed into a R-surface shape with a curve, formability is enhanced. That is, if these portions 19', 19', 33', and 33' are right angles, cracks will easily tend to occur in these portions by operations such as injection molding, or the attaching and detaching of a bulb, but if these portions are formed into a R-surface shape, cracks can be prevented and therefore formability can be enhanced.

And, each of the lamp bodies 1 is cut off from the lamp body continuum 65 to form a plurality of lamp bodies 1. The cutting of the lamp bodies 1 is performed at 71, 71, 71, and 71 of the joint portions 56 and 58 and the opposite ends 61 and 61 of the lower lateral frame. The cutting points 71, 71, 71, and 71 are located in the groove portions 14, 14, 14, and 14 of the side walls 13 of the main body 2 and along the inner surfaces of the groove portions. With this arrangement, the cutting becomes easy and no cut ends project from the side wall of the main body 2.

Figure 13:
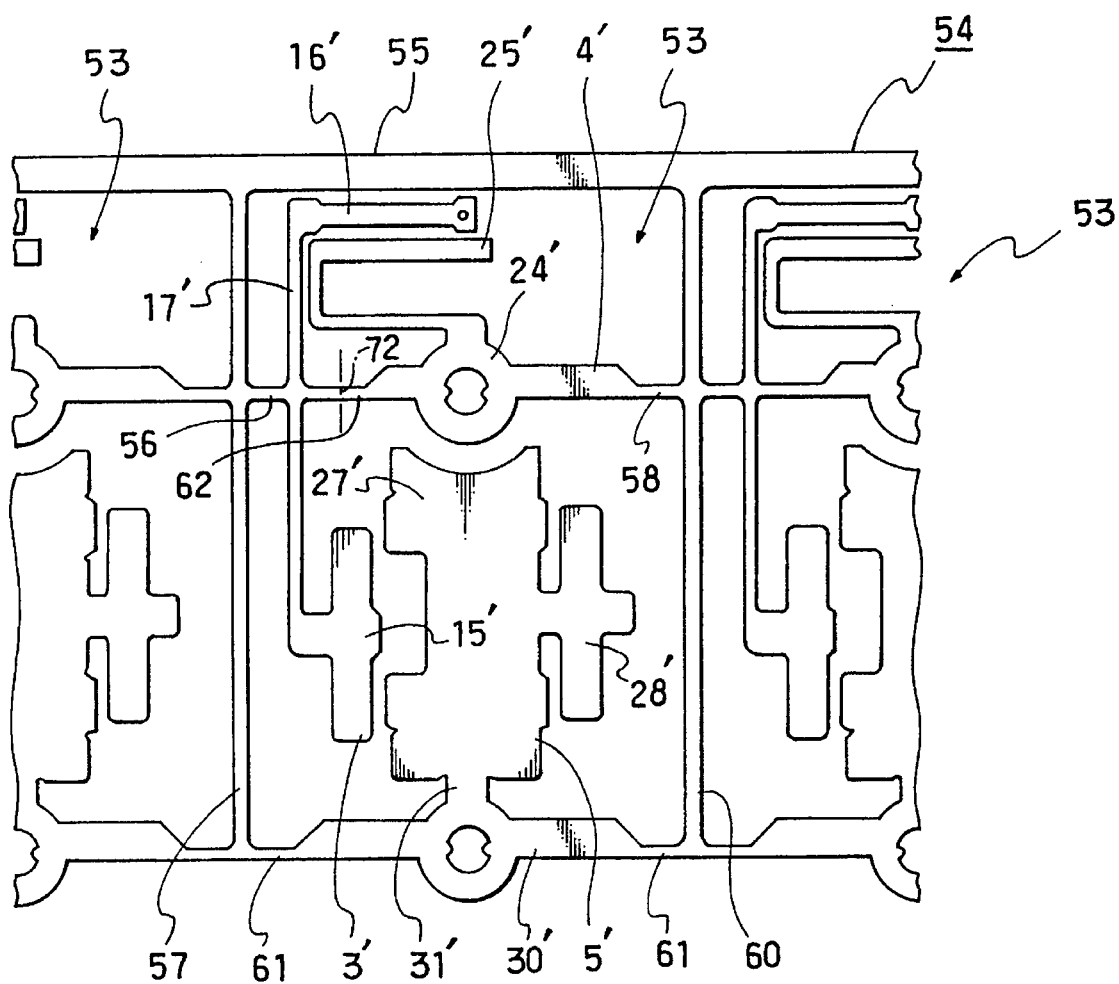
Figure 14:
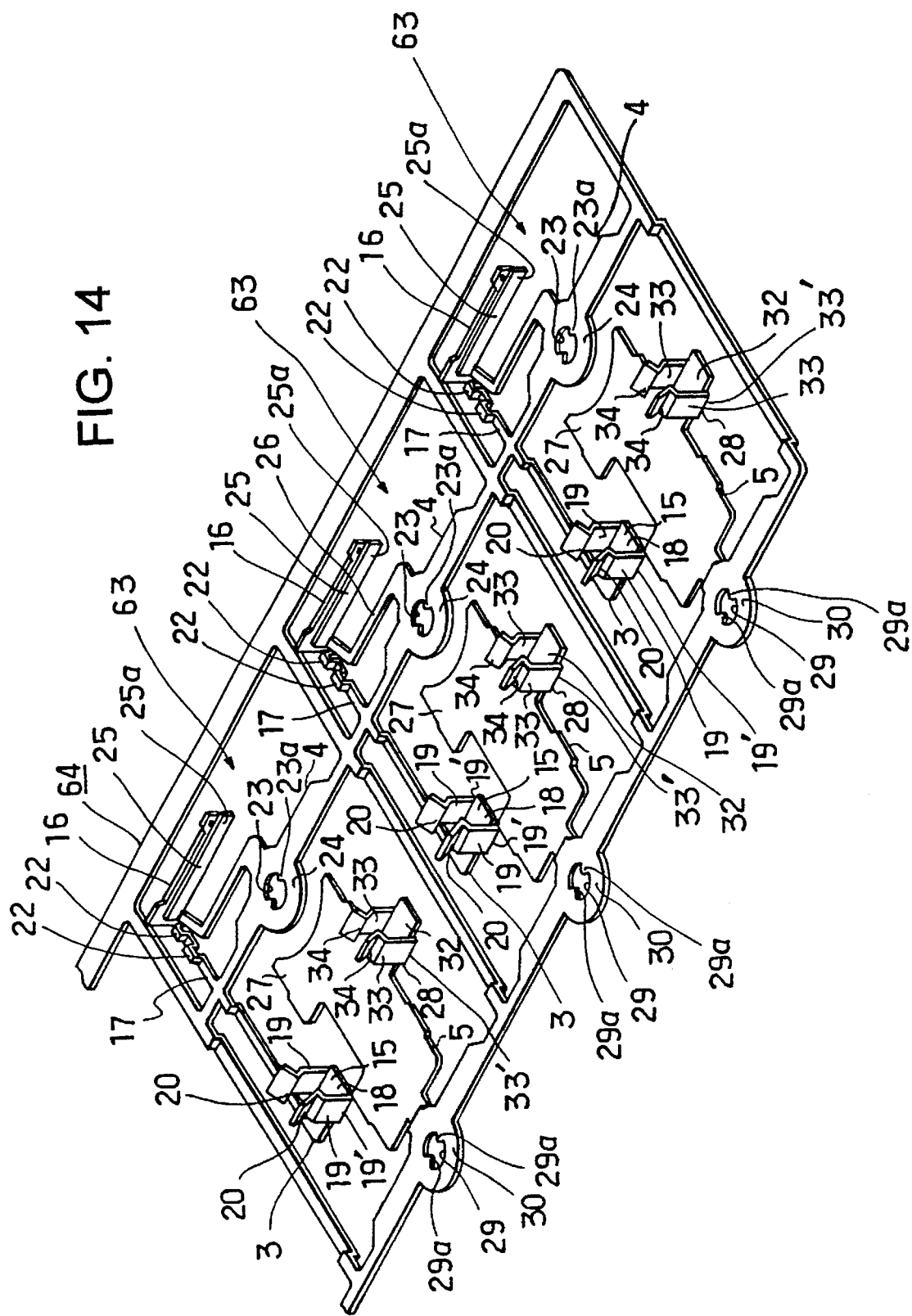
Figure 15:
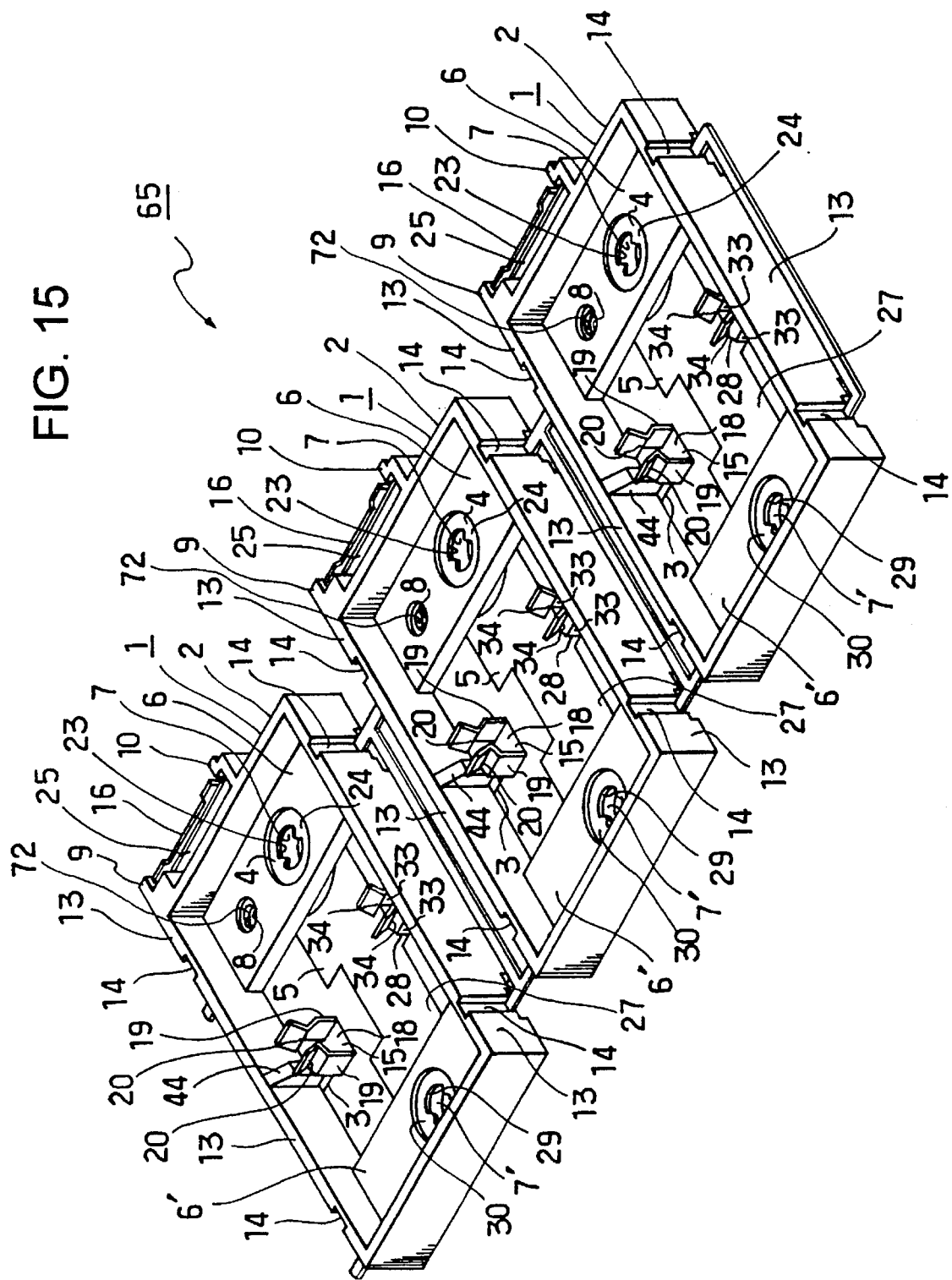

At the same time as the above-described cutting, the joint portion 62, which is exposed to the cutout bore 8 disposed at a position closer to the left end of the upper rest portion 6 of the main body 6, is cut at a position shown by 72 (FIG. 13). With this, the connection portion 17 of the contact 3 is cut and separated from the main portion 24 of the contact 4.

In the above-described lamp body and the manufacturing method thereof, since the contacts 3, 4, and 5 to be assembled into the main body 2 are integrally formed and also integrally assembled into the main body 2, the assembling accuracy of the contacts 3, 4, and 5 to the main body 2 is enhanced. Also, since the unnecessary portions of the contacts 3, 4, and 5 are covered with the resin of the main body 2, a danger of short-circuit is reduced. Moreover, the time for assembling is saved, thereby the assembling cost is reduced.

FIGS. 16 through 40 illustrate a second embodiment of the synthetic resin part integrally formed with metal members and of the method of manufacturing a synthetic resin part integrally formed with metal members. This second embodiment also applies the present invention to a lamp body for vanity mirrors and a manufacturing method thereof. Reference numeral 73 denotes a lamp body for vanity mirrors, which comprises a synthetic resin main body 74, three contacts 75, 76, 77, and two reinforcement pieces 78, 79. The main body 74 is integrally formed with the three contacts 75, 76, 77 and the two reinforcement pieces 78, 79 by insert molding.

The main body 74 is made of a synthetic resin, such as ABS resin, and formed into a shallow and flat box shape which is opened at its front surface and which, when looking at the front, is a vertically elongated rectangle.

At the upper and lower end portions of the inner bottom surface of the main body 74, there are formed rest portions 80 and 80' which project slightly forward. At the substantially central portions of the rest portions 80 and 80', there are formed through openings 81 and 81'. Between the through opening 81 and right and left ends of the upper rest portion 81 and between the through opening 81' and right end of the lower rest portion 80', there are formed cut-out bores 82, 82, and 82.

Between the rest portions 80 and 80' there is formed a recess portion 83, which consists of three equal portions 83a, 83b, and 83b'. The vertically central portion 83a has a lowest flat surface, the upper portion 83b has an oblique surface extending obliquely from the flat surface portion 83a to the upper rest portion 80, and the lower portion 83b' has an oblique surface extending obliquely from the flat surface portion 83a to the lower rest portion 80'.

At four positions close to the upper and lower ends of the side surfaces of the main body 74, i.e., the positions corresponding to the opposite side portions of the rest portions 80 and 80', there are formed four opening portions 84. The front end of the side portion of each opening portion 84 terminates short of the front end of the side wall 85, and the rear end reaches the rear surface of the main body 74. At the rest portion 80 or 80', the front end of each opening portion 84 reaches the front surface of the rest portion, and the rear end reaches the rear surface of the main body 74.

At the positions close to the upper and lower ends of the right and left side walls 85 of the main body 74, there are formed groove portions 86, 86, 86, and 86 each reaching the front and rear ends of the side wall 85.

The contact 75 (FIGS. 16 and 40) is integrally formed with a reflector portion 87, a mouthpiece holder 88 projecting leftward from the vertically central portion of the left side edge of the reflector portion 87, male terminal 90 and 90' projecting leftward and rightward from the lower ends of connection pieces 89 and 89' extending downward from the left and right side edges of the reflector portion 87.

The reflector portion 87 (FIG. 40) is integrally formed with a central portion 93 faced to the front and having a laterally elongated rectangular shape, and inclined portions 94 and 94' extending from the upper and lower ends of the central portion 93 and inclined so that they extend forward as they move away from the central portion 93. The above-described connection pieces 89 and 89' extend from the left and right ends of the central portion 93 of the reflector portion 87.

The mouthpiece holder 88 (FIG. 40) consists of a base portion 95 and snap pieces 96 and 96 rising from the upper and lower ends of the base portion 95. The snap pieces 96 and 96 are formed at the upper end portions with fastening portions 97 and 97 which are so curved as to become closer to each other. A burying piece 98 projects from the left end of the base portion 95.

Since the male terminals 90 and 90' are identical in construction except that they are symmetrical, a description of one terminal will be given, and the same reference numerals as one terminal will be applied to the other and a description of the other will not be given.

Figure 24:
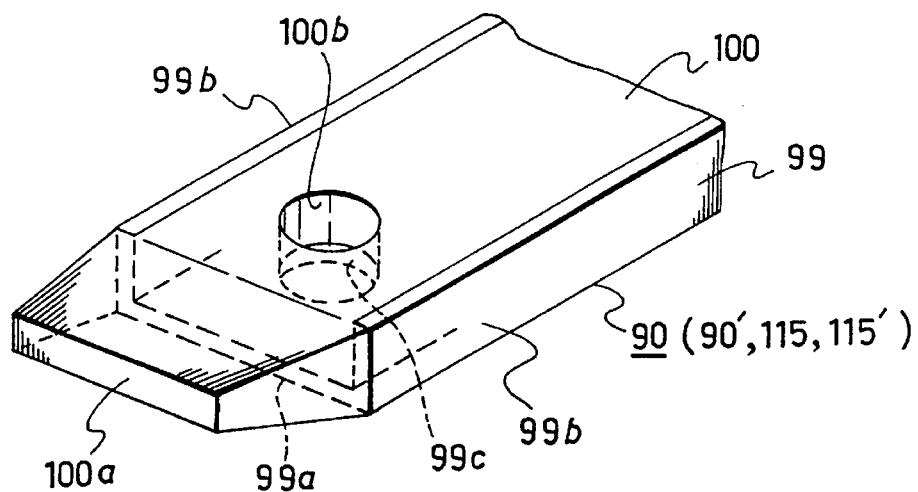
FIG. 24 is an enlarged perspective view showing the essential part of a male terminal.

The male terminal 90 consists of a conductive portion 99 and a mold portion 100 integrally formed to the conductive portion 99, as shown in FIG. 24. The conductive portion 99 is integrally formed with a plate portion 99a with a laterally elongated rectangular shape connected to the above-described connection piece 89, and side piece portions 99b and 99b projecting forward from the upper and lower ends of the plate portion 99a. In the substantially central portion of the distal end of the plate portion 99a there is formed a small bore 99c.

The mold portion 100 is formed of the same synthetic resin as the material resin of the above-described main body 74 and integrally formed on the side of the side piece portions 99b and 99b of the plate portion 99a of the conductive portion 99. The thickness of the mold portion 100 is the same as the width of the side piece portions 99b and 99b. The mold portion 100 has a distal end portion 100a projecting from the distal end of the plate portion 99a, and the distal end portion 100a is tapered so that the four surfaces (FIG. 24) thereof are gradually reduced toward the distal end in width and thickness. At the position corresponding to the above-described small bore 99c of the mold portion 100, there is formed a small bore 100b which is larger in diameter than the small bore 99c. The mold portion 100 is formed concurrently when the contact 75 is formed in the main body 74 by insert molding.

Therefore, the contact 75 is integrally formed in the main body 74 by so-called insert molding, and the reflector portion 87 is exposed to the front surface of the substantially central portion of the main body 74. That is, the central portion 93 is positioned at the front surface of the laterally central portion of the flat surface 83a of the recess portion 83 of the main body 74, the inclined portions 94 and 94' are positioned at the front surfaces of the laterally central portions of the inclined portions 83b and 83b' of the recess portion 83, the mouthpiece holder 83 is positioned at the left end portion of the flat surface 83a of the recess portion 83, and the distal end of the burying piece 98 is buried in the left side wall 85 of the main body 74. And, the male terminals 90 and 90' are so positioned as to project into the lower opening portions 84 and 84 of the main body 74 from the inner ends of the lower opening portions 84 and 84. Note that the connection pieces 89 and 89' are buried within the main body 74. Also, in the front surface of the main body, there is formed a shallow recess portion 101, within which the reflector portion 87 of the contact 75 and the base portion 95 of the mouthpiece holder 88 are disposed.

The contact 76 is integrally formed with a mouthpiece holder 102, a terminal piece 103, and a connection piece 104 extending between the mouthpiece holder 102 and the terminal piece 103.

The mouthpiece holder 102 consists of a base portion 105 and snap pieces 106 and 106 rising from the upper and lower ends of the base portion 105. The snap pieces 106 and 106 are formed at the upper end portions with fastening portions 107 and 107 which are so curved as to become closer to each other. A burying piece 108 projects from the left end of the base portion 105.

The connection piece 104 is formed as a band piece with a narrow width extending in the up-and-down direction of the main body 74, and the lower end of the connection piece 104 is integrally connected to the right end of the base portion 105 of the mouthpiece holder 102. The lower one-third portion 104a of the connection piece 104 is inclined rearward as it goes downward.

The terminal piece 103 (FIG. 40) is formed as a laterally extending band piece, the width thereof extends along the fore- and-aft direction of the main body, and the rear end of the right end of the piece 103 is integrally connected to the upper end of the above-described connection piece 104.

The above-described contact 76 is disposed so that the mouthpiece holder 102 is positioned at the right end portion of the front surface of the flat surface 83a of the main body 74 and the base portion 105 is positioned within a shallow recess portion 109 formed in the right end portion of the flat surface 83a. The burying piece 108 is buried within the flat portion 83a, and the connection piece 104 is buried within the right wall 85. Them terminal piece 103 projects leftward from a projection 110 projecting from the right end of the upper surface of the main body 74. A projection 111 projects upward from a position which is to the left of the laterally central portion of the upper end of the main body 74. The upper end portion of the projection 111 is cranked so that there are formed downwardly directed step surfaces 112a and 112b. The left end portion of the above-described terminal piece 103 elastically engages with the upper step surface 112a.

The contact 77 is integrally formed with a central piece 113 (FIG. 40) having a generally U-letter shape when looking at the front, connection pieces 114 and 114 projecting rearward from the lower right and left ends of the central piece 113, male terminals 115 and 115' respectively projecting leftward and rightward from the read ends of the connection pieces 114 and 114', and a terminal piece 117 which is connected through a reverse L-shaped connection piece 116 when viewed from the front side which is continuous to the upper end of the right end of the central portion 13.

The male terminals 115 and 115', similarly to the case of the male terminals 90 and 90', consists of a conductive portion 99 and a mold portion 100.

The terminal piece 117 is formed as a laterally extending band piece, the width thereof extends along the fore-and-aft direction of the main body, and the rear end of the right end of the piece 107 is integrally connected to the upper end of the above-described connection piece 116.

For the above-described contact 77, the male terminals 115 and 115' are so positioned as to project into the upper opening portions 84 and 84 of the main body 74 from the inner ends of the upper opening portions 84 and 84. The terminal piece 117 projects leftward beyond the distal end of the above-described terminal piece 103 of the projection 110, and the distal end of the terminal piece 117 elastically engages with the lower step surface 112b of the left projection 111. And, the remaining portion of the contact 77 is buried within the main body 74.

Figure 16:
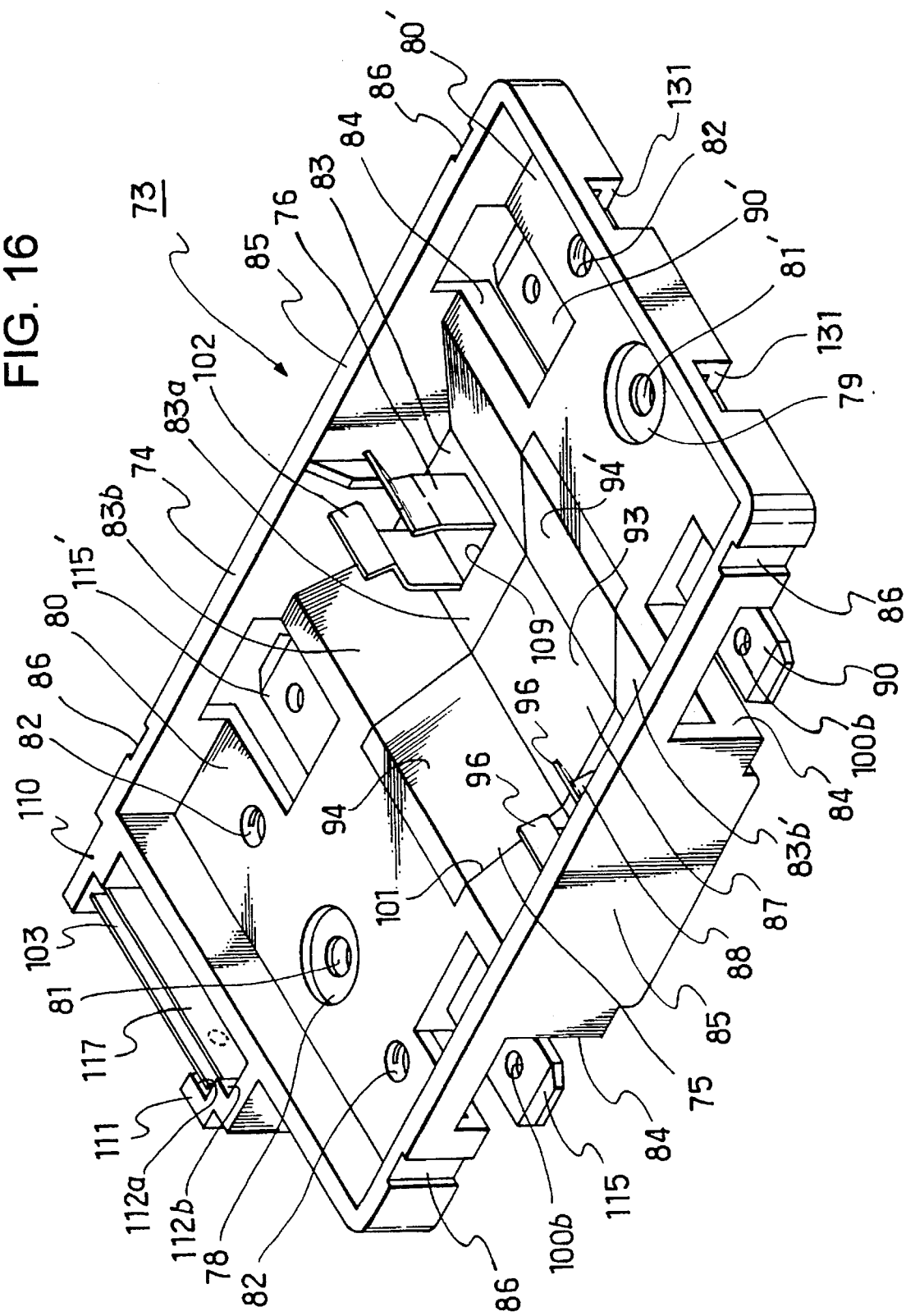
FIG. 16 shows, together with FIGS. 17 through 40, a second embodiment of the invention in which the synthetic resin part integrally formed with metal members and the manufacturing method thereof are applied to a lamp body for vanity mirrors and a manufacturing method thereof, and is an enlarged perspective view of the lamp body for vanity mirrors.

Each of the reinforcement pieces 78 and 79 is formed into a disk shape, and there is formed a through bore 118 in the central portion thereof. The reinforcement piece 78 is buried in the substantially central portion of the upper rest portion 80 of the main body 74, and the portion around the center of the piece 78 is exposed through the through bore 81 formed in the upper rest portion 80, as shown in FIG. 16. Likewise, reinforcement piece 79 is buried in the substantially central portion of the lower rest portion 80' of the main body 74, and the portion around the center of the piece 79 is exposed through the through bore 81' formed in the lower rest portion 80'.

Figure 17:
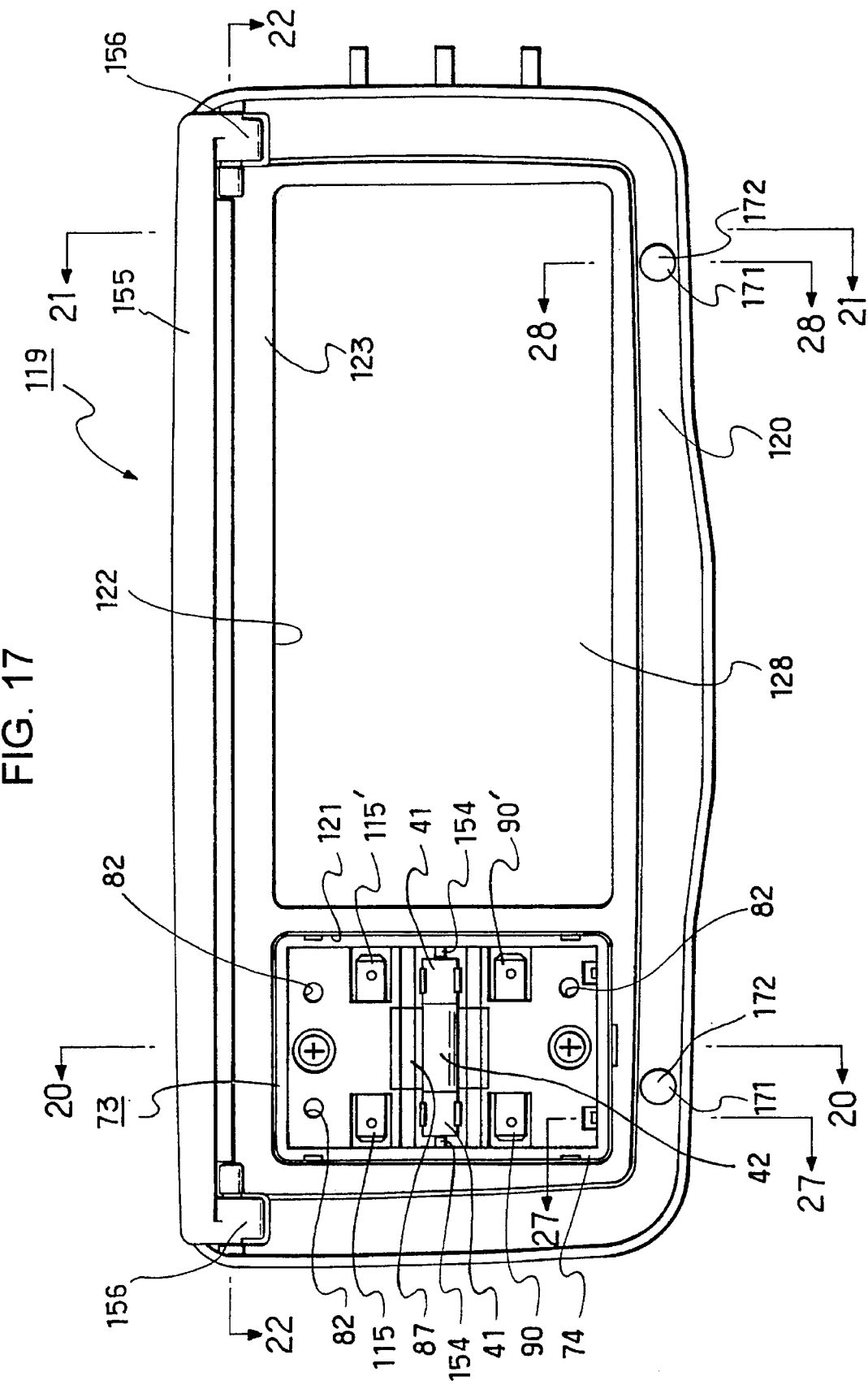
FIG. 17 is a front elevational view showing the vanity mirror, the cover of the vanity mirror being opened and the lamp lens being removed.

In FIG. 17, reference numeral 119 denotes a vanity mirror, and 120 denotes a body of the mirror. The body 120 is made of a synthetic resin and, when looking at the front, has a laterally elongated rectangular shape.

The body 120 is formed at the left end portion thereof with a vertically elongated rectangular recess portion 121 for disposing a lamp. In the portion of the body 120 to the right of the recess portion 121, there is formed a laterally elongated rectangular opening portion 122 for disposing a mirror.

Figure 18:
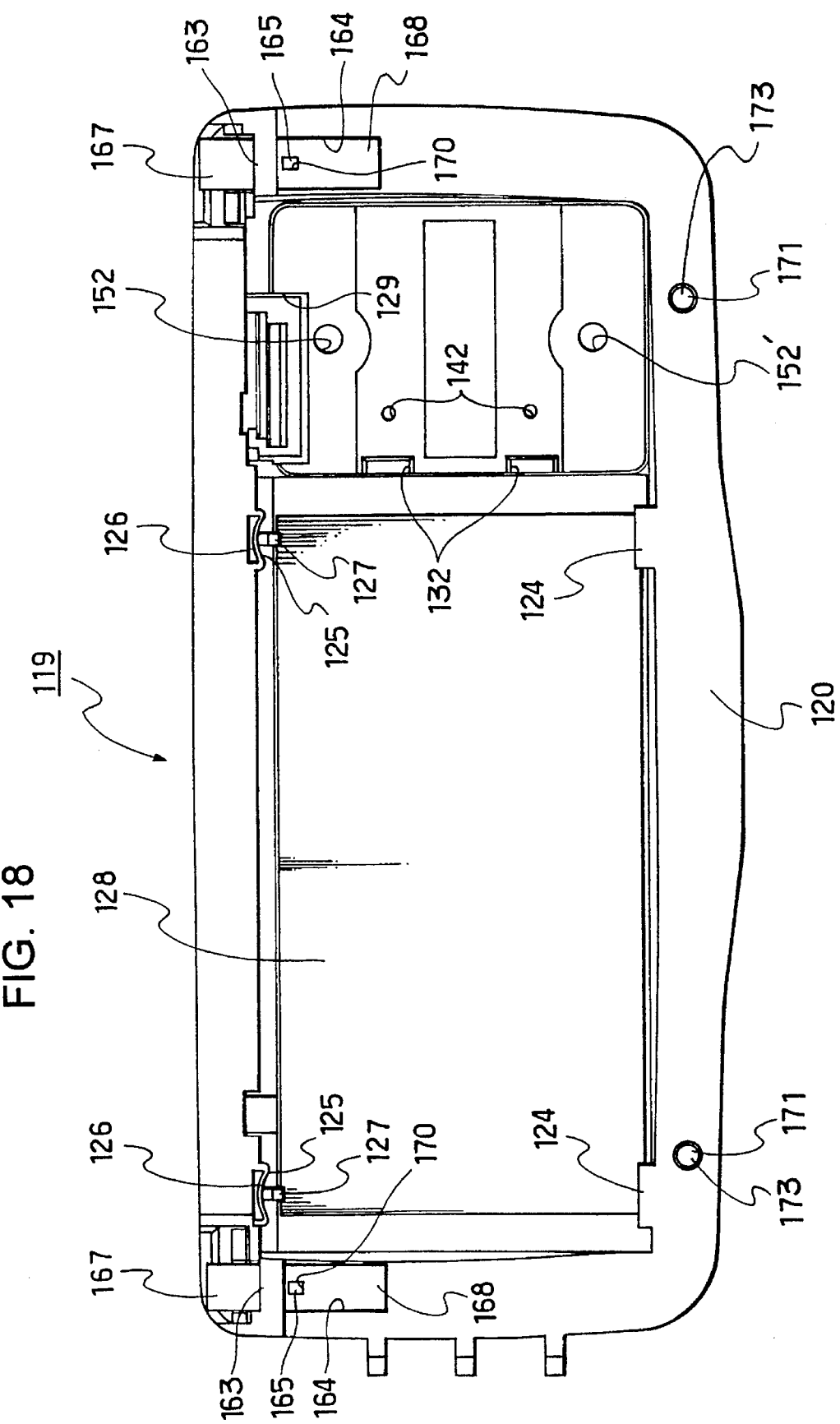
FIG. 18 is a rear view of the vanity mirror.
Figure 19:
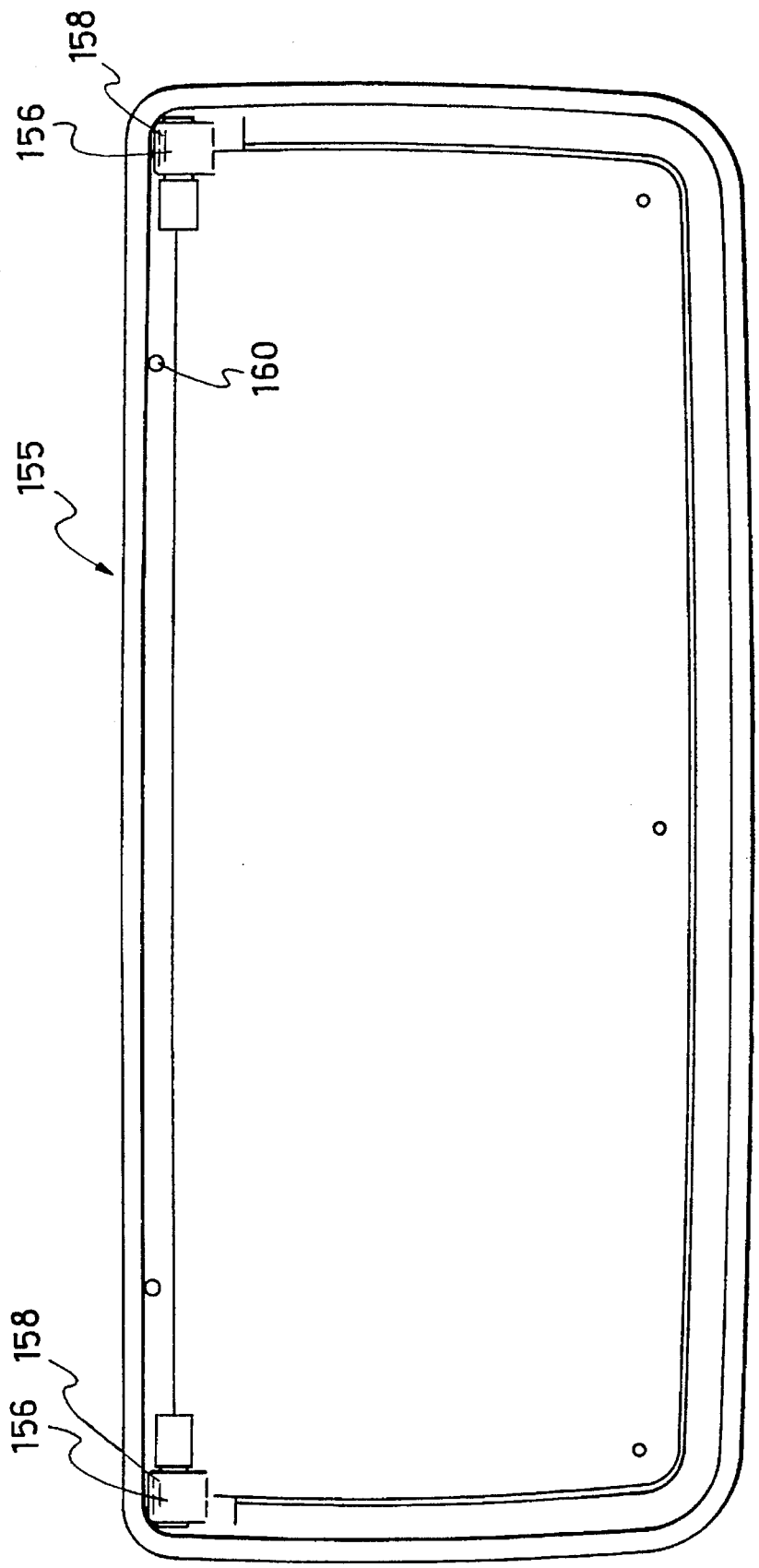
FIG. 19 is a rear view of the cover.
Figure 20:
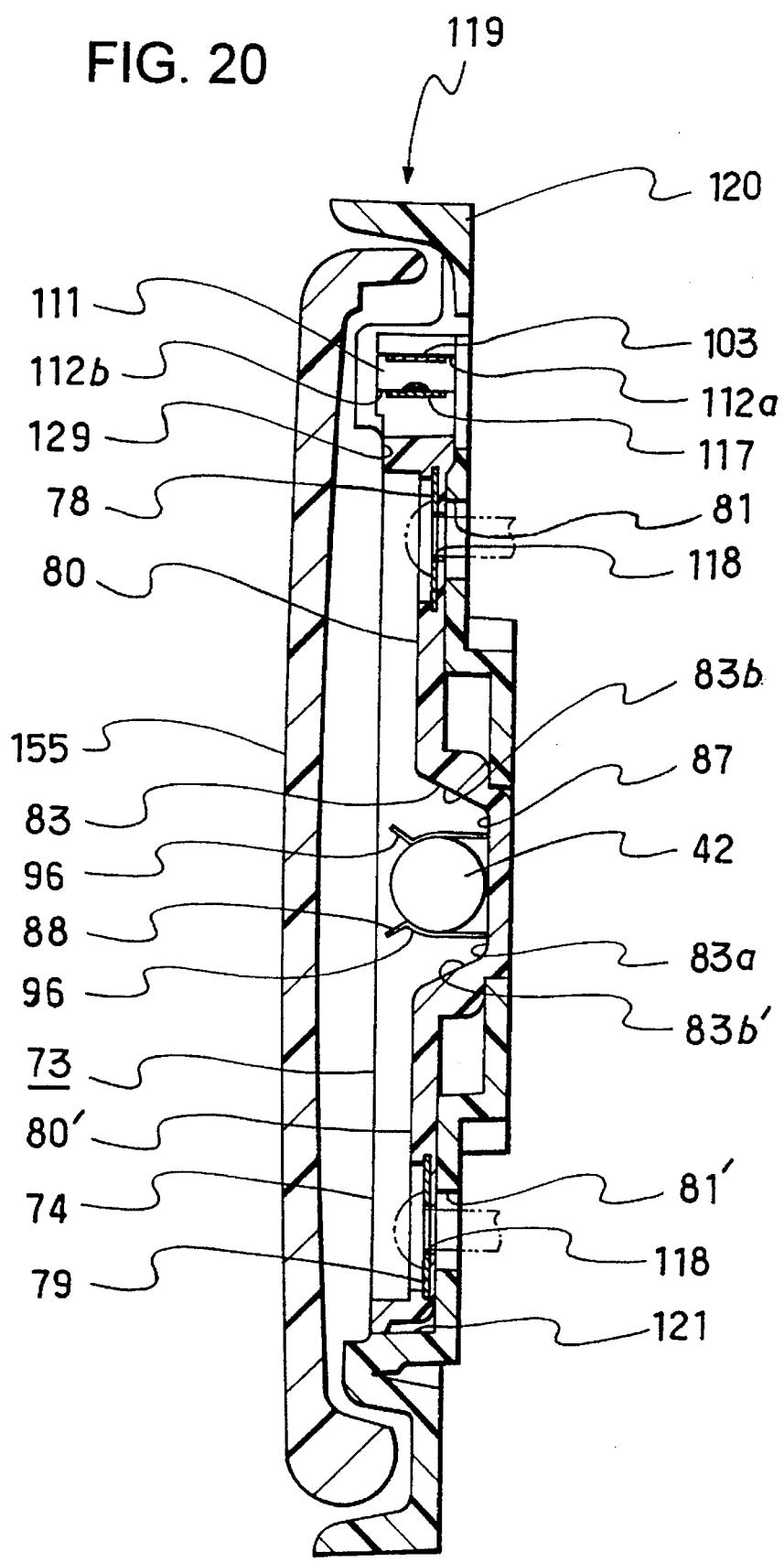
FIG. 20 is an enlarged cross sectional view taken substantially along the line 20—20 of FIG. 17, the cover being in its closed state.
Figure 21:
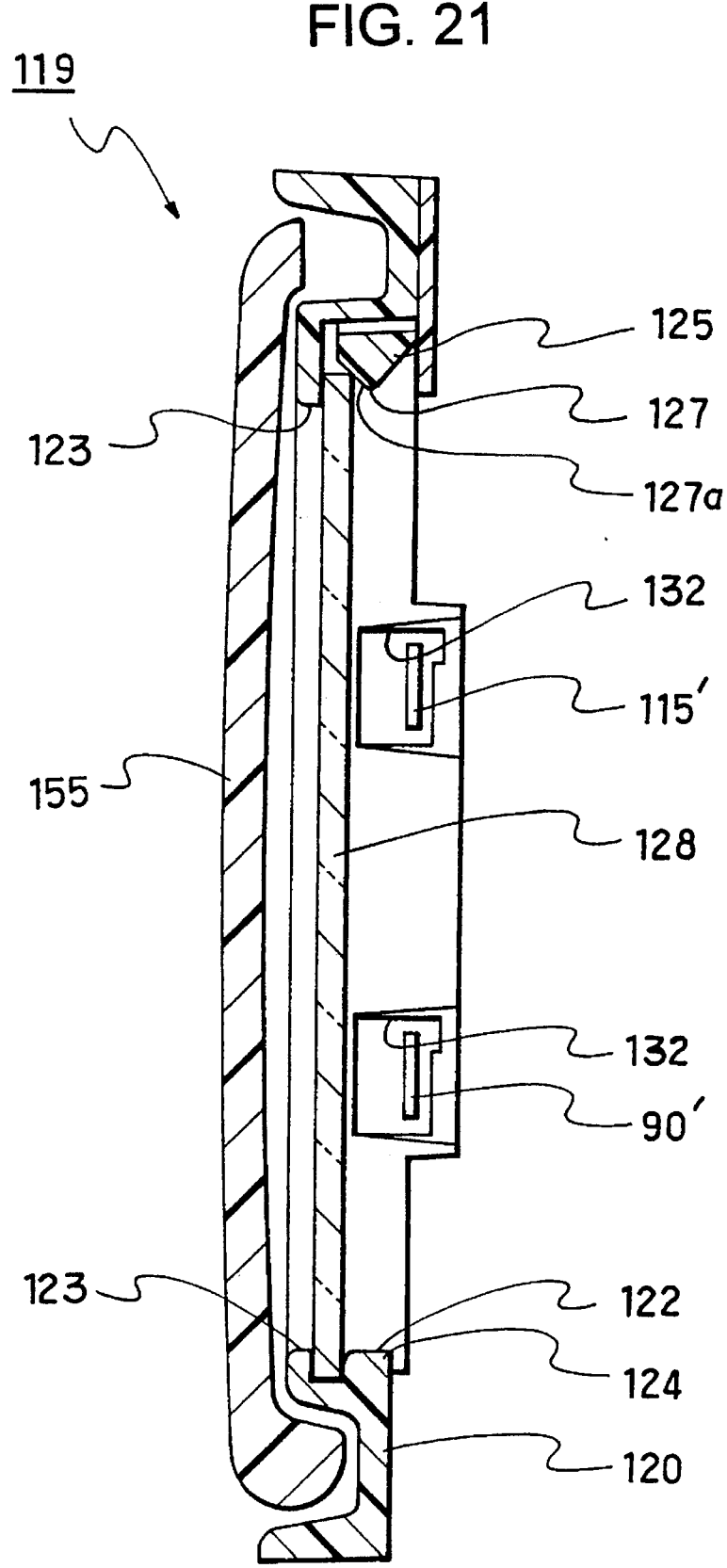
FIG. 21 is an enlarged cross sectional view taken substantially along the line 21—21 of FIG. 17, the cover being in its closed state.

At the front end of the opening portion 122 for disposing a mirror there is provided an inwardly projecting stop margin 123 (FIGS. 17 and 21), and at the left and right end portions of the lower inner side of the opening portion 122 there are provided stop projections 124 and 124 (FIGS. 18 and 21 ) . Between the front surface of the stop projection 124 and the rear surface of the stop margin 123 there is a space (FIG. 21) corresponding to the thickness of a mirror to be described later.

At the left and right end portions of the upper inner side of the opening portion 122 there are formed mirror engagement portions 125 and 125 (FIGS. 18 and 21). The mirror engagement portion 125 is integrally formed with a recess-shaped thin spring portion 126 connected at the opposite ends thereof to the upper inner side of the opening portion 122, and an engagement projection 127 projecting downward from the laterally central portion of the lower surface of the thin spring portion 126. The engagement projection 127 has an inclined surface 127a (FIG. 21) which is so inclined as to increase as it goes forward end.

Reference numeral 128 denotes a mirror. The mirror 128 has a laterally elongated rectangular shape which is a size smaller than the opening portion 122. The thickness of the mirror 128 is greater than the space between the front end of the thin spring portion 126 of the mirror engagement portion 125 and the rear surface of the stop margin 123. Then, the mirror 128 is inserted from the rear side of the body 120 into the portion between the stop projections 124, 124 and the stop margin 123 with the lower end of the mirror inclined forward, and with the central portions of the thin spring portion bent upward, the upper end of the mirror 128 is moved forward to abut against the rear surface of the stop margin 123. Then, if the force of bending the thin spring portions 126 and 126 is released, the thin spring portions 126 and 126 will try to return to their original state and therefore the lower surfaces 127a and 127a of the engagement projections 127 and 127 will elastically engage with the upper end of the mirror 128. Since the lower surfaces 127a and 127a of the engagement projections 127 and 127 are so inclined as to increase as they go forward, a force of forward movement is exerted on the upper end of the mirror 128 by the above-described elastic engagement, so that the mirror 128 is mounted in the body 120 with the front surface of the circumferential margin of the mirror 128 engaged elastically by the rear surface of the stop margin 123.

The recess portion 121 for disposing a lamp is surrounded by a rear surface and four side walls and opened toward forward.

Figure 23:
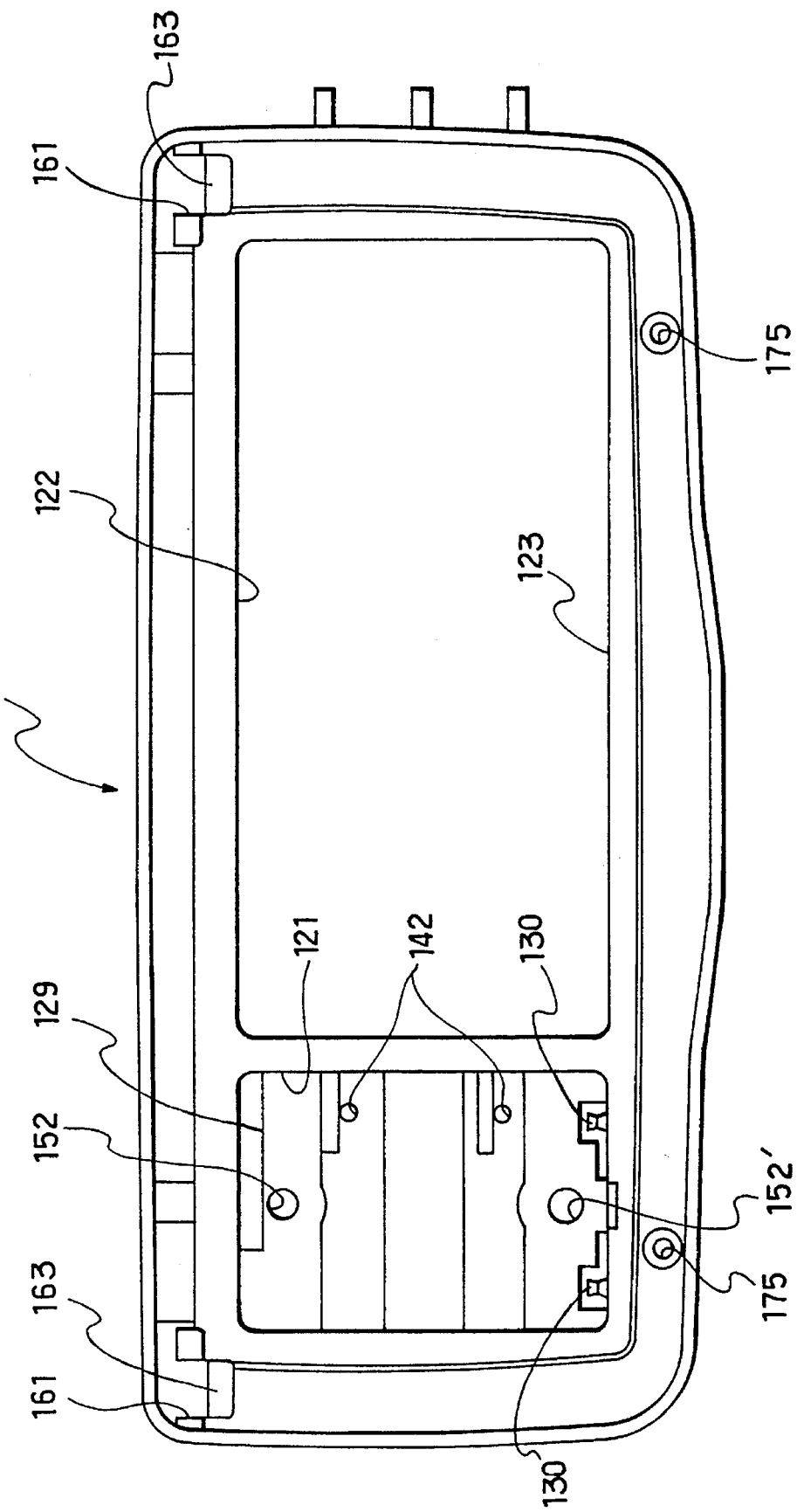
FIG. 23 is a front elevational view of the body of the vanity mirror.

The lamp body 73 for vanity mirrors is mounted within the recess portion 121 for disposing a lamp. In the upper surface wall of the recess portion 121 except the left end portion, there is formed a laterally elongated through bore 129 (FIG. 23). The projections 110 and 111 provided on the upper end of the lamp body 73 are inserted through the through bore 129 and project above the recess portion 121. On the lower wall of the lamp recess portion 121 there is formed engagement pawl portions 130 and 130. The engagement pawl portions 130 and 130 engage with engagement openings 131 and 131 formed in the lower wall of the main body 74 of the lamp body 73, thereby holding the lamp body 73 within the lamp recess portion 121.

In FIG. 21, reference numerals 132 and 132 denote facing bores formed on the right wall of the lamp recess portion 121 at positions corresponding to the right opening portions 84 and 84 of the right wall of the lamp body 73. The male terminal 90' and 115' of the lamp body 73 are faced to the outside through the facing bores 132 and 132. Note that when the lamp recess portion 121 is formed to the right of the body 120, the facing bores 132 are formed on the left wall of the lamp recess portion 121 and the left male terminals 90 and 115 are faced to the outside through the facing bores 132 and 132. The reason that two sets of left and right male terminals 90, 115 and 90', 115' are provided in the lamp body 73 is that even if the lamp portion is formed to the left or right of the vanity mirror, both cases can be handled by one kind of lamp body 73.

Thus, in this lamp body 73, since a left pair of male terminals 90 and 115 and a right pair of male terminals 90' and 115' are located within the through bores 81 and 81' for mounting the main body 74 and within the openings 84, 84, 84, and 84 formed in the positions which do not interfere the mounting of a bulb, space can be used effectively. Also, since these male terminals 90, 90', 115, and 115' do not project from the sides of the main body 74, the assembling of the main body 74 into the lamp recess portion 121 is facilitated. Further, since a pair of male terminals 90 and 115 and a pair of male terminals 90' and 115' are disposed across the portion of disposing the bulb 42, they can be disposed within the range of the bulb thickness and contribute to making a device thinner.

Also, as described above, the lamp body 73 and the body 120 for the vanity mirror 119 are formed separately and the lamp 73 is fixed within the recess portion 121 for disposing a lamp. Therefore, illumination by the lamp portion can be made lighter if the color of the material resin of the main body 74 of the lamp body 73 is made white, for example, and a material having higher heat resistance can be used as the material resin.

Figure 31:
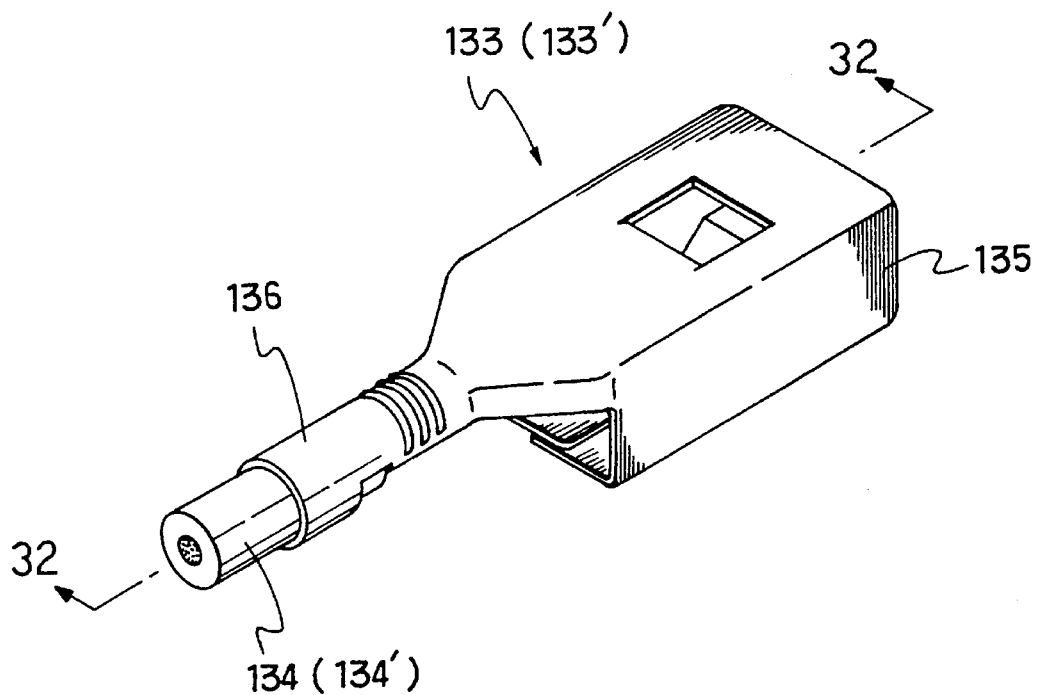
FIG. 31 is an enlarged perspective view showing a female terminal.
Figure 32:
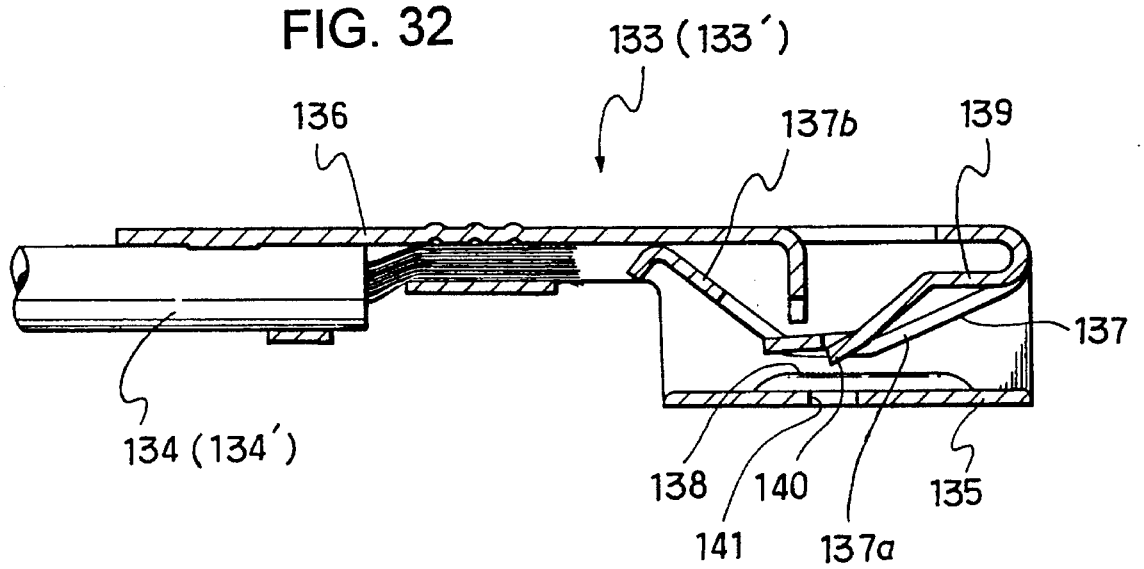
FIG. 32 is an enlarged sectional view taken substantially along the line 32—32 of FIG. 31.
Figure 33:
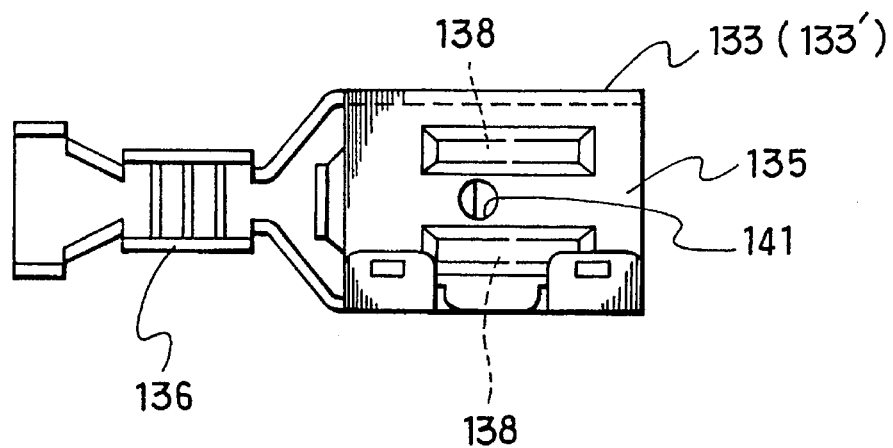
FIG. 33 is an enlarged front view of the female terminal.
Figure 34:
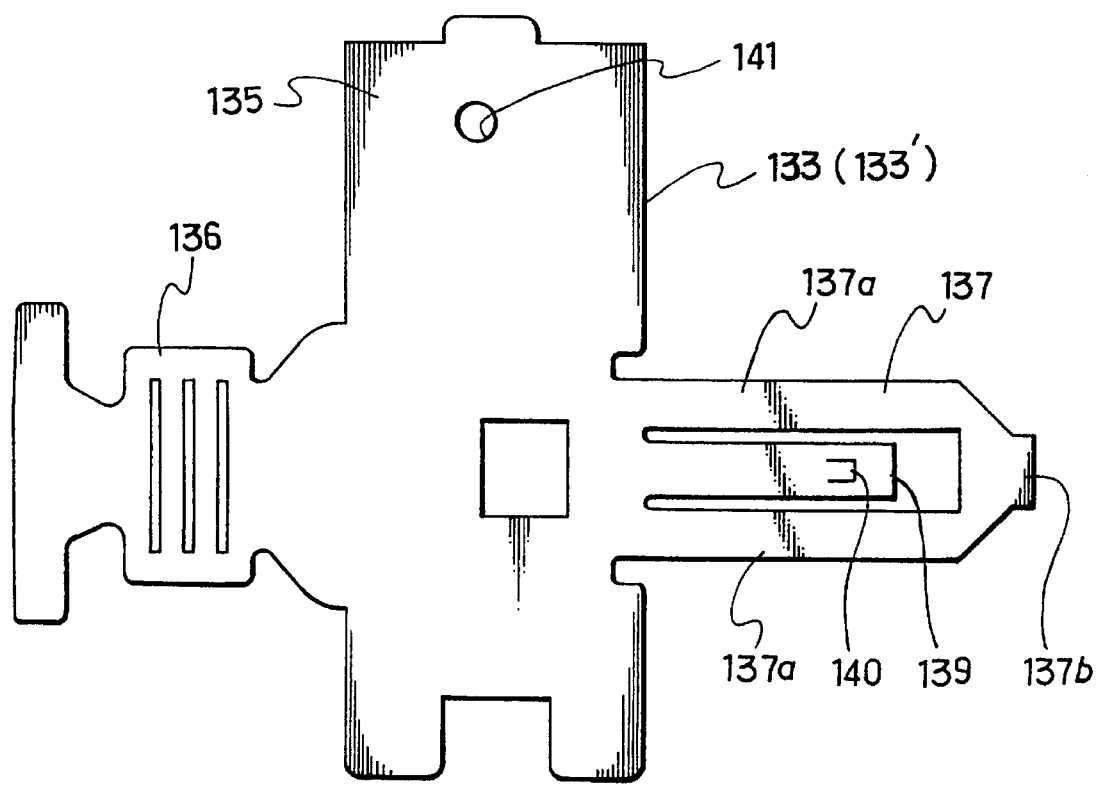
FIG. 34 is an enlarged view of the female terminal, the female terminal being developed.

In FIG. 31, reference numerals 133 and 133' denote female terminals provided in a sun visor (not shown) which is mounted in the vanity mirror 119. The female terminals 133 and 133' are connected to a power supply through cords 134 and 134', respectively.

Since the female terminals 133 and 133' are identical in construction, a description of one terminal 133 will be given, and the same reference numerals will be applied to the other and a description of the other will be omitted.

The female terminal 133 consists of a receiving portion 135 and a cord connection portion 136. The receiving portion 135 and the cord connection portion 136 are integrally formed of a conductive metal plate. The receiving portion 135 is formed into a box shape, and the front plate of the receiving portion 135 is connected to the cord connection portion 136.

From the front edge of the front plate of the receiving portion 135, an elastic contact piece 137 is turned back toward the cord connection portion 136. The elastic contact piece 137 is bifurcated when viewed in the fore-and-aft direction of the main body, the free ends of two finger-shaped pieces 137a and 137a vertically spaced are connected by a connection piece 137, and when viewed in the fore-and-aft direction of the main body, the vertex portion is formed into a flat mountain shape. On the rear plate of the receiving portion 135, there are formed projection portions 138 and 138 which project at positions corresponding to the finger-shaped pieces 137a and 137a of the elastic contact piece 137 toward the finger-shaped pieces 137a and 137a.

Reference numeral 139 denotes an engagement piece which is turned back from the central portion of the front edge of the receiving portion 135 toward rearward so that it is disposed between the finger-shaped pieces 137a and 137a. The engagement piece 139 is inclined so that it becomes closer to the rear plate as it goes away from the front edge of the front plate, and on the free end portion located near the vertex portion of the above-described elastic contact piece 137, there is formed an engagement pawl 140 projecting toward the rear plate. At a position corresponding to the above-described engagement pawl 140, a through bore 141 is formed in the rear plate of the receiving portion 135.

Then, the female terminals 133 and 133' are inserted from the above-described facing bores 132 and 132 into the opening portions 84 and 84 of the lamp body 73 and therefore the male terminals 90' and 115' are received in the receiving portions 135 and 135. Each of the male terminals 90' and 115' received in the receiving portions 135 and 135 is inserted into between the projections 138 and 138 formed on the rear plate and the finger-shaped pieces 137a and 137a formed on the front plate, until the engagement pawl 140 of the engagement piece 139 engages with the small bore 100b of the mold portion 100 of the male terminal. By the engagement between the engagement pawl 140 (140) and the small bore 100b (100b), the female terminal 133 (133') can be prevented from being disconnected from the male terminal 90' (115'). The projection portions 138 and 138 of the female terminals 133 and 133' elastically contact with the plate portions 99a and 99a of the conductive portions 99 and 99 of the male terminals 90' and 115'. Note that when inserting the receiving portions 135 and 135 into the male terminals 90' and 115', the inserting is easily performed because the distal end portions 100a and 100a of the male terminals 90' and 115' have been tapered so that the four surfaces (FIG. 24) thereof are gradually reduced toward the distal end in width and thickness.

Figure 35:
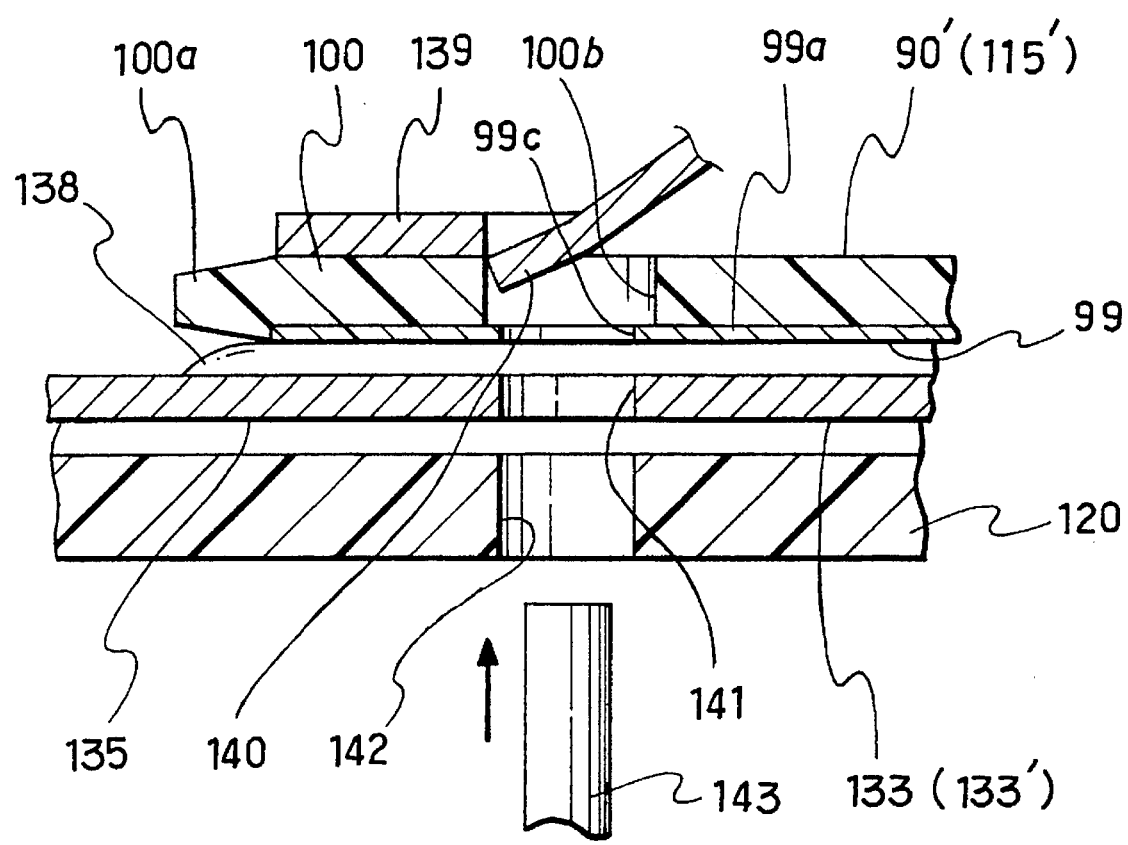
FIG. 35 is an enlarged sectional view, partly cut away, showing the male terminal connected to the female terminal.

Thus, if the male terminals 90', 115' and the female terminals 133, 133' are coupled, these cannot be separated easily due to the engagement between the engagement pawl 140 and the small bore 100b. However, the rear plates of the above-described recess portions 121 for disposing a lamp have been formed with the through bores 142 and 142 at the positions corresponding to the small bores 99c and 99c of the conductive portions 99 and 99 of the male terminals 90' and 115', and if, as shown in FIG. 35, a tool 143 having a narrow distal end is inserted from the through bore 142, the tool 143 is inserted through the through bore 141 formed in the rear plate of the female terminal 133 (or 133') and through the small bores 99c and 100b of the male terminal 90' (or 115'), the tool 143 is brought into contact with the engagement pawl 140 and further moved forward to take the engagement pawl 140 out of the small bore 100b, and in this condition the female terminal 133 (or 133') is pulled out, then the female terminal 133 (or 133') can easily be detached from the male terminal 90' (or 115').

The reason why, as described above, the male terminals 90, 90', 115, and 115' have been formed by the conductive portion 99 and the mold portion 100 is because a certain degree of thickness is required for performing the connection with the female terminal 133 (or 133). That is, since the plate thickness of a metal material for forming the contact 75 and the like is thin, a sufficient contact pressure could not be obtained even if the male terminals were connected to the female terminals 133 and 133'. Then, the mold portion 100 is formed on the conductive portion to obtain a necessary plate thickness. Moreover, since the mold portion 100 can be formed concurrently when performing insert molding, it has no influence on costs. In the above embodiment, the distal end portion 100a does not have a metal portion, but it is a matter of course that the plate portion 99a of the conductive portion 99 may be extended to the distal end portion 100a to increase the strength of the distal end portion 100a and prevent it from being broken.

Figure 25:
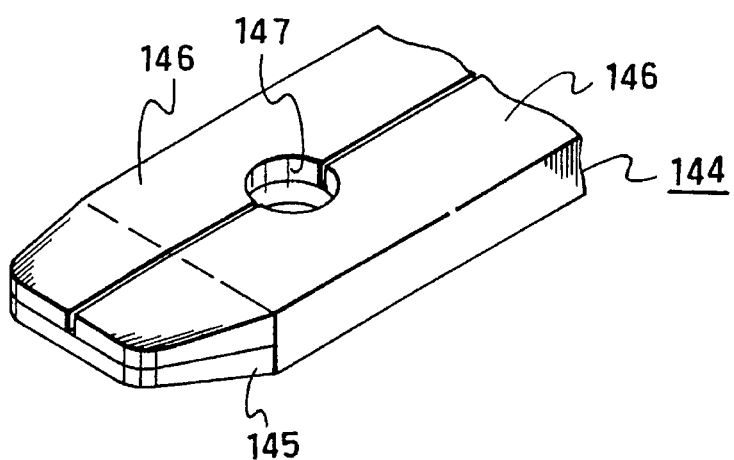
FIG. 25 is a view similar to FIG. 24 showing a modification of the male terminal.
Figure 26:
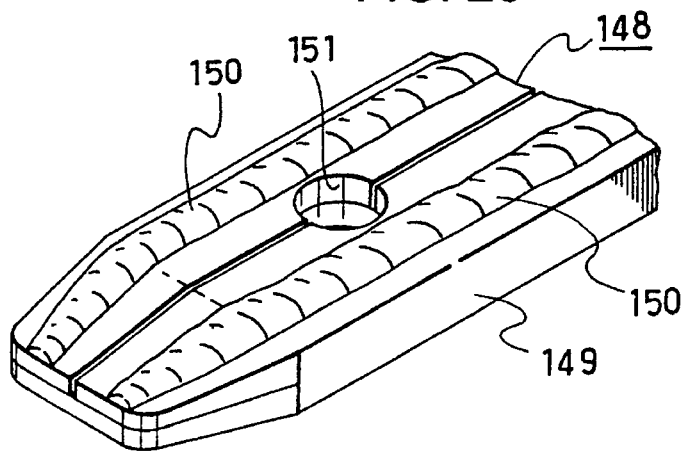
FIG. 26 is a view similar to FIG. 24 showing another modification of the male terminal.
Figure 27:
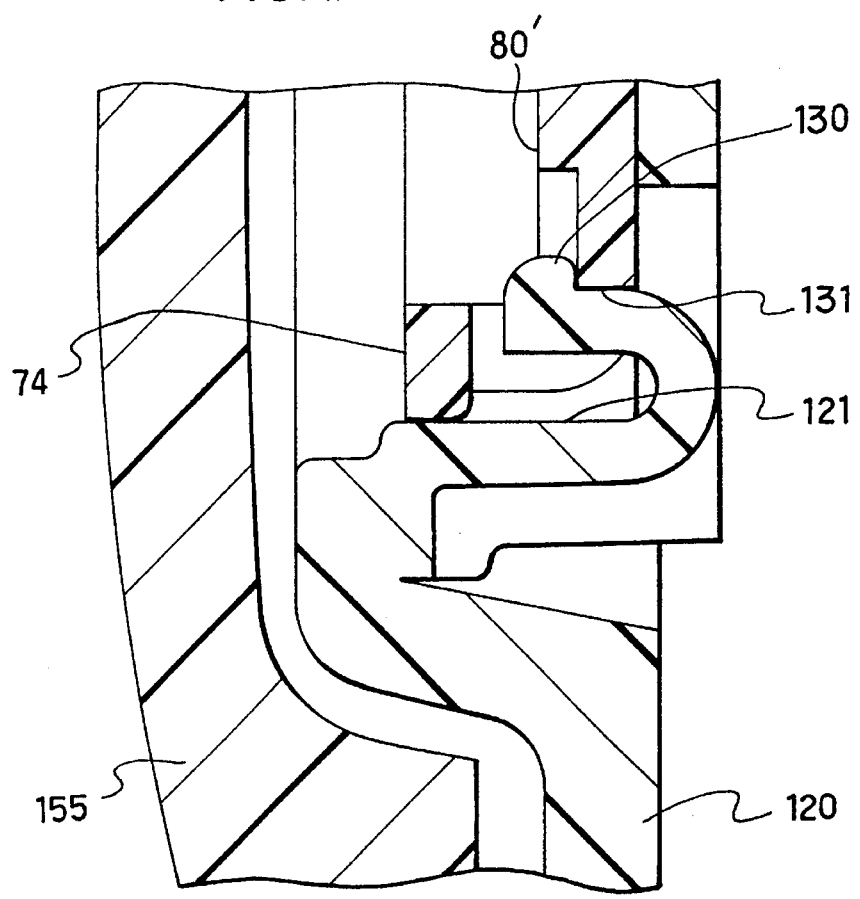
FIG. 27 is an enlarged sectional view taken substantially along the line 27—27 of FIG. 17, the cover being in its closed state.
Figure 28:
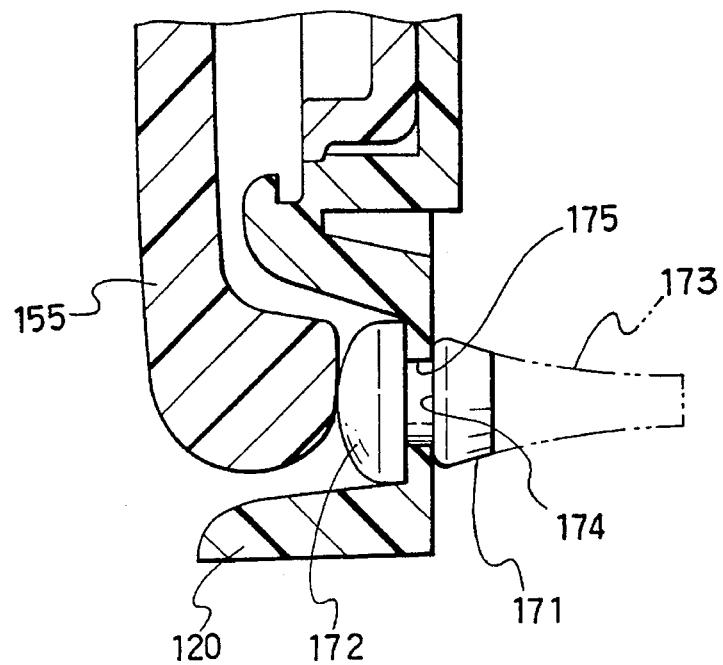
FIG. 28 is an enlarged sectional view taken substantially along the line 28—28 of FIG. 17, the cover being in its closed state.
Figure 29:
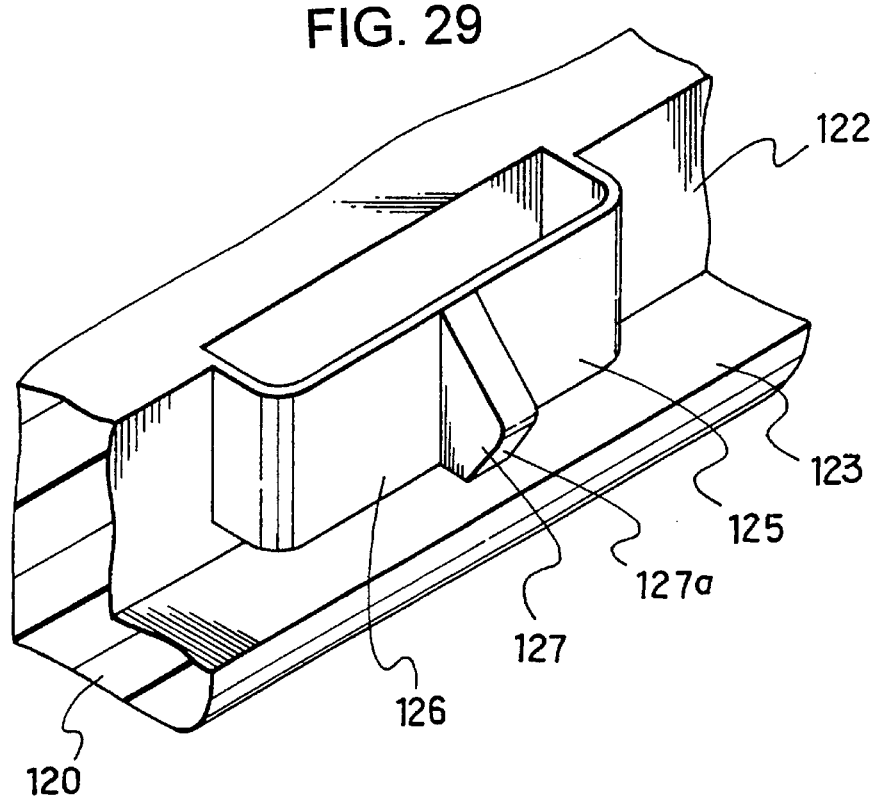
FIG. 29 is an enlarged perspective view, partly cut away, showing a mirror engagement portion.
Figure 30:
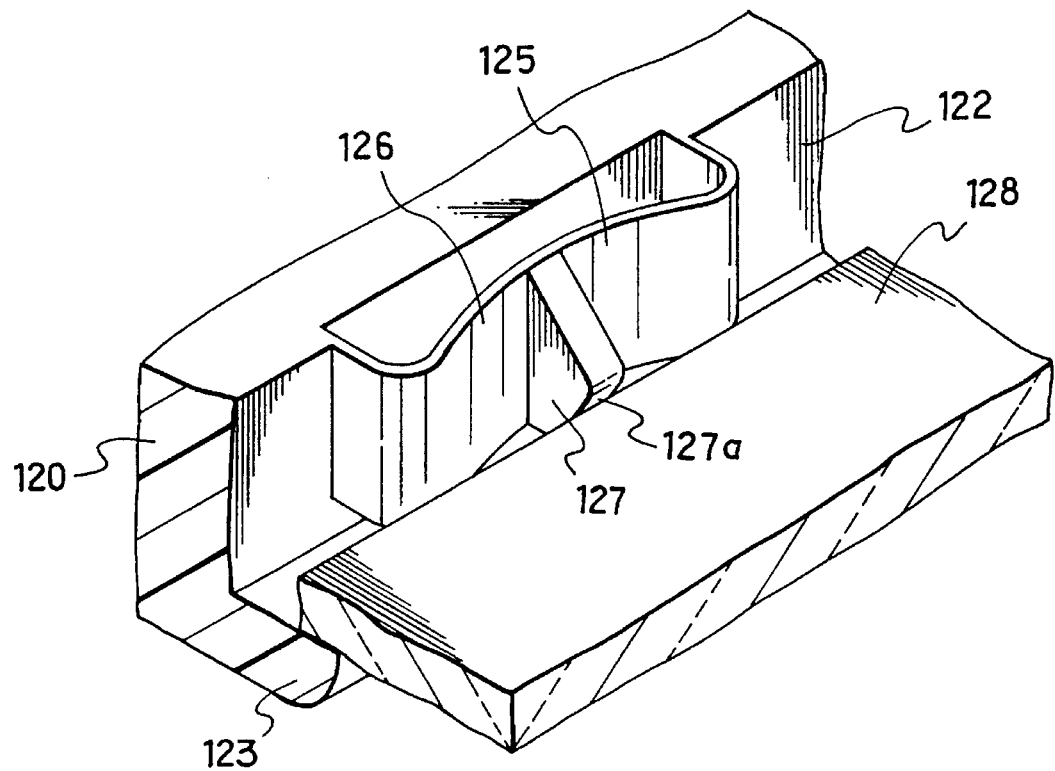
FIG. 30 is an enlarged perspective view, partly cut away, showing the mirror engagement portion engaged by the margin of the mirror.

In addition to the two-layer structure of a conductive portion and a mold portion, a plate-shaped main portion 145 and auxiliary portions 146 and 146 extending from the side edges of the main portion 145 and having a substantially half width of the main portion 145 may be formed integrally of a conductive material, and the auxiliary portions 146 may be turned back toward the main portion 145, like a male terminal 144 shown in FIG. 25. Reference numeral 147 denotes an engagement bore for preventing separation. Further, like a male terminal 148 shown in FIG. 26, laterally elongated projections 150 and 150 may be formed at positions which correspond to the finger-shaped pieces 137a and 137a and the projection portions 138 and 138 when a plate-shaped main portion 149 made of a conductive material is inserted into the female terminals 133 or 133'. Reference numeral 151 denotes an engagement bore for preventing separation.

At the positions of the rear wall of the lamp recess portion 121 corresponding to the through bores 81 and 81' of the lamp body 73, there are formed through bores 152 and 152'. Mounting screws (not shown) is inserted through the through bores 81, 81', 118, 118' and 152, 152' and screwed into the structure (not shown) of a sun visor. These screws constitute means for mounting the vanity mirror 119 to the sun visor. Thus, since the bores for mounting the vanity mirror 119 to the sun visor are formed of a metal plate independently of the contacts 75, 76, and 77, deformation and damages as mounting screws are fastened can be prevented. Also, since the rear wall of the main body 74 is increased in strength as compared with a case where through bores are formed in the resin part of the main body 74, this portion can be made thinner.

In the above-described structure, the tubular bulb 42 is firmly held at the mouthpieces 41 and 41 thereof by the snap pieces 96 and 96 of the mouthpiece holder 88 and the snap pieces 106 and 106 of the mouthpiece holder 102 and disposed in the lamp body 73. The front opening of the lamp body 73 is covered by a lens body (not show), thereby constituting a lamps. 153.

Reference numerals 154 and 154 (FIG. 17) denote bulb stoppers, which project from a position of the left side wall 85 of the main body 74 corresponding to the center between the snap pieces 96 and 96 of the mouthpiece holder 88 and from a position of the right side wall 85 of the main body 74 corresponding to the center between the snap pieces 106 and 106 of the mouthpiece holder 102. The bulb stoppers 154 and 154 are brought into contact with the end faces of the mouthpieces 41 and 41 of the above-described tubular bulb 42 or located near the end faces so that unnecessary movement of the tubular bulb 42 can be limited to prevent failure such as a short circuit.

Reference numeral 155 denotes a cover for covering the front surface of the above-described body 120. The cover 155 is formed of a synthetic resin into a plate shape, and the upper end is rotatably supported on the upper end of the body 120.

Figure 22:
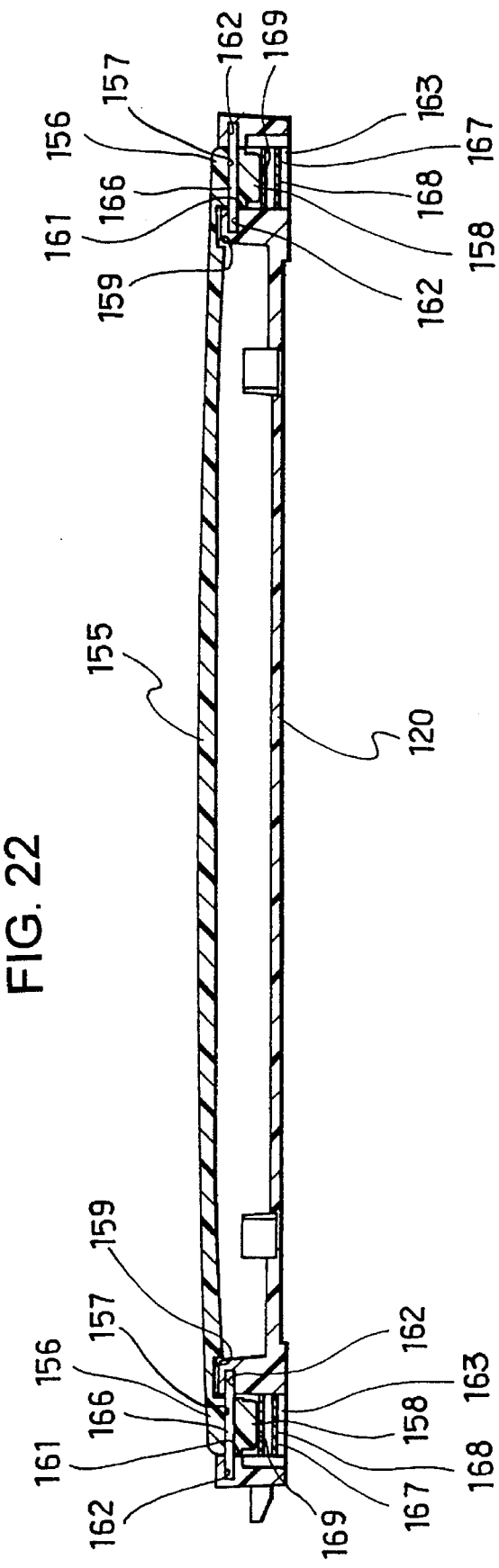
FIG. 22 is a longitudinal sectional view taken substantially along the line 22—22 of FIG. 17, the cover being in its closed state.

The cover 155 is formed at the opposite ends of the upper portion thereof with support portions 156 and 156. The support portions 156 and 156 are formed with through bores 157 and 157 passing therethrough. As shown in FIG. 22, driven projections 158 and 158 project rearward from the upper ends of the rear surfaces of the support portions 156 and 156, respectively. Recess portions 159 and 159 are formed in the inner sides of the support portions 156 and 156, i.e., at the positions adjacent to the right side of the left support portion 156 and the left side of the right support portion 156. Further, at a position to the right of the left recess portion 159, there is formed a press projection 160 projecting rearward.

In the right and left ends of the upper portion of the above-described body 120 there are formed recess portions 161 and 161 which are open to the front. Mounting bores 162 and 162 laterally extending are formed across the left recess portion 161. Likewise, mounting bores 162 and 162 are formed across the right recess portion 161.

The rear end walls of the above-described recess portions 161 and 161 are removed except the lower end portions 163 and 163, and the rear end portion of the upper surface wall is also removed. At the positions continuous to the lower surfaces of the rear end portions of the recess portions 161 and 161 of the rear surface of the body 120, there are formed shallow recess portions 164 and 164 (FIG. 18) extending in the up-and-down direction of the main body. Engagement pawls 165 and 165 project into the upper central portions of the shallow recess portions 164 and 164, respectively.

The support portions 156 and 156 of the cover 155 are disposed in the recess portions 161 and 161 of the body 120, and the opposite ends of each of the support pins 166 and 166 passed through the through bores 157 and 157 are supported in the mounting bores 162 and 162. With this arrangement, the right and left end portions of the upper end portion of the cover 155 are rotatably supported on the upper end portion of the body 120.

Reference numerals 167 and 167 (FIGS. 18 and 38) denote state hold springs made of a plate spring material. Each of the state hold springs 167 and 167 consists of a vertically extending band-shaped main portion 168 and an operation portion 169 extending from the main portion 168 and turning back downward. The main portion 168 is formed at the vertically central portion thereof with an engagement bore 170.

Before mounting the cover 155, the main portions 168 and 168 of the state hold springs 167 and 167 are located within the shallow recess portions 164 and 164 through the front sides of the lower end portions 163 and 163 of the rear walls of the recess portions 161 and 161, and the engagement bores 170 and 170 of the state hold springs 167 and 167 are engaged by the engagement pawls 165 and 165 within the shallow recess portions 164 and 164. In this state, if the cover 155 is supported on the body 120, as described above, the front sides of the driven projections 158 and 158 of the cover 155 will elastically be engaged by the operation portions 169 and 169 of the state hold springs 167 and 167. Therefore, the upper portions of the main portions 168 and 168 are pushed against the front surface of the lower end portions 164 and 164 of the rear walls of the recess portions 161 and 161, the lower portions of the main portions 168 and 168 are pushed against the shallow recess portions 164 and 164, and the engagement bores 170 and 170 of the main portions 168 and 168 are engaged by the engagement pawls 165 and 165, so that the state hold springs 167 and 167 are prevented from being detached from the body 120. Therefore, the holding structure of the state hold springs 167 and 167 to the body 120 becomes simpler.

Figure 38:
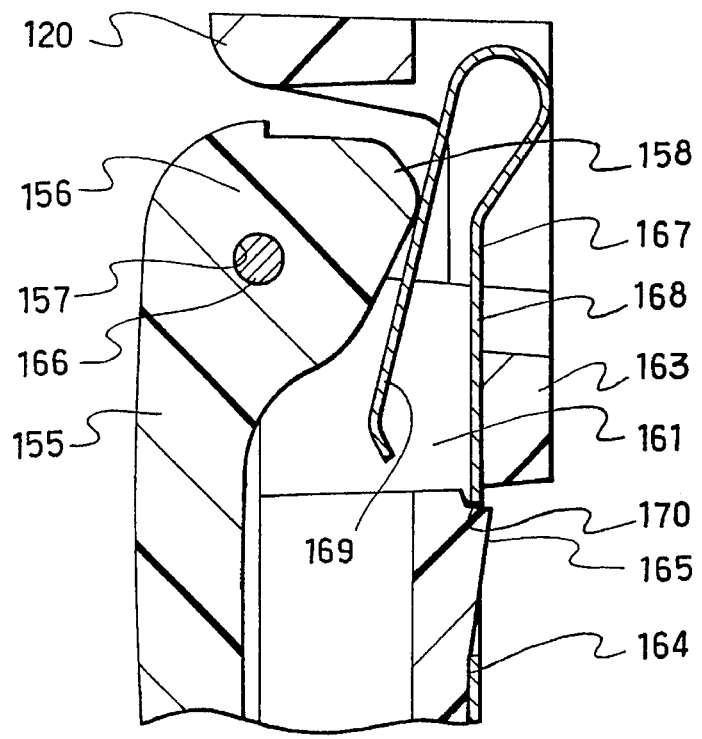
FIG. 38 is an enlarged sectional view, partly cut away, showing means for holding the cover in its closed state to that closed state.
Figure 39:
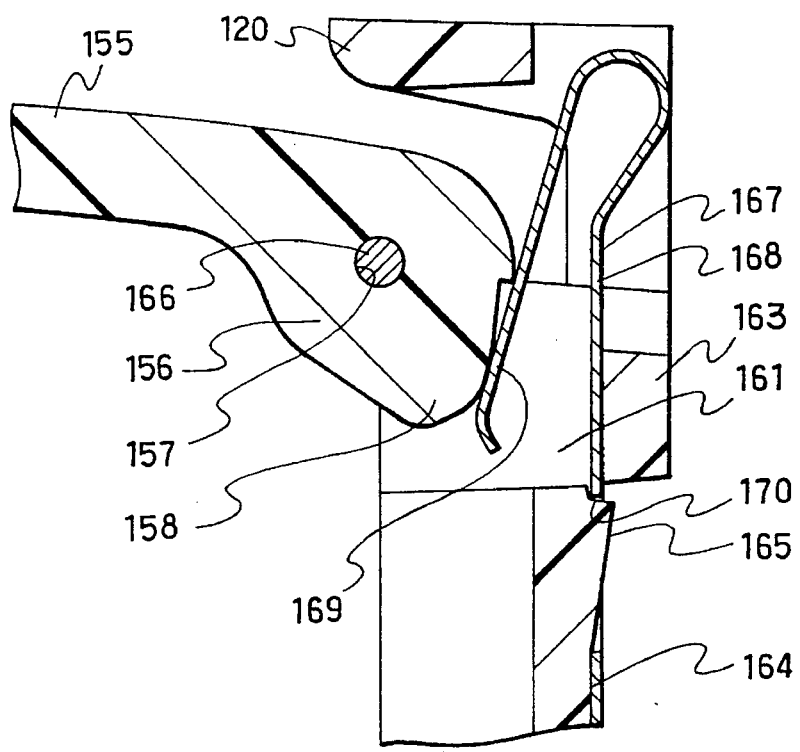
FIG. 39 is an enlarged sectional view, partly cut away, showing means for holding the cover in its open state to that open state.

FIG. 38 shows the closed state in which the cover 155 covers the front surface of the body 120. In this closed state, the driven projections 158 and 158 of the cover 155 is elastically in contact with the operation portions 169 and 169 of the state hold springs 167 and 167 at positions higher than the rear ends of the through bores 156 and 156 which are supports of rotation. Therefore, a rotational force in a direction of holding the above-described closed state, i.e., the counterclockwise direction in FIG. 38 is applied to the cover 155, and the closed state is held. FIG. 39 shows the open state in which the cover 155 opens the front surface of the body 120. In this open state, the driven projections 158 and 158 of the cover 155 elastically contact with the operation portions 169 and 169 of the state hold springs 167 and 167 at positions lower than the lower ends of the through bores 156 and 156 which are supports of rotation. Therefore, a rotational force in a direction of holding the above-described open state, i.e., the clockwise direction in FIG. 39 is applied to the cover 155, and the open state is held.

Figure 36:
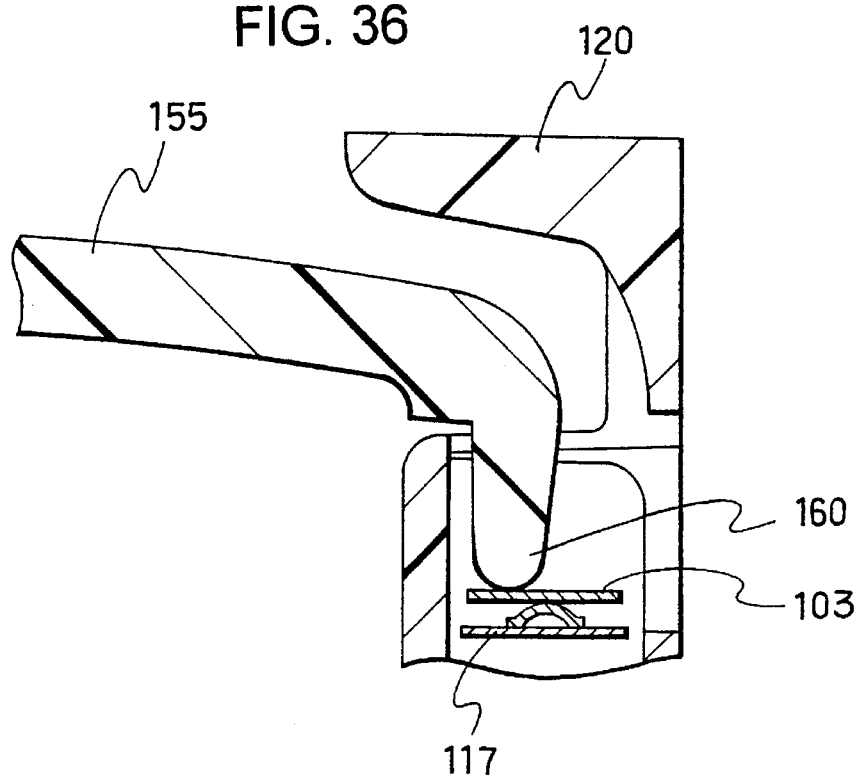
FIG. 36 is an enlarged sectional view, partly cut away, showing the state of a switch unit in the open state of the cover.
Figure 37:
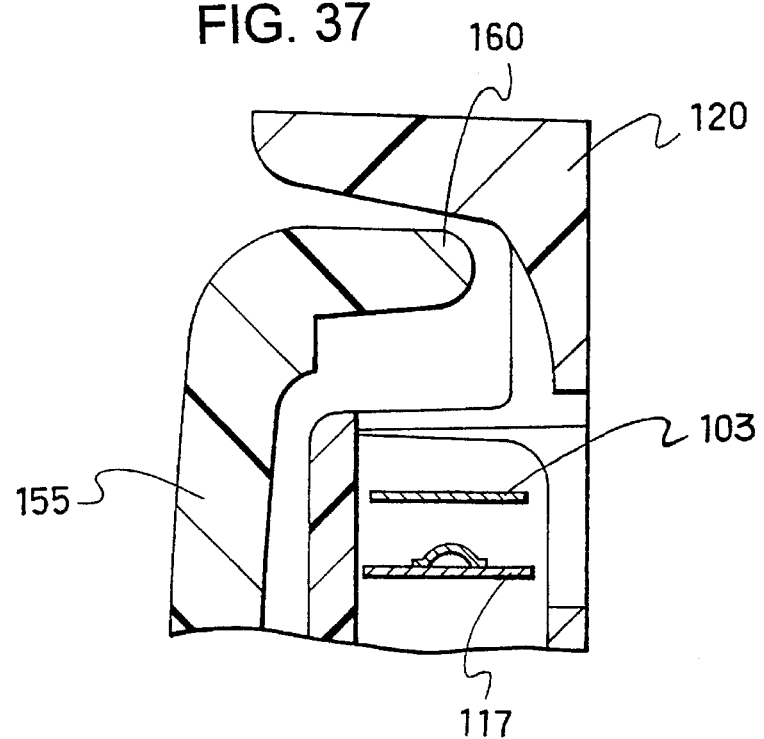
FIG. 37 is an enlarged sectional view, partly cut away, showing the state of the switch unit in the closed state of the cover.

In the closed state of the cover 155, the press projection 160 is positioned above the terminal piece 103 of the lamp body 73, and if the cover 155 is rotated into the open state, as shown in FIG. 36, the press projection 160 will push the terminal piece 103 downward. As a result, the terminal piece 103 is bent downward and the distal end of the terminal piece 103 is brought into contact with the distal end of the terminal piece 117. With this, a closed path of power supply—one female terminal 133—male terminal 115'—contact piece 114—central piece 113—connection piece 116—terminal piece 117—terminal piece 103—connection piece 104—mouthpiece holder 102—tubular bulb 42—mouthpiece holder 88—reflector portion 87—connection piece 89'—male terminal 90'—another female terminal 133'—power supply is formed and the tubular bulb 42 is lit.

If the tubular bulb 42 is lit, the light will be emitted forward, but since a relatively large reflector portion 87 is to the rear side of the tubular bulb 42, the light of the tubular bulb 42 is effectively emitted forward by the reflector portion 87. Particularly, since the inclined portions 94 and 94' have been formed in the reflector portion 87, the light to be emitted upward or downward is effectively emitted forward. In addition, the reflector portion 87 functions as a heat intercepting plate for protecting the main body 74 from the heat generated as the tubular bulb 42 is lit and also functions as a light shielding plate for preventing the light of the bulb 42 from transmitting through the main body 74.

Reference numerals 171 and 171 (FIGS. 17 and 28) denote buffer stoppers made of rubber. Each buffer stopper 171 is integrally formed with a round engagement head portion 172 and a mounting leg portion 173 extending rearward from the rear surface of the head portion 172. The mounting leg portion 173 is so formed as to be reduced in diameter as it extends toward the lower end thereof. Between the head portion 172 and the mounting leg portion 173 there is formed an annular groove 174.

Reference numerals 175 and 175 denote mounting bores, which are formed in the right and left end portions of the lower end portion of the body 120. The mounting leg portion 173 of the above-described buffer stopper 171 is inserted from the front side into the mounting bore 175. Since the front end portion of the mounting leg portion 173 is larger than the bore diameter of the mounting bore 175, the mounting leg portion 173 is inserted into the mounting bore 175 by pulling the rear end portion of the mounting leg portion 173 rearward and deforming the front end portion. As a result, the annular groove 174 of the mounting leg portion 173 is engaged with the opening end of the mounting bore 175. The buffer stopper 171 and 171 are mounted in the body 120 in this way, and the mounting leg portions 173 and 173 are cut except the front end portions. As a result, an amount of rearward projection can be reduced.

If the rotation of the cover 155 passes a certain position when the cover 155 is closed, a rotational force toward the closed position will be applied to the cover 155 by the state hold springs 167 and 167, so that there is the possibility that the cover 155 runs into the body 120 and causes an occurrence of noise. However, in the above-described vanity mirror 119, since the lower end portion of the cover 155 is brought into contact with the head portions 172 and 172 of the buffer stoppers 171 and 171 and buffered, an occurrence of noise can be prevented.

Next, a method of manufacturing the above-described lamp body 73 for vanity mirrors will be described.

First, a contact set continuum comprising a plurality of contact sets each including three contacts 75, 76, and 77 and two reinforcement pieces 78 and 79 is formed.

Figure 40:
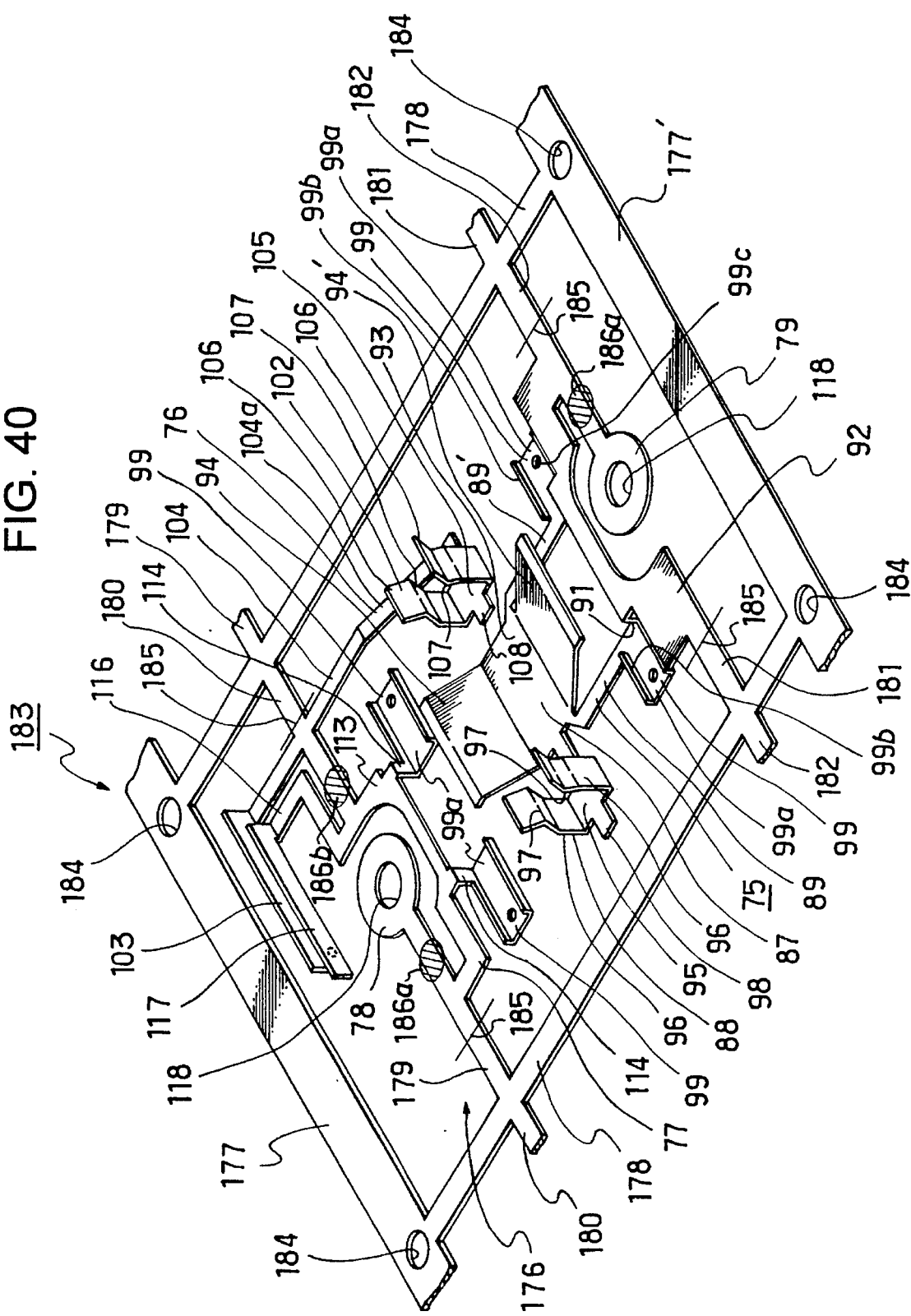
FIG. 40 is an enlarged perspective view showing a contact set continuum.

FIG. 40 shows one contact set 176.

Reference numerals 177 and 177' denote base bands which are spaced and extend in parallel to each other, and reference numerals 178 and 178 (only two are shown) denote narrow partition frame bands which are laterally spaced and extend between the base bands 177 and 177'. One contact set 176 is formed within a space defined by the two partition frame bands 178, 178 and the base bands 177, 177'.

Reference numeral 179 denotes a connecting band portion extending from the position toward the base band 177 at the right edge of the upper portion of the partition frame band 178. The right end of the connecting band portion 179 is connected to the left end of the reinforcement piece 78. The intermediate portion of the connecting band portion 179 is connected to the left end portion of the central portion 113 of the contact 77.

Reference numeral 180 denotes a connecting band portion extending from the position toward the base band 177 at the left edge of the upper portion of the partition frame band 178. The left end of the connecting band portion 180 is connected to the right end of the central portion 113 of the contact 77. The intermediate portion of the connecting band portion 179 is connected to the upper end portion of the connect piece 104 of the contact 76.

Reference numeral 181 denotes a connecting band portion extending from the position toward the base band 177' at the right edge of the lower portion of the partition frame band 178. The right end of the connecting band portion 181 is connected to the left end of the reinforcement portion 92 of the contact 75.

Reference numeral 182 denotes a connecting band portion extending from the position toward the base band 177' at the left edge of the lower portion of the partition frame band 178. The left end of the connecting band portion 182 is connected to the right end of the reinforcement piece 79. The intermediate portion of the connecting band portion 182 is connected to the right end of the reinforcement portion 92 of the contact 75.

A plurality of contact sets 176 (only one is shown) are laterally formed and constitute a contact set continuum 183.

Although in FIG. 40 the contacts 75, 76, and 77 and the reinforcement pieces 78 and 79 have already been shaped by press molding, a prototype contact set continuum comprising a plurality of prototype contact sets is first formed by blanking unnecessary portions out of a sheet material, as in the case of the first embodiment. Thereafter, a contact set continuum 183 such as that shown in FIG. 40 is formed by press molding. Reference numerals 184, 184, 184 and 184 are guide bores formed in the base bands 177 and 177' which are used for alignment in press molding.

The above-described contact set continuum 183 is inserted so that one of the contact sets 176 is positioned in the molding die for the main body of a forming machine, and a resin for the main body is injected into the molding die for the main body, so that there is formed a lamp body 73 in which the main body 74 made of a resin and the contact set 176 are integrally formed. The formation of the lamp body 73 is made in sequence for each contact set 176 of the contact set continuum 183, thereby forming a lamp body continuum 65 (not shown) in which a plurality of lamp bodies 73 are continuously connected.

And, each of the lamp bodies 73 is cut off from the above-described lamp body continuum to form a plurality of lamp bodies. The cutting of the lamp bodies 73 is performed at 185, 185, 185, and 185 of the connecting band portions 179, 180, 181, and 182. The cutting points 185, 185, 185, and 185 are located in the groove portions 86, 86, 86, and 86 of the side walls 85 and 85 of the main body 74 and along the inner surfaces of the groove portions. With this arrangement, the cutting becomes easy and no cut ends project from the side walls of the main body 74.

At the same time as the above-described cutting, the connecting band portions 179, 180 and 182 are cut at the positions shown by 186a, 186a, and 186b. As a result, the contact 75 and the reinforcement piece 79 are separated, the contacts 76 and 77 are separated, and the contact 77 and the reinforcement piece 78 are separated. At the time of the above-described cutting, the cut-out bores 82, 82, and 82 are also formed.

The above-described constitution has adopted a power feeding method by terminals and cords, but if cutting is not performed at the positions 186a and 186a, this structure can also feed power via the reinforcement pieces 78 and 79 by screw connection using screws having conductivity, as in the above-described first embodiment.

Figure 41:
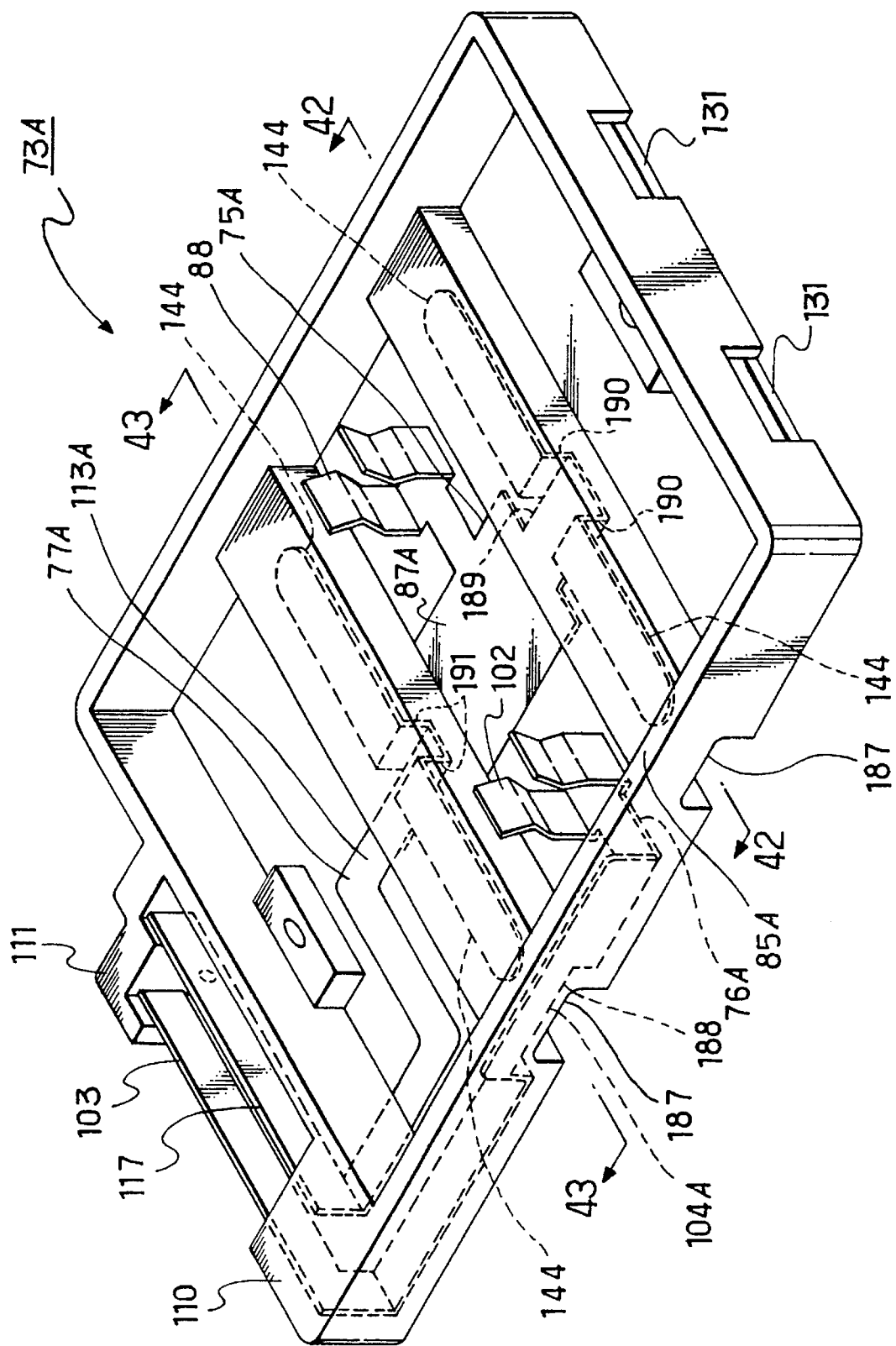
FIG. 41 is an enlarged perspective view showing a modification of the lamp body for vanity mirrors according to the second embodiment.
Figure 42:
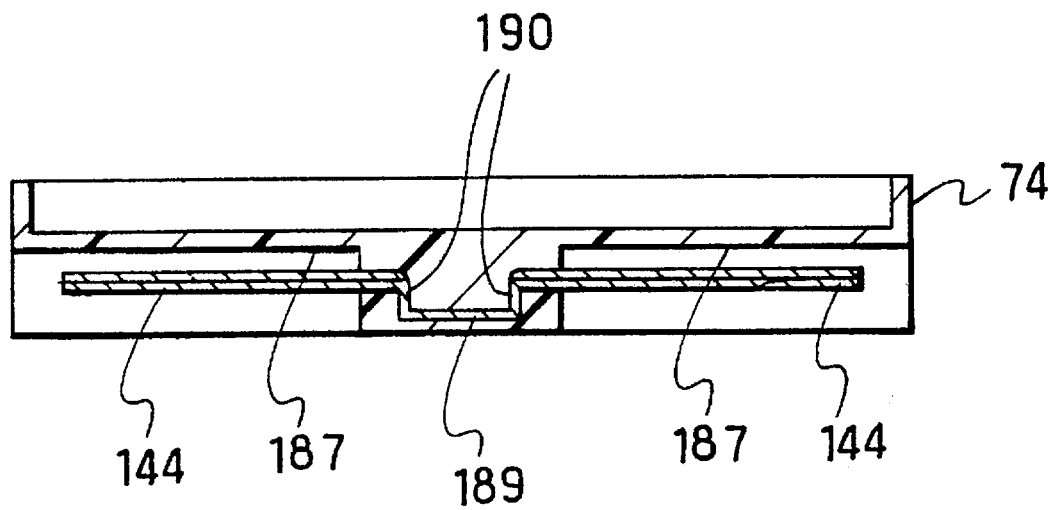
FIG. 42 is a sectional view taken substantially along the line 42—42 of FIG. 41.
Figure 43:
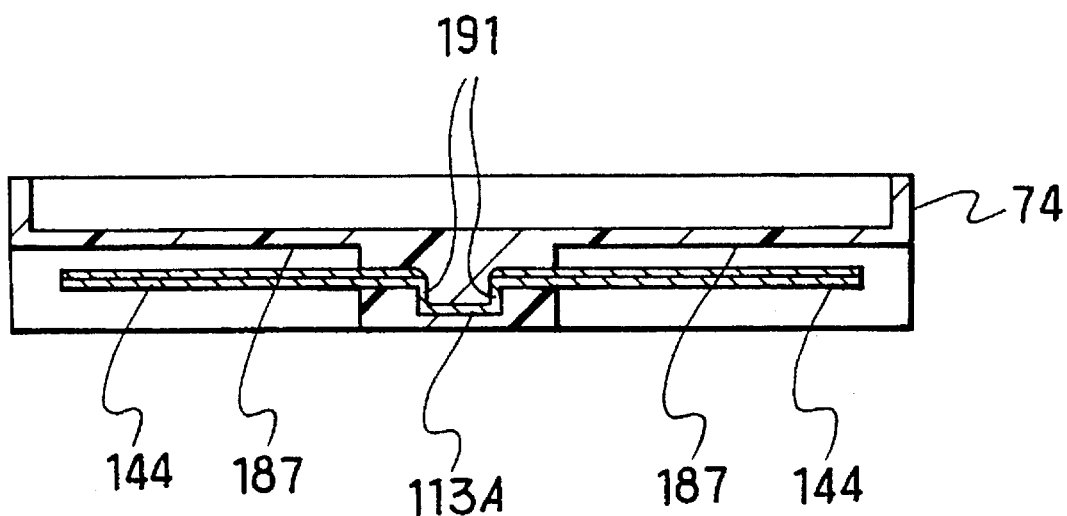
FIG. 43 is a sectional view taken substantially along the line 43—43 of FIG. 41.
Figure 44:
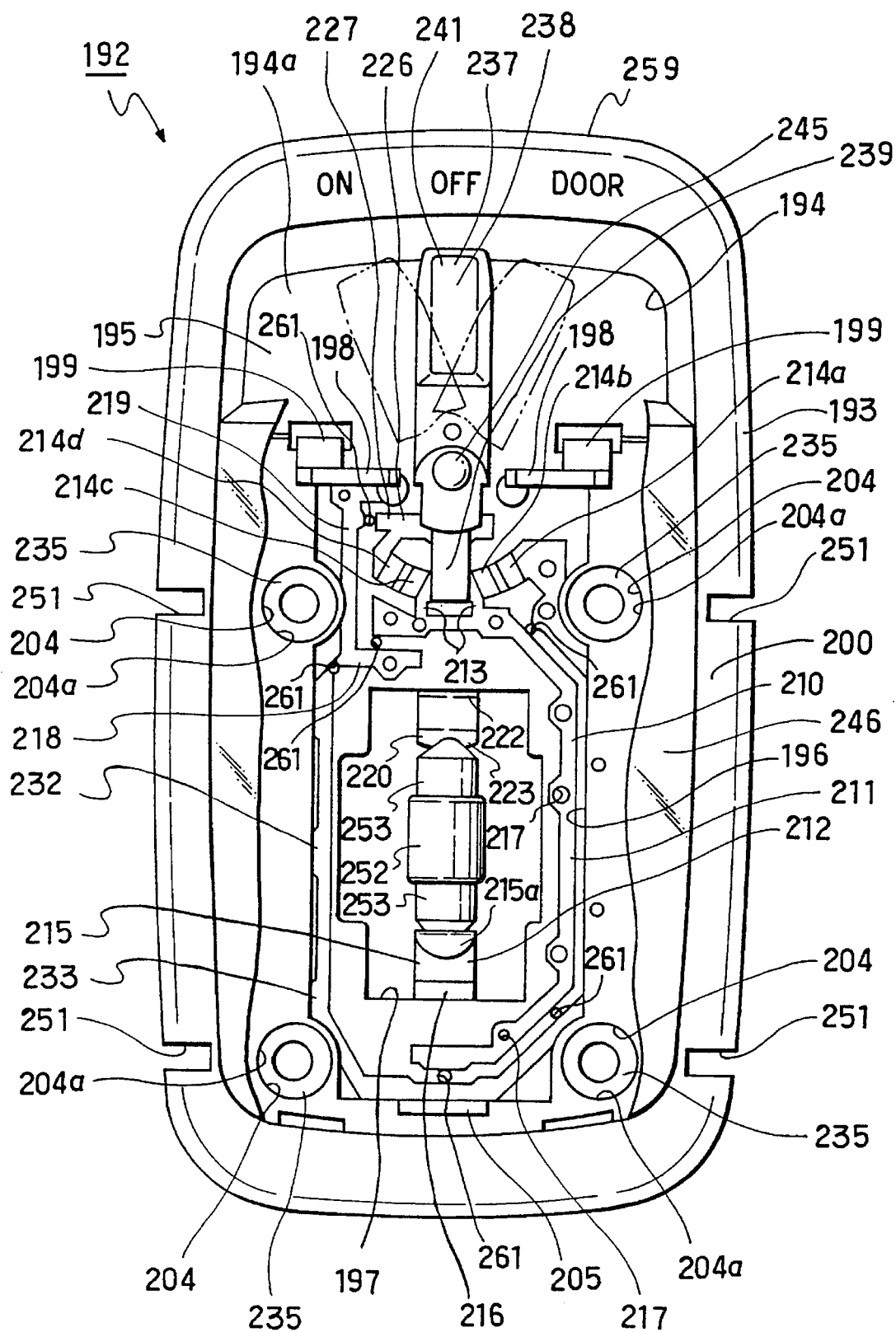
FIG. 44 shows, together with FIGS. 45 through 61, a third embodiment of the invention in which the synthetic resin part integrally formed with metal members and the manufacturing method thereof are applied to a lamp body of a room lamp and a manufacturing method thereof, and is an enlarged front elevational view showing the room lamp, part of the lens of the room lamp being removed.
Figure 45:
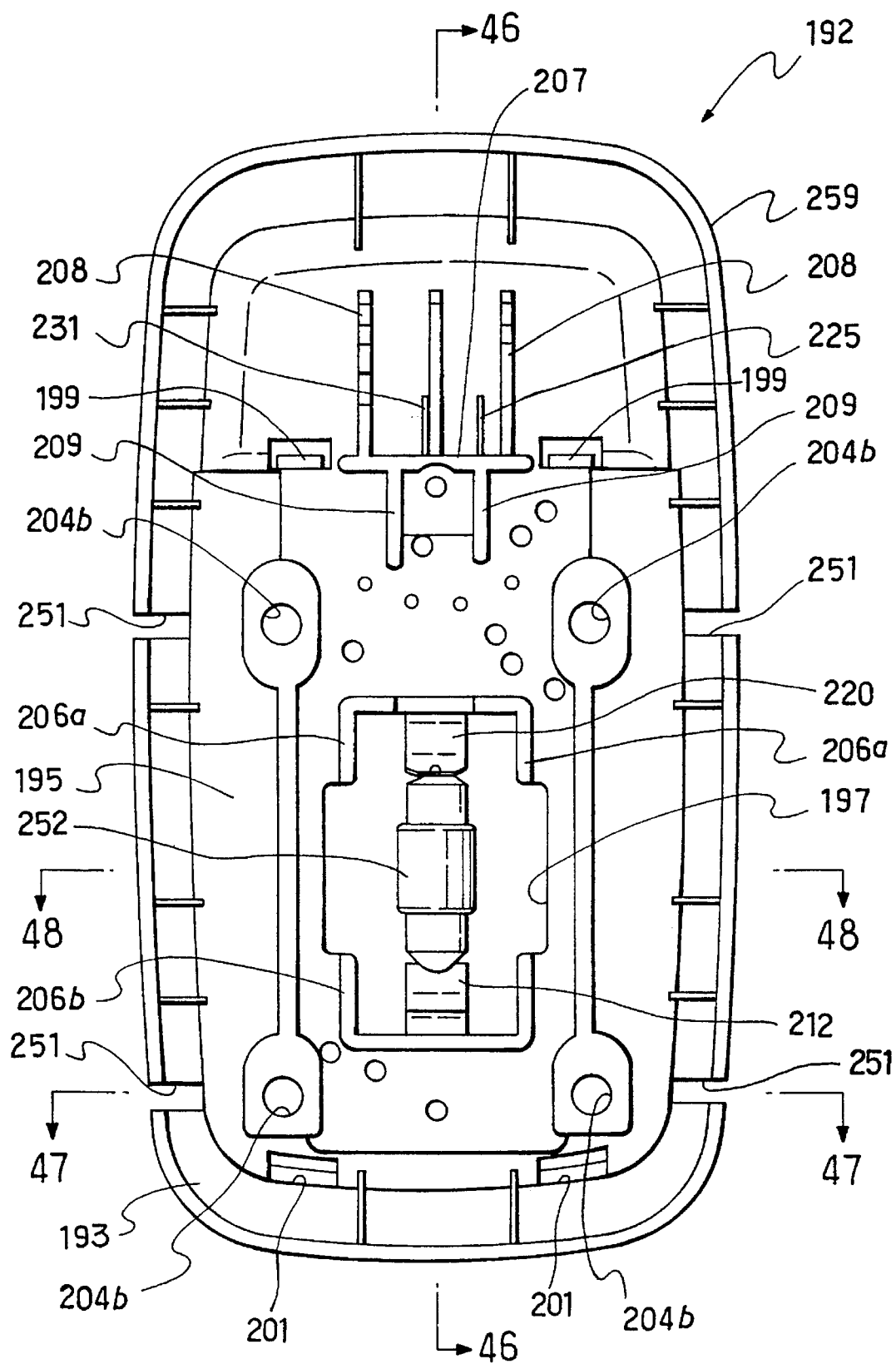

FIGS. 41 through 43 show a modification of the lamp body 73A in the above-described embodiment.

In the lamp body 73, while the male terminals 90, 90', 115, and 115' have projected from the inner ends of the opening portions 84, 84, 84, and 84 open to the side surfaces, front surface, and rear surface of the main body, in this lamp body 73A the male terminals project from the inner ends of recess portions 187, 187, 187, and 187 open to the side surfaces and rear surface of the main body. With this arrangement, the male terminals are not exposed when looking at the front and the lamp body 73A is made more attractive in appearance.

For the male terminals, there have been adopted the male terminals 144, 144, 144, and 144 shown in FIG. 25 of the type in which a required plate thickness is obtained by folding back. It is a matter of course that the male terminal of the type shown in the first embodiment may be used or the male terminal 148 of the type shown in FIG. 26 may be used.

Part of a connection piece 104A of a contact 76A is formed into a U-letter shape so that it can be buried along the recess portion 187 of the side wall 85A.

A contact 75A consists of a reflector portion 87A formed into a large flat rectangular shape, a connection piece 189 projecting downward from the lower end of the reflector portion 87A, and rising pieces 190 and 190 projecting forward from the opposite ends of the connection piece 189. The male terminals 144 and 144 extend leftward and rightward from the front ends of the rising pieces 190 and 190.

A contact 77A consists of a vertically elongated central piece 113A and rising pieces 191 and 191 projecting forward from the lower opposite ends of the central piece 113A. The male terminals 144 and 144 extend leftward and rightward from the front ends of the rising pieces 191 and 191.

FIGS. 44 through 61 illustrate a third embodiment of the synthetic resin part integrally formed with metal members and of the method of manufacturing a synthetic resin part integrally formed with metal members. This third embodiment applies the present invention to a lamp body for room lamps and a manufacturing method thereof.

Reference numeral 192 denotes a room lamp and 193 a main body thereof.

The main body 193 is made of a synthetic resin and provided with a shallow dish-shaped main portion 195 having a forwardly open recess portion 194.

In the laterally central portion of the main portion 195 except the upper end portion thereof, there is further formed a shallow recess portion 196 formed with a vertically elongated opening 197.

The upper end portion 194a of the recess portion 194 is slightly deeper than the remaining portion of the recess portion 194. In the central portion of the boundary portion between the upper end portion 194a and the remaining portion, there are mounted a pair of laterally spaced partition walls 198 and 198.

Engagement pawls 199 and 199 project from the upper surfaces of the above-described partition walls 198 and 198, respectively. In the inner surface of the lower portion of a circumferential wall 200 surrounding the recess portion, there are formed engagement bores 201 and 201 (FIG. 50) laterally spaced.

Between the partition walls 198 and 198 there is formed a mounting bore 202 (FIGS. 46 and 53) passing through the recess portion 196 in the fore-and-aft direction of the main body.

At positions of the recess portion 196 slightly lower than the partition walls 198 and 918, there are formed recess portions 203*a*, 203*b*, and 203*c* (FIG. 53) which are arcuately arranged with respect to the above-described mounting bore 202. The lower opening end of each recess portions 203*a*, 203*b*, and 203*c* is formed into a convex surface.

Through bores 204, 204, 204, and 204 are formed in the vertically intermediate portions and lower end portions of the recess portion 196. Each through bore 204 consists of a front side large bore portion 204*a* and a rear side small bore portion 204*b*. The diameter of the large bore portion 204*a* is substantially two times larger than that of the small bore portion 204*b*.

A rib 205 projects from the central portion of the lower end portion of the recess portion 196.

A wall 206*a* (FIGS. 45 and 49) projects rearward from the upper end and side portions of the recess portion 197, and a wall 206*b* (FIGS. 45 and 49) projects rearward from the lower end and side portions of the recess portion 197.

A support wall 207 (FIG. 46) projects rearward from the rear surface of the main portion 195 corresponding to the central portion of the upper end of the above-described recess portion 196. Partition walls 208 and 208 (FIGS. 46 and 54) project upward from the opposite ends of the upper surface of the support member 207. Reinforcement walls 209 and 209 (FIGS. 46 and 54) project downward from the central portion of the lower surface of the support member 207.

Reference numeral 210 (FIG. 55) denotes a first contact, which is integrally formed with a connection piece 211 formed into a reverse C-letter shape when viewed from the front, a bulb hold piece 212 connected to the lower end portion of the connection piece 211, and contact portions 214*b* and 214*c* connected to the upper end of the connection piece 211 through parallel spaced connection pieces 213 and 213.

The bulb hold piece 212 is integrally formed with a V-shaped bulb hold portion 215 when viewed from the side direction and a plate-shaped base piece 216 connected to the lower end of the bulb hold portion 215. The base piece 216 is located at a position slightly away from the rear surface of the lower end of the above-described connection piece 211, and the lower end portion of the left edge is connected to the left end of the lower end portion of the connection piece 211. The bulb hold portion 215 has a bulb contact piece 215*a* at the side remote from the base piece 216. The bulb contact piece 215*a* is formed at the central portion thereof with a tapered slot 215*b*.

Each of the contact portions 214*b* and 214*c* is curved into a convex shape so that the lateral central portion thereof is disposed forward.

The connection piece 211 is formed with a plurality of small bores 217.

Figure 49:
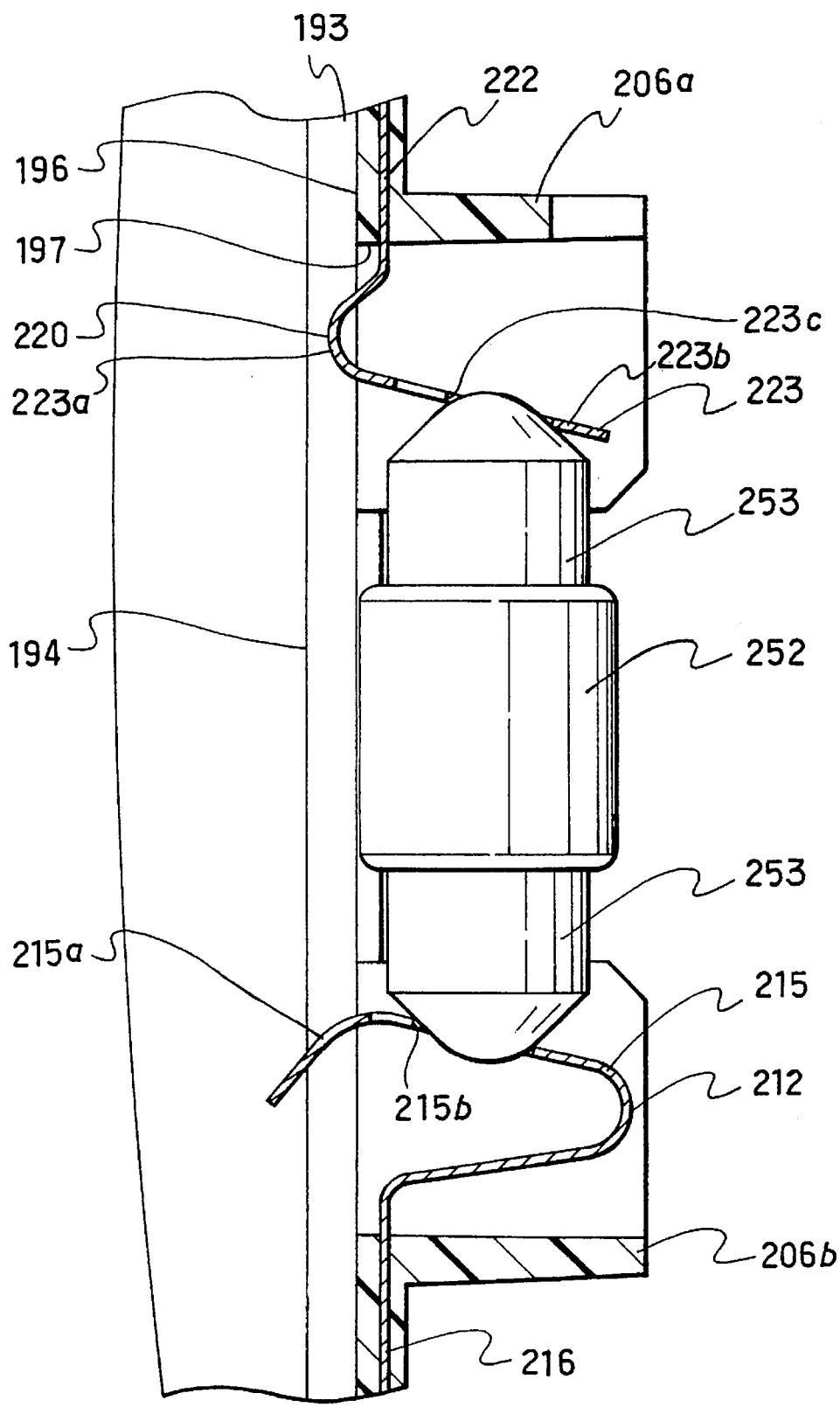
FIG. 49 is an enlarged sectional view showing a bulb holding unit.

The first contact 210 constructed as described above is integrally coupled to the above-described main body 193 by so-called insert molding. The base piece 216 of the bulb hold piece 212 is buried in the central portion of the lower end portion of the main portion 195 of the main body 193 so that the bulb hold portion 215 projects from the upper surface of the wall 206*b*, as shown in FIG. 49. The connection piece 211 is exposed to the front surface of the recess portion 196. The contact portion 214*b* is so positioned as to cover the front surface of a portion between the recess portions 203*a* and 203*b*, and the contact portion 214*c* is so positioned as to cover the front surface of a portion between the recess portions 203*b* and 203*c*. The small bores 217 of the connection piece 211 are filled up with the material resin for the main body 193, thereby rectangular base piece 222 and a bulb contact piece 223 connected to the lower end of the base piece 222. The front end 223*a* of the bulb contact piece 223 is curved into a convex shape in the forward direction. A main piece 223*b* projects rearward from the lower end of the front end portion 223*a* and is formed at its central portion with a tapered slot 223*c*.

The terminal piece 221 is integrally formed with an L-shaped connection piece 224 when viewed from the side direction and an insertion piece 225 projecting upward from the rear end of the connection piece 224. The front end of the connection piece 224 is connected to the upper end of the connection piece 219.

The connection piece 219 is formed with two small bores 217.

In the second contact 218 thus constructed, the base piece 222 of the bulb hold piece 220 is buried in the main portion 195 of the main body 193 adjacent to the upper end of the opening 197, the lower portion of the base portion 222 projects downward from the upper end of the opening 197, and from that lower portion the bulb hold contact piece 223 projects rearward (FIG. 49). Therefore, within the opening 197 the two bulb contact pieces 223 and 215*a* are vertically spaced and opposed.

Figure 54:
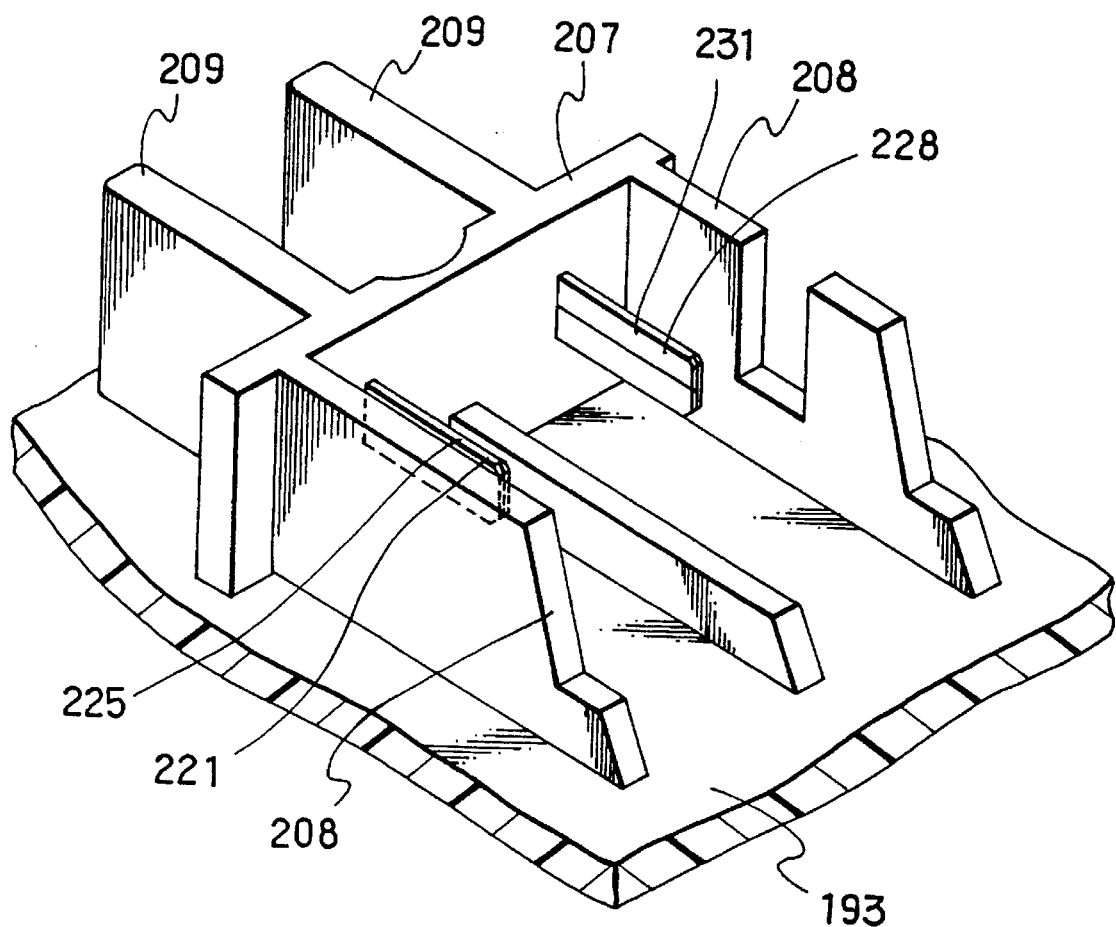
FIG. 54 is an enlarged perspective view showing a connector formed on the rear surface of the lamp body.

For the above-described terminal piece 221, the connection piece 224 is buried within the support wall 207 of the main body 193 so that the insertion piece 225 projects upward from the upper surface of the support wall 207 (FIG. 54).

The connection piece 219 is exposed to the left end portion of the upper end portion of the recess portion 196, and the small bores 217 are filled up with the material resin for the main body 193, thereby preventing the connection piece 211 from easily being separated from the main body 193.

A third contact 226 is integrally formed with a connection piece 227, a contact portion 214*d*, and a terminal piece 228.

The connection piece 227 comprises a laterally extending narrow band plate and is formed at its central portion with a small bore 217.

Figure 53:
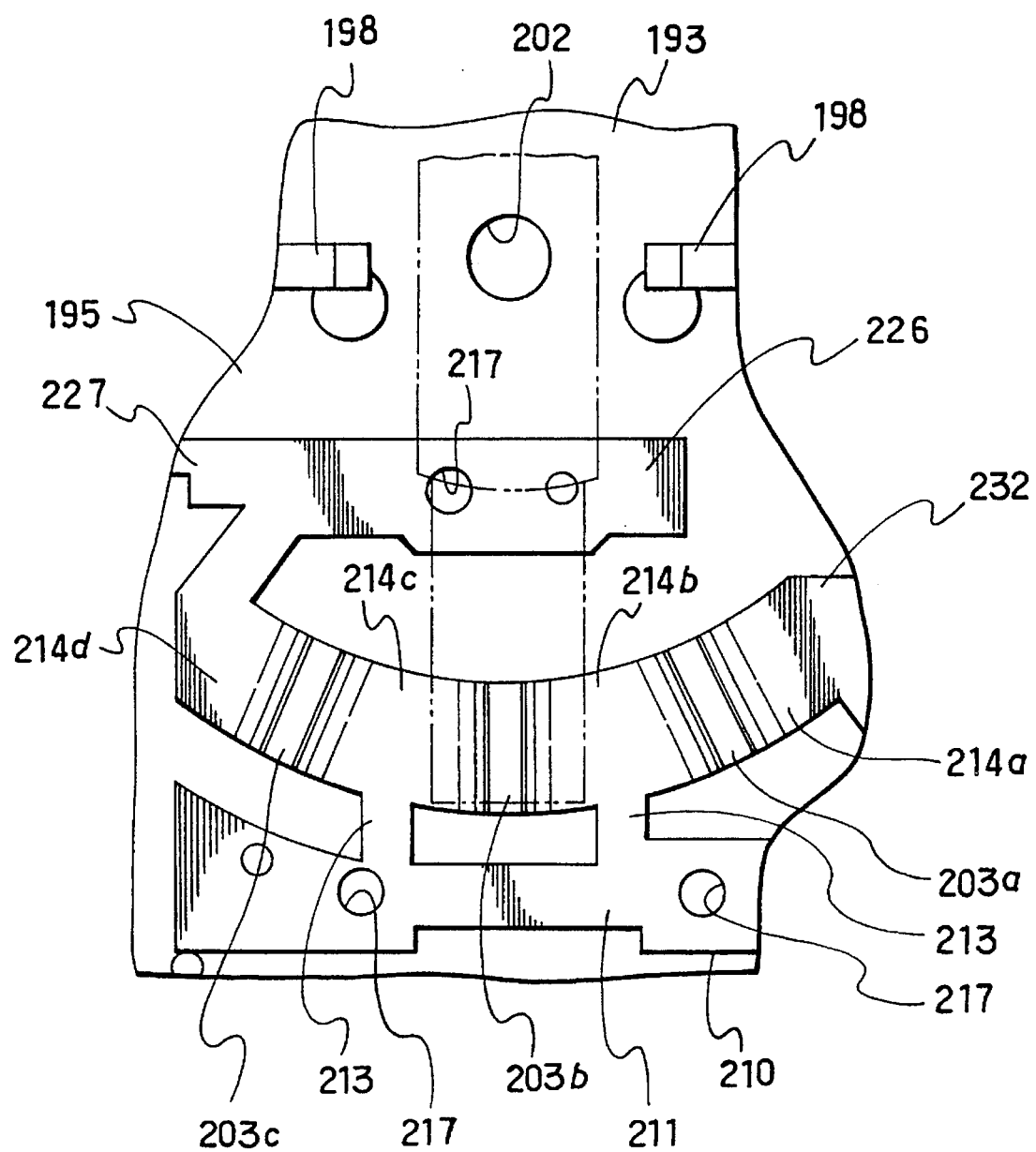
FIG. 53 is an enlarged front elevational view showing the contact of the switch.
Figure 55:
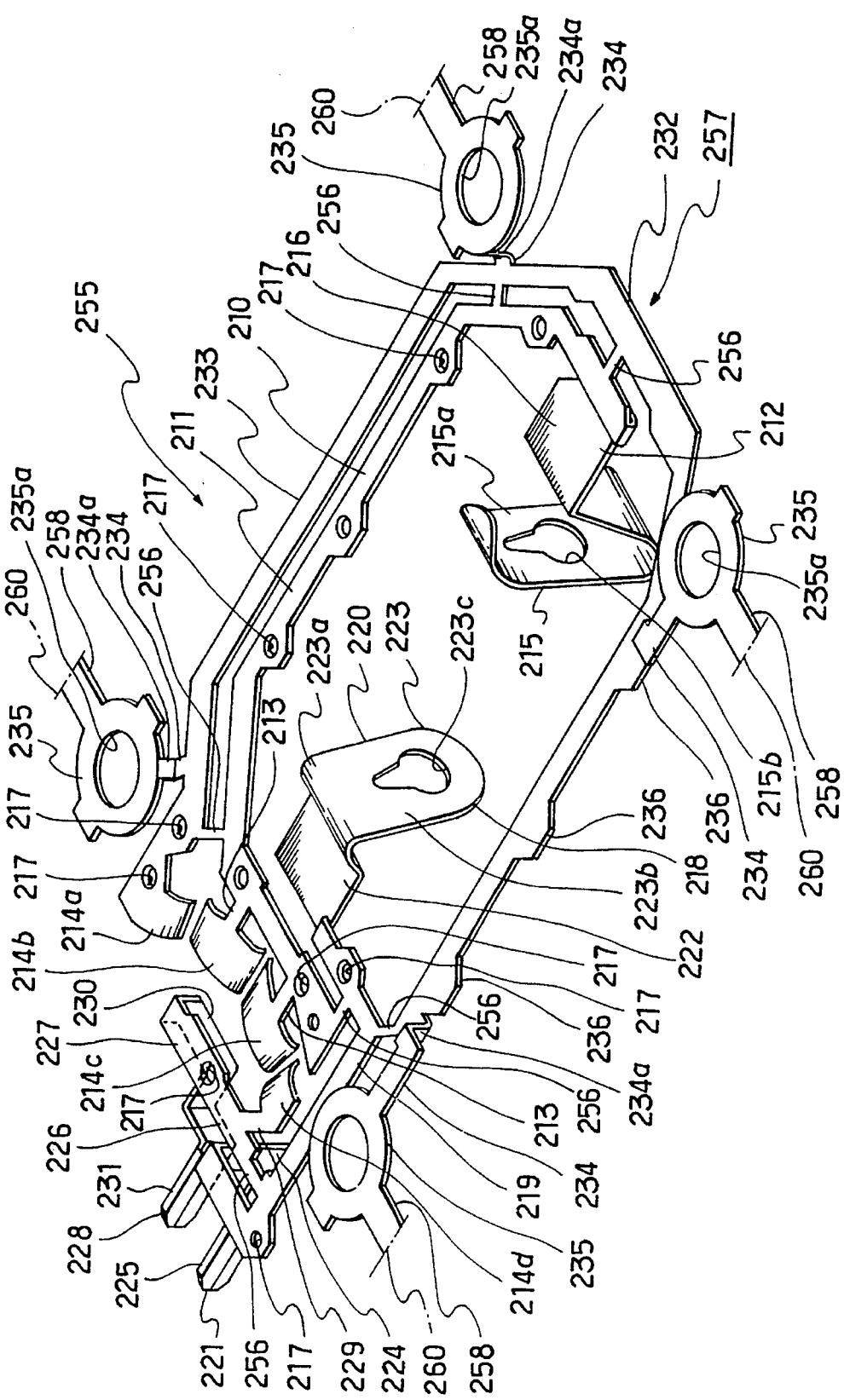
FIG. 55 is an enlarged perspective view showing a contact set continuum.

The contact portion 214*d* is curved at its right end into a convex shape, as shown in FIG. 55, and the upper end of the left end portion of the contact portion 214*d* is connected through the joint piece 229 to the lower end of the left end of the connection piece 227, as shown in FIGS. 53 and 55.

The terminal piece 228 is integrally formed with a generally L-shaped joint piece 230 when viewed from the side direction and an insertion piece 231 extending upward from the upper end of the joint piece 230. The front end of the lower end portion of the joint piece 230 is continuous to the right end of the above-described connection piece 227.

Thus, for the terminal piece 228 of the third contact 226, the joint piece 230 is buried within the reinforcement wall 209 of the main body 193 so that the insertion piece 231 projects upward from the upper surface of the support wall 207 (FIG. 54). Therefore, the two insertion pieces 225 and 231 are laterally spaced and opposed. The contact portion 214d is so positioned as to cover the left edge portion of the recess portion 203c of the main body 193, and the joint piece 229 and the connection piece 227 are exposed to the front surface of the main body 193. Then, the small bore 217 of the connection piece 227 is filled up with the material resin for the main body 193, thereby preventing the connection piece 211 from easily being separated from the main body 193.

A fourth contact 232 (FIG. 55) is integrally formed with a generally U-shaped connection piece 233 in the form of a narrow band, a contact portion 124a connected to the upper right end portion of the connection piece 233, and earth pieces 235, 235, 235, and 235 connected to the connection piece 233 through joint pieces 234, 234, 234, and 234 projecting from the upper left end portion, upper right end portion, lower left end portion, and lower right end portion of the connection piece 233. Each of the joint pieces 234, 234, and 234 is formed with a rising portion 234a to provide a step portion between the connection piece 233 and the earth piece 235.

Each earth piece 235 is formed into an annular shape having a through bore 235a. The contact portion 214a is curved into a convex shape so that the left end thereof extends rearward. The upper right end portion of the connection piece 233 is formed with small bores 217 and 217, and the upper left end portion is formed with burying pieces 236, 236, and 236.

The connection piece 233 of the fourth contact 232 is buried within the right wall of the shallow recess portion 196 of the main body 193, the earth pieces 235, 235, 235, and 235 are positioned along the peripheral portion of the recess portion 196, and the burying pieces 236, 236, and 236 are buried in the left wall of the recess portion 196. The small bores 217 and 217 of the connection piece 233 is filled up with the material resin for the main body 193, thereby preventing the connection piece 211 from easily being separated from the main body 193.

The contact portion 214a is so positioned as to cover the right edge portion of the recess portion 203a of the main body 193. Each earth piece 235 is positioned to the front surface of the large diameter portion 204a of the through bore 204 of the main body 193, and the peripheral portion of the earth piece 235 is buried within the main body 193 so that the through bore 235a of the earth piece 235 is aligned with the small diameter portion 204b of the through bore 204.

Reference numeral 237 denotes a switch knob.

The switch knob 237 consists of a mold portion 238 made of synthetic resin, and a connecting piece portion 239 integrally formed to the mold portion 238 by insert molding. The mold portion 238 consists of a thick plate-shaped main portion 240 and a grip portion 241 projecting from the upper end of the main portion 240. The main portion 240 is formed at its lower portion with a mounting bore 242 passing therethrough.

The connecting piece portion 239 is formed into a vertically elongated band plate shape with a material having conductivity and spring action. The connecting piece portion 239 is formed at its lower end portion with a contacting portion 243 projecting rearward in an arcuate shape when viewed from the upper and lower direction and at its upper end portion with a through bore 244.

And, the upper half portion of the connecting piece portion 239 is inserted from the lower end of the main portion 240 of the mold portion 238 into the grip portion 241, and the lower half portion projects downward from the lower end of the mold portion 238. And, the through bore 244 of the connecting piece portion 239 is aligned with the mounting bore 242 of the mold portion 238.

Reference numeral 245 (FIG. 46) denotes a mounting rivet, which has a head portion 245a and a leg portion 245b. The leg portion 245b is inserted into the mounting bore 242 of the switch knob 237 and further inserted into the mounting bore 202 of the above-described main body 193. The distal end portion of the rivet 245 projecting from the rear surface of the main body 193 is caulked, and the switch knob 237 is rotatably mounted on the main body 193. In this state, the contacting portion 243 of the connecting piece portion 239 is movable on and along a portion where the contact portions 214a, 214b, 214c, and 214d of the main body 193 are arcuately arranged.

As described above, in the switch knob 237, since the connecting piece portion 239 formed with a metal plate extends over the mounting bore 242, which is a support of rotation, and to the grip portion 241, there is the advantage that the entire switch knob 237 is increased in strength.

Figure 46:
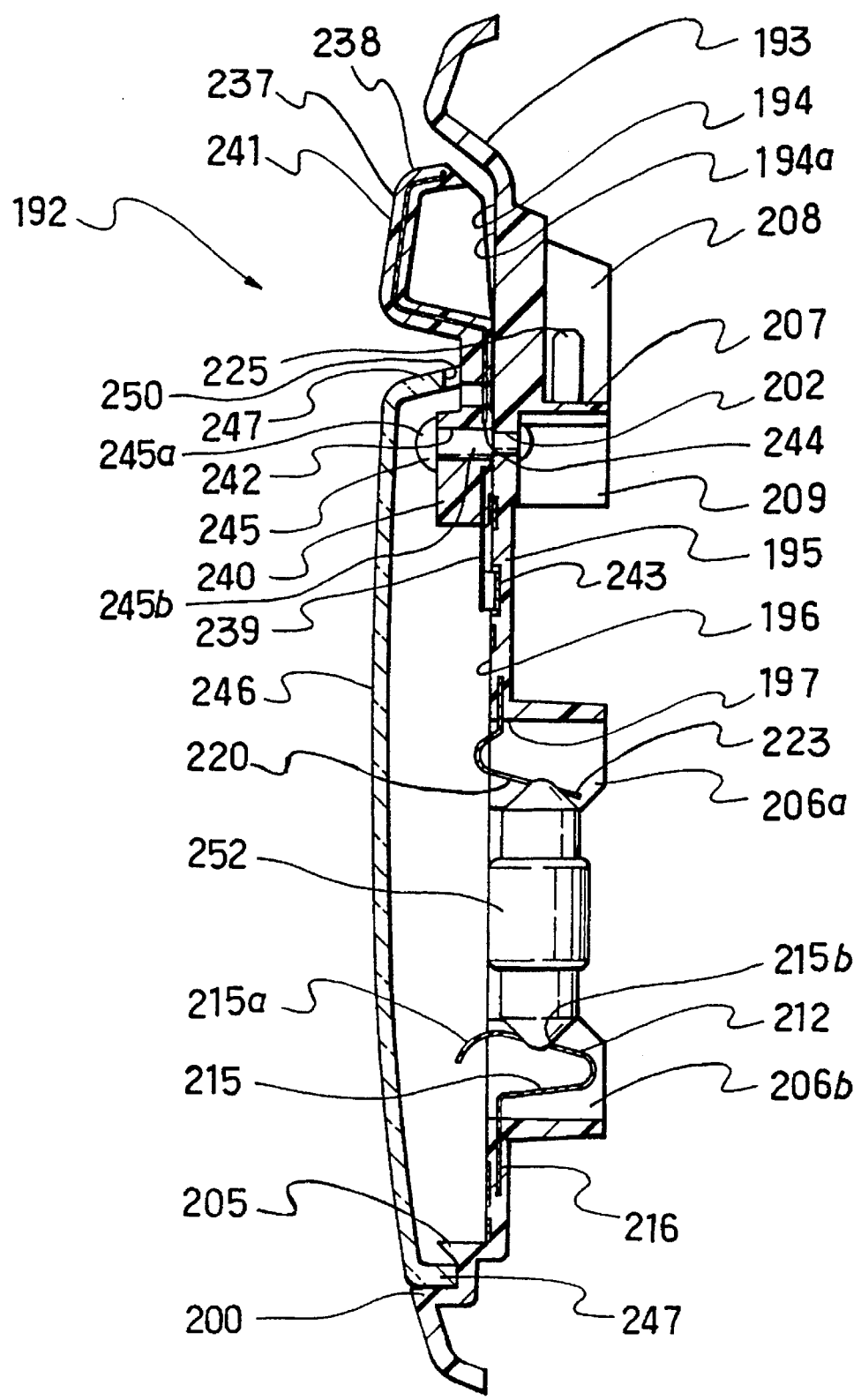
FIG. 46 is a sectional view taken substantially along the line 46—46 of FIG. 45.
Figure 47:
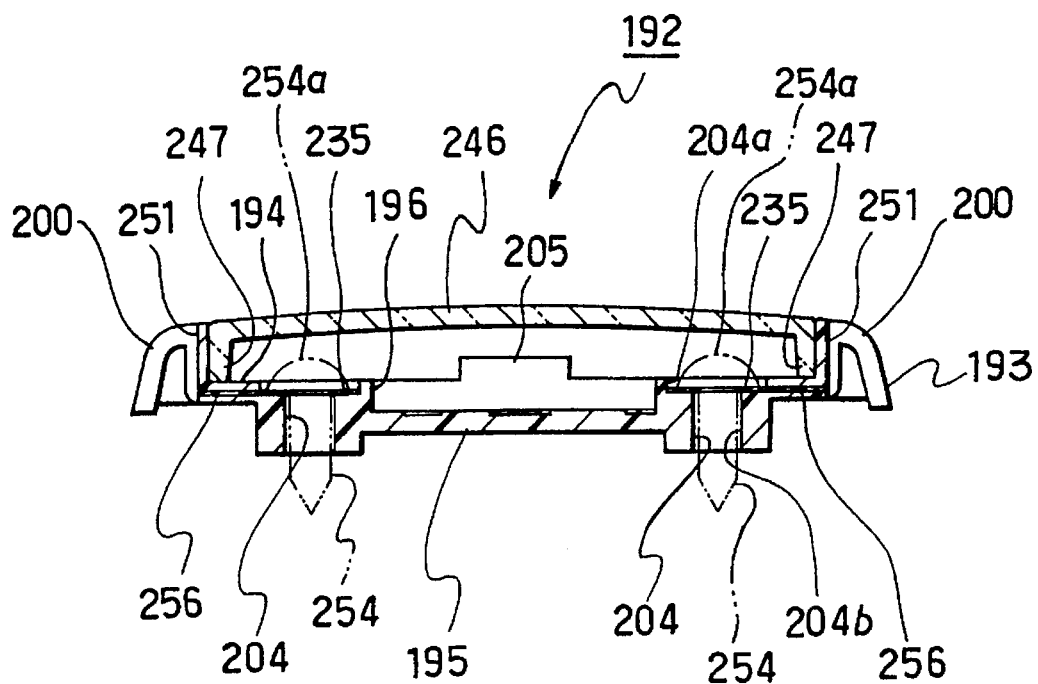
FIG. 47 is a sectional view taken substantially along the line 47—47 of FIG. 45.
Figure 48:
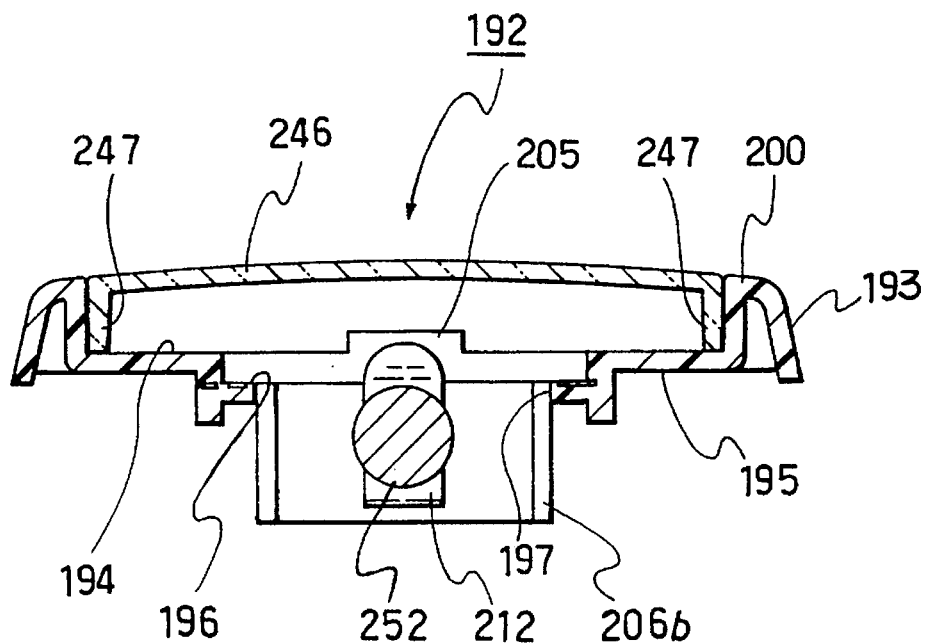
FIG. 48 is a sectional view taken substantially along the line 48—48 of FIG. 45.
Figure 50:
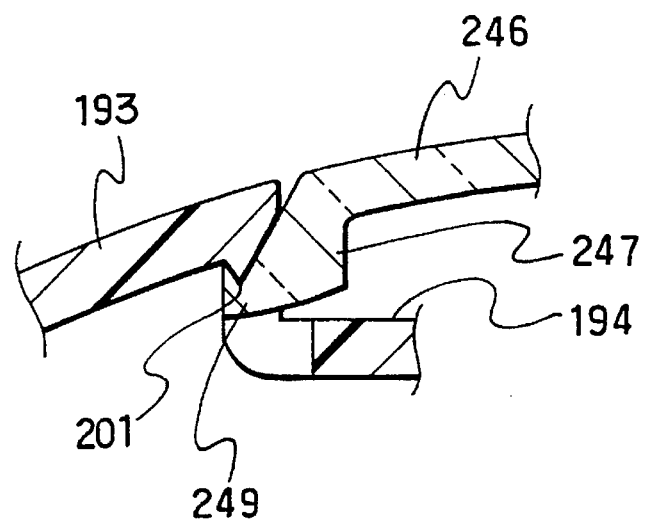
FIG. 50 is an enlarged sectional view showing an engagement portion between the lower end portion of the lens and the main body.
Figure 51:
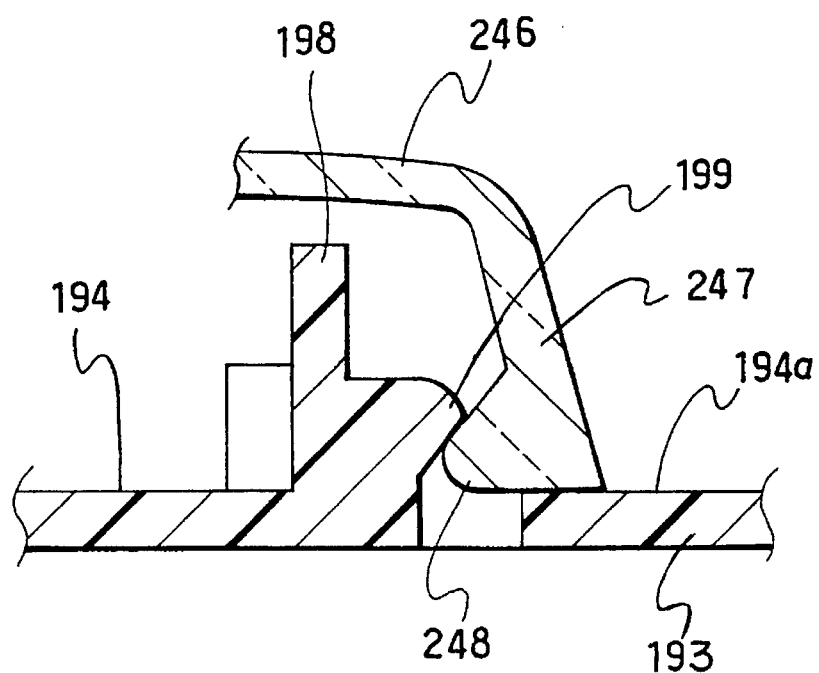
FIG. 51 is an enlarged sectional view showing an engagement portion between the upper end portion of the lens and the main body.
Figure 52:
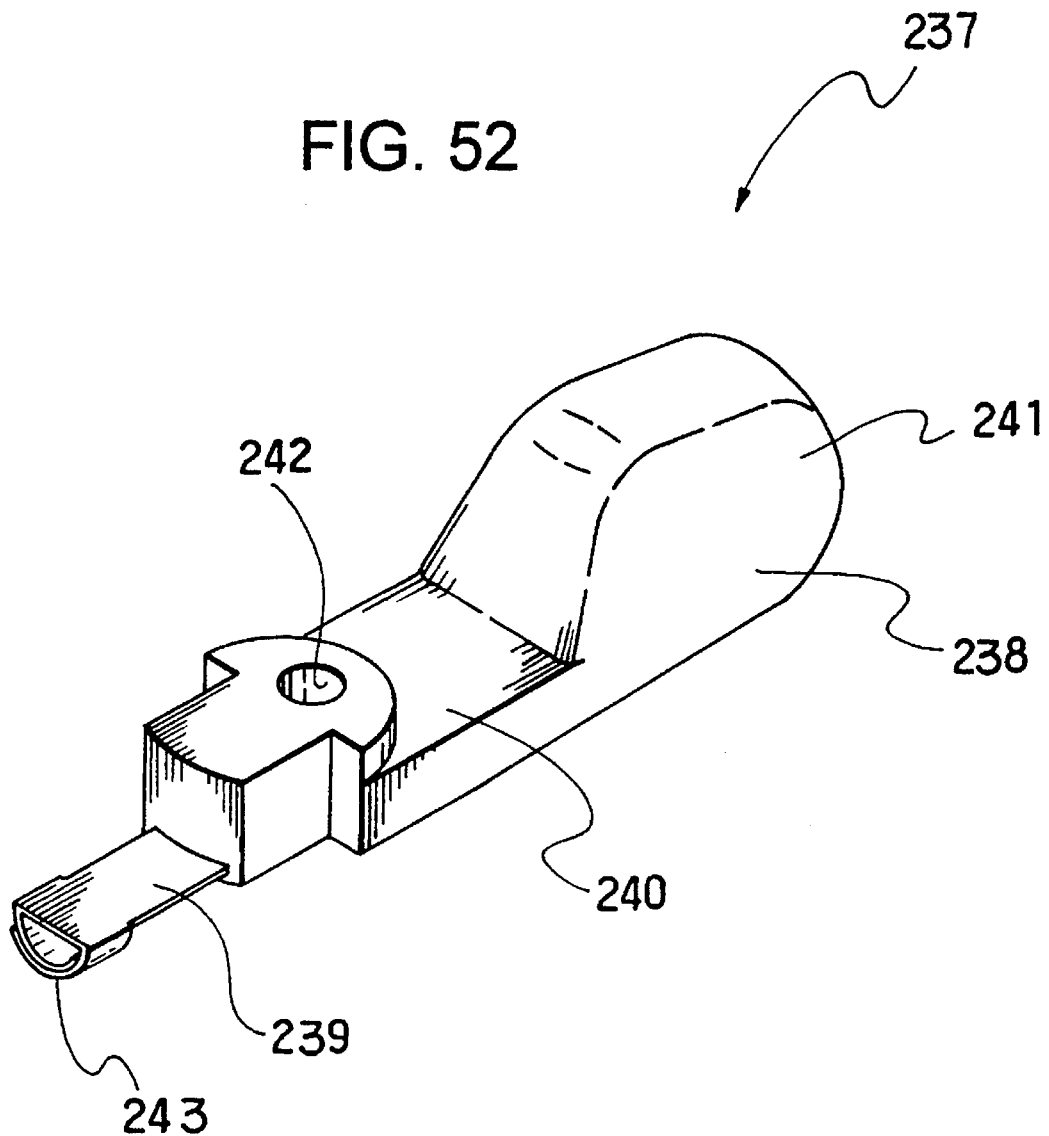
FIG. 52 is an enlarged perspective view showing a switch knob.

Reference numeral 246 denotes a lens, which is formed to have a size so that it can cover the recess portion 194 of the main body 193 from just above the partition walls 198 and 198 to the lower portion. The lens 246 is formed at the inner left and right ends of the upper portion of the peripheral wall portion 247 with engagement projections 248 and 248 (FIG. 51) and at the outer left and right ends of the upper portion of the peripheral wall portion 247 with engagement projections 249 and 249 (FIG. 50). The lower engagement projections 249 and 249 engage with the engagement bores 201 and 201 formed in the lower inner surface of the peripheral wall 200 of the main body 193. Also, the inner edge of the lower end portion of the peripheral wall portion 247 is in contact with the lower surface of the rib 205 formed in the main body 193, as shown in FIG. 46. Further, the upper engagement projections 248 and 248 formed in the upper end portion of the peripheral wall portion 247 engage with the engagement pawls 199 and 199 formed on the upper surface of the partition wall 198 and 198 of the main body 193, as shown in FIG. 51. In this way, the lens 246 is attached to the main body 193.

The above-described switch knob 237 passes through an opening portion 250 formed in the central portion of the upper end portion of the peripheral wall portion 247 of the lens 246, and the grip portion 241 projects from the lens 246.

Reference numerals 251, 251, 251, and 251 denote groove portions formed in the right and left side walls of the main body 193.

Before attaching the lens 246 to the main body 193, a bulb 252 is supported with the mouthpiece portions 253 and 253 thereof engaged with the tapered slots 215b and 223c of the bulb contact pieces 215a and 233.

Further, before attaching the lens 246 to the main body 193, mounting screws 254, 254, 254, and 254 formed with a material having conductivity are inserted from the front side into the through bores 204, 204, 204, and 204 and screwed into the structure members (not shown) of an automobile. Then, the head portion 254a of each mounting screw 254 comes in contact with the earth piece 235 of the fourth contact 232, and at least one of the structure members into which the mounting screw 245 is screwed has conductivity. Therefore, the fourth contact 232, i.e., the contact portion 214a becomes to have a ground level. Note that since the number of earth pieces 235 is four, any one of them can be connected to ground, so that this embodiment gives high flexibility with respect to a place of installation.

And, a connector (not shown) provided on the vehicle side is connected to the above-described insertion pieces 225 and 231. Therefore, the insertion piece 225 is connected to a power supply and the insertion piece 231 is connected through a door switch (not shown) to ground. That is, the bulb contact piece 223 is connected to the power supply and the contact portion 214d is connected through the door switch to ground.

Therefore, when the switch knob 237 is in its neutral position where the contacting portion 243 of the knob 237 is in contact with the contact portions 214b and 214c, the bulb 252 will not light because one mouthpiece portion 253 of the bulb 252 has been connected to the power supply but the other mouthpiece portion 253 has not been connected to ground. If the switch knob 237 is inclined from the above-described neutral position to one side and the contacting portion 243 of the knob 237 is in contact with the contact portions 214a and 214b, the other mouthpiece portion 253 will be connected to ground and the bulb 252 will light. If, on the other hand, the switch knob 237 is inclined from the neutral position in the opposite direction position and the contacting portion 243 of the knob 237 contacts with the contact portions 214c and 214d, the bulb 252 will not light when the door is in the closed state (because the other mouthpiece portion 253 is not connected to ground), whereas if the door is opened and the door switch is closed, the other mouthpiece portion 253 will be connected to ground and the bulb 252 will light.

At this time, since the contacting surface of the contacting portion 243 of the switch knob 237 is formed into a convex surface and the contact portions 214a, 214b, 214c, and 214d are also curved, an operator will be able to know that the switch knob 237 has reached a predetermined position (there is a feeling of click). In addition, the switch knob 237 can reliably be held in a predetermined position. Further, the switch knob 237 can be inclined smoothly.

Next, a method of manufacturing the above-described room lamp 192 will be described.

First, there is formed a contact set continuum comprising a plurality of contact sets each including four contacts 210, 218, 226, and 232.

FIG. 55 shows one contact set 255.

From a metal plate with conductivity, the contacts 210, 218, 226, and 232 are integrally formed by the connecting band portions 256, 256, 256, and 256 of narrow width.

In FIG. 55, the contacts 210, 218, 226, and 232 are shown in the state that they have already been shaped by press molding, a prototype contact set continuum comprising a plurality of prototype contact sets is first formed by blanking unnecessary portions out of a sheet material, as in the case of the first embodiment. Thereafter, a contact set 255 such as that shown in FIG. 55 is formed by press molding.

Then, in the state in which the contacts have been formed as the contact set 255, the bulb hold piece 212 of the first contact 210 has been folded rearward with respect to the connection piece 211 so that the bulb contact piece 215a of the bulb hold piece 212 is vertically opposed to the other bulb contact piece 223. If such structure is not adopted and a prototype bulb hold piece and, at the time of blank-molding, a prototype bulb contact piece are arranged in the fore-and-aft direction, the vertical lengths of them will become longer and they will overlap. Therefore, at the time of blank-molding they are laterally shifted with each other, and at the time of press molding, in the above example the bulb hold piece 212 is folded with respect to the connection piece 211 so that the bulb contact piece 215a of the bulb hold piece 212 is vertically opposed to the bulb contact piece 223.

When attaching or detaching the bulb 252, the bulb hold pieces 212 and 220 will not be separated from the main body 193 because the base pieces 216 and 222 of the bulb hold pieces 212 and 220 have been buried in the main body 193.

In addition, since four earth pieces 235 are disposed at four positions and connected by the connection piece 233 to form a frame structure, the strength of the contact set 255 is increased and it is not deformed easily during handling. Further, since each joint piece 234, which connects the earth piece 235 and the connection piece 233, is formed with the rising portion 234a, the position of the earth piece 235 can easily be adjusted by adjusting the bending angle of the rising portion. In addition, the rising portion 234a absorbs the contraction after the injection of the resin for molding the main body 193 and fulfills a function of preventing the fatal deformation of the contact 232.

And, a plurality of such contact sets 255 (not shown) are formed to form the contact set continuum 257. The contact set continuum 257 is made by connecting the earth pieces 255 of adjacent contact sets 255 by coupling bands 258.

The above-described contact set continuum 257 is inserted so that one of the contact sets 255 is positioned in the molding die for the main body of a forming machine, and a resin for the main body is injected into the molding die for the main body, so that there is formed a lamp body 259 in which the main body 193 made of the resin and the contact set 255 are integrally formed. The formation of the lam body 259 is made in sequence for each contact set 255 of the contact set continuum 257, thereby forming a lamp body continuum (not shown) in which a plurality of lamp bodies 259 are continuously connected.

And, in the lamp body 259, since most of the base piece 216 of the bulb hold piece 212 and most of the base piece 222 of the bulb hold piece 220 are buried in the material resin of the main body 193, the bulb hold pieces 212 and 220 are increased in strength and can stand a large force which is produced when attaching or detaching the bulb 252.

And, each of the lamp bodies 259 is cut off from the above-described lamp body continuum to form a plurality of lamp bodies 259. The cutting of the lamp bodies 259 is performed at 260, 260, 260, and 260 of the coupling bands 258, 258, 258, and 258. The cutting points 260, 260, 260, and 260 are located in the groove portions 251, 251, 251, and 251 of the outer side walls of the main body 193 and along the inner surfaces of the groove portions. With this arrangement, the cutting becomes easy and no cut ends project from the side walls of the main body 193.

At the same time as the above-described cutting, cut-out bores 261 of the main portion 195 of the main body 193 are formed, and by formation of the cut-out bores, the connecting band portions 256 by which the contacts 210, 218, 226, and 232 are connected is cut. With this, the contacts 210, 218, 226, and 232 are electrically isolated from one another.

FIGS. 56 through 61 show modifications of the switch knob in the above-described room lamp 192 and of the mounting thereof.

Figure 56:
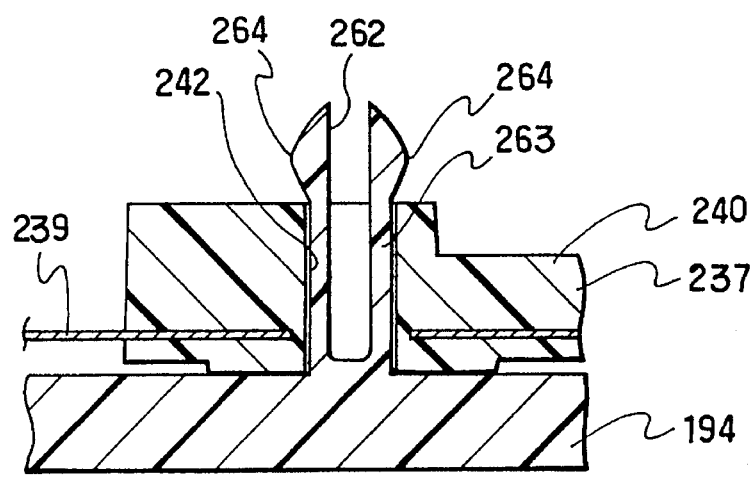
FIG. 56 is an enlarged sectional view, partly cut away, showing a modification of the switch knob and the mounting of the knob.

In the modification shown in FIG. 56, a mounting pin 263 with a slit 262 projects from the main body 193 and reaches the front end of the main body 193. The mounting pin 262 is inserted into a mounting bore 242 of a switch knob 237, and the engagement projections 264 and 264 of the mounting pin 263 are engaged with the front open edge of the mounting bore 242 so that the switch knob 237 can be rotatably supported on the main body 193.

Figure 57:
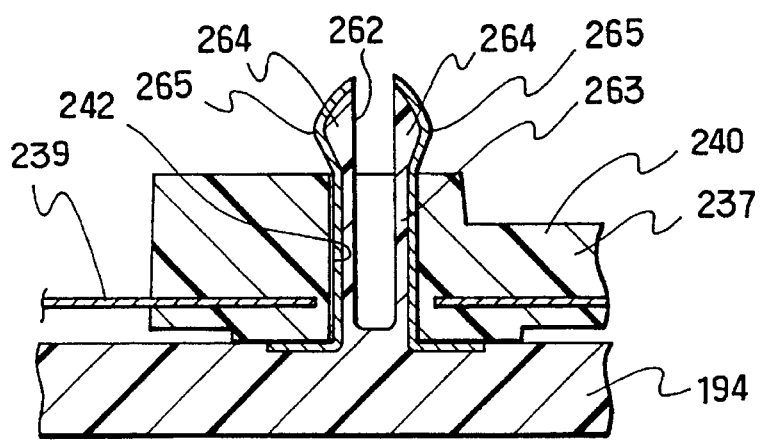
FIG. 57 is an enlarged sectional view, partly cut away, showing another modification of the switch knob and the mounting of the knob.

In the modification shown in FIG. 57, the surface of the mounting pin 263 shown in FIG. 56 is covered with metal plates 265 and 265 integrally formed in the main body 193 by insert molding.

Figure 58:
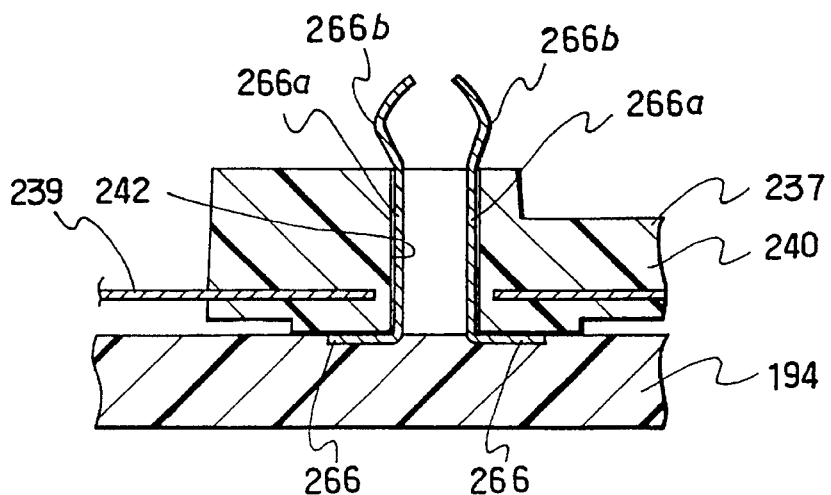
FIG. 58 is an enlarged sectional view, partly cut away, showing still another modification of the switch knob and the mounting of the knob.

In the modification shown in FIG. 58, generally L-shaped metal plates 266 and 266 are integrally formed in the main body 193 by insert molding. The projected portions 266a and 266a of the metal plates 266 and 266 are inserted into a mounting bore 242 of a switch knob 237, and the bulged portions 266b and 266b of the metal plates 266 and 266 are engaged with the front open edge of the mounting bore 242 so that the switch knob 237 can be rotatably supported on the main body 193.

Figure 59:
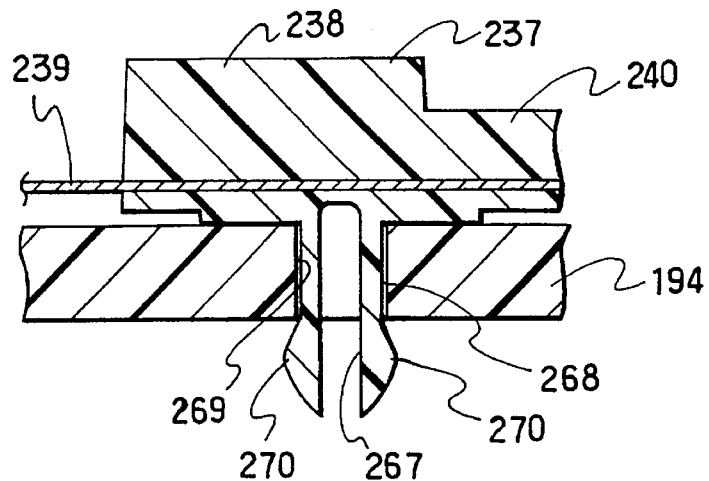
FIG. 59 is an enlarged sectional view, partly cut away, showing a further modification of the switch knob and the mounting of the knob.

In the modification shown in FIG. 59, a mounting pin 268 with a slit 267 extending from the rear surface of a switch knob 237 to the rear end is integrally formed in a mold portion 238. The mounting pin 268 is inserted into a mounting bore 269 formed in the main portion 195 of the main body 193, and the engagement projections 270 and 270 of the mounting pin 269 are engaged with the rear open edge of the mounting bore 269 of the main body 193 so that the switch knob 237 can be rotatably supported on the main body 193.

Figure 60:
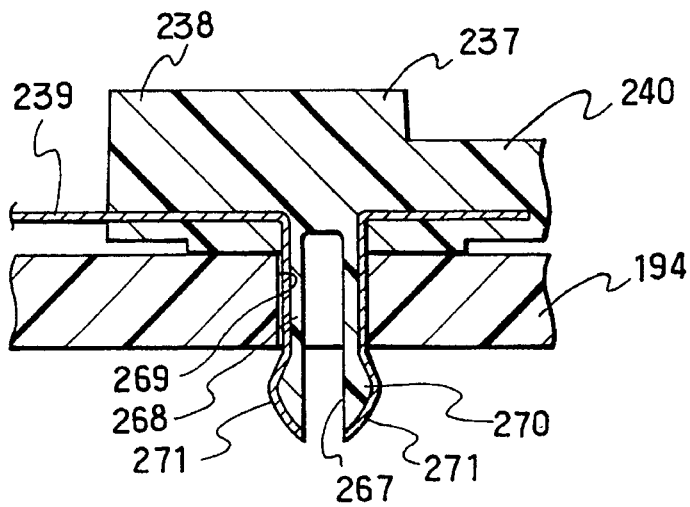
FIG. 60 is an enlarged sectional view, partly cut away, showing a further modification of the switch knob and the mounting of the knob.

In the modification shown in FIG. 60, the surface of the mounting pin 268 shown in FIG. 59 is covered with covering portions 271 and 271 projecting from the margin of the through bore 244 of the connecting piece portion 239.

Figure 61:
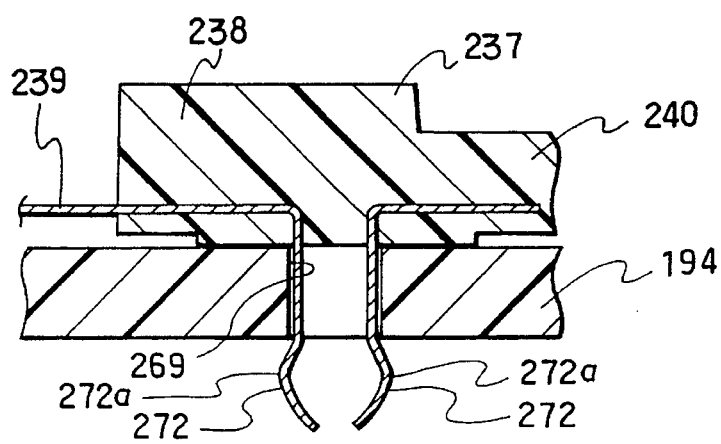
FIG. 61 is an enlarged sectional view, partly cut away, showing a further modification of the switch knob and the mounting of the knob.
Figure 62:
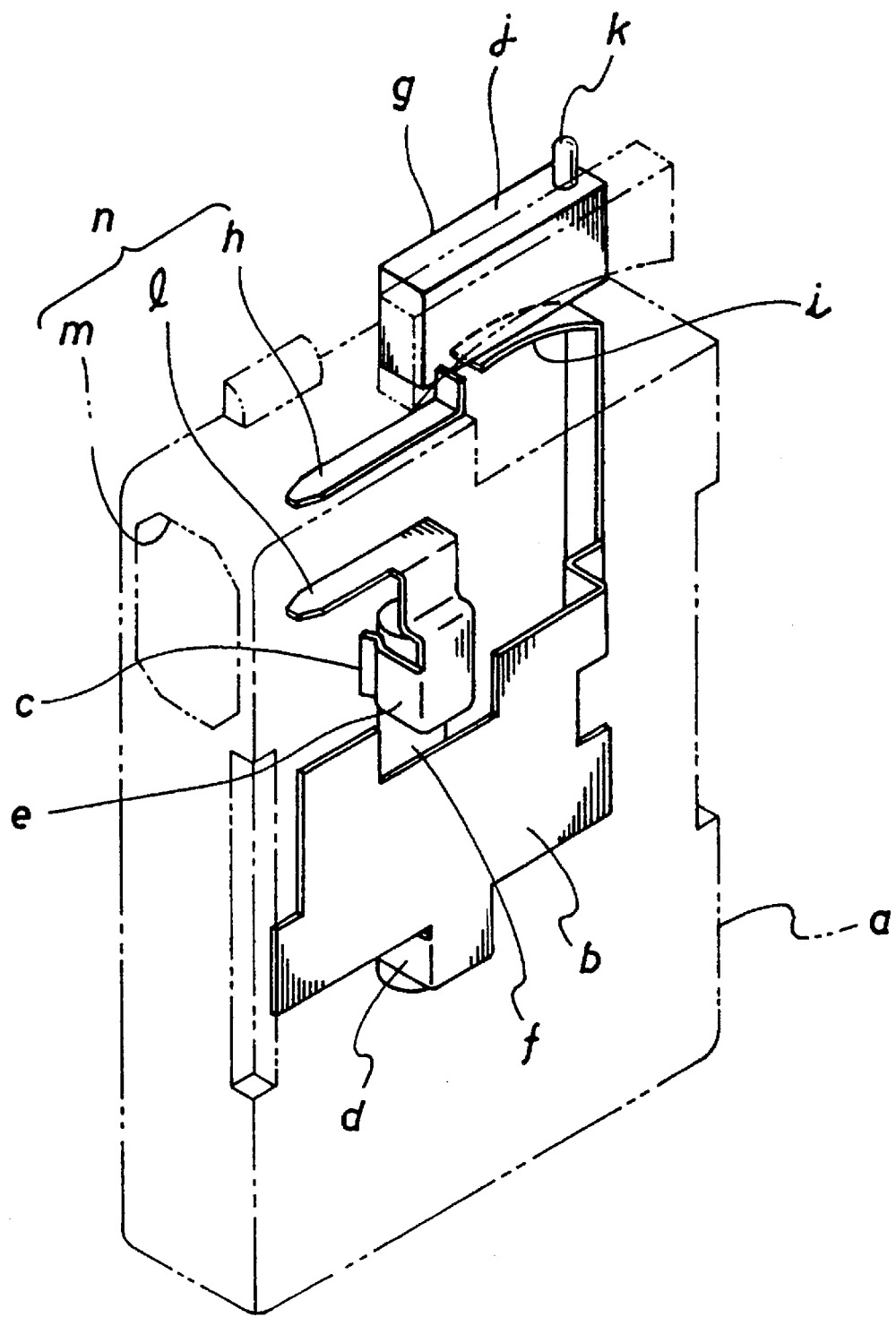
FIG. 62 is a perspective view showing an example of a conventional lamp body.
Figure 63:
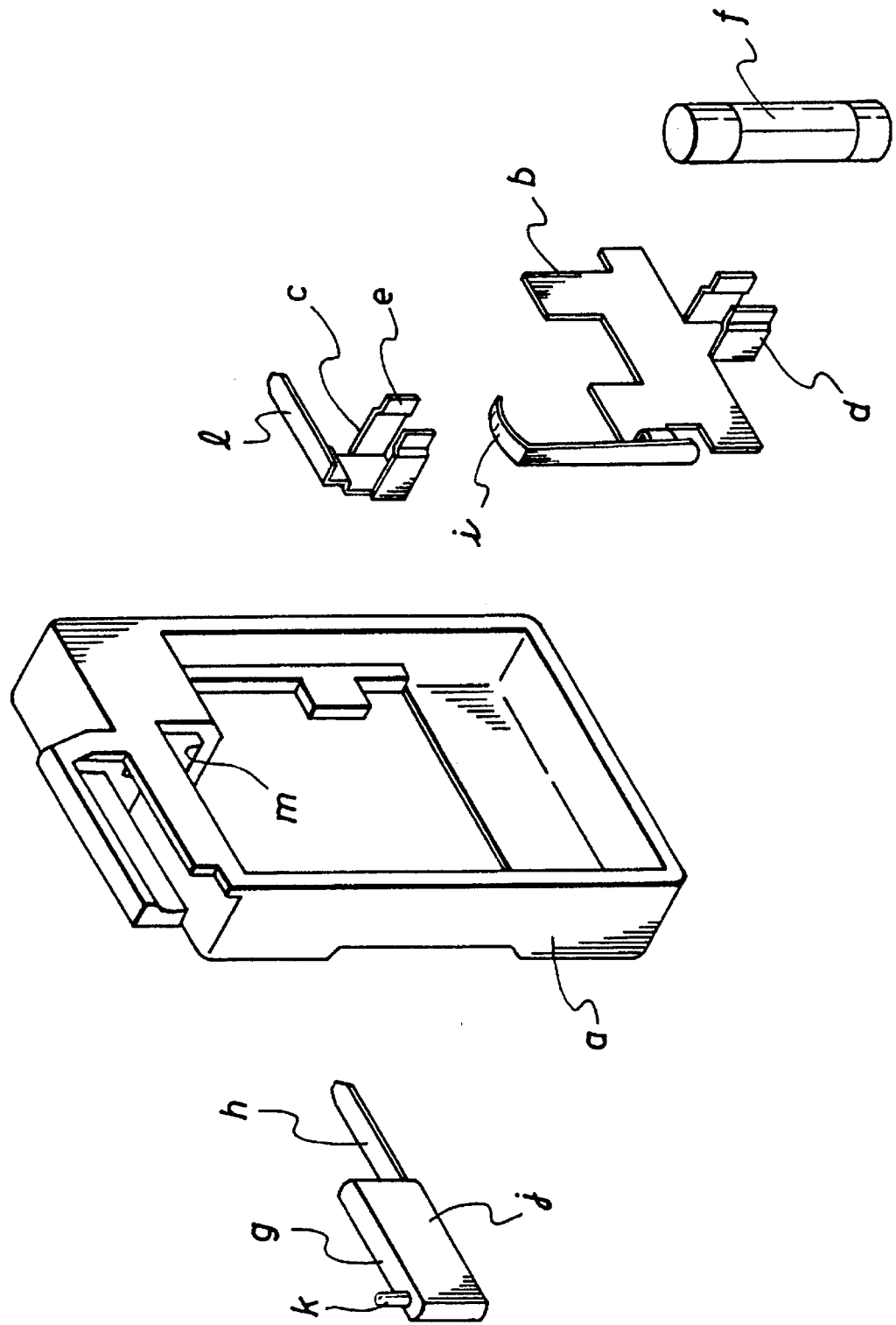
FIG. 63 is an exploded perspective view of the conventional lamp body.

In the modification shown in FIG. 61, mounting leg pieces 272 and 272 projecting from the rear surface of the mold portion 238 project from the margin of the through bore 244 of the connecting piece portion 239. The mounting leg pieces 272 and 272 are inserted into a mounting bore 269 formed in the main portion 195 of the main body 193, and the bulged portions 272a and 272a of the mounting leg pieces 272 and 272 are engaged with the rear open edge of the mounting bore 269 so that the switch knob 237 can be rotatably supported on the main body 193.

Therefore, the present examples and embodiments are to be considered as illustrative and not restrictive and the invention is not to be limited to the details giving herein, but may be modified within the scope of the appended claims.

What is claimed is:

1. A method of manufacturing a synthetic resin part integrally formed with metal members, comprising the steps of:

integrally forming a plurality of flat metal member sets which are coupled together through coupling portions, each of the flat metal member sets comprising a plurality of metal members coupled together;

bending said plurality of coupled together metal members to form a set of coupled together contacts;

inserting said metal member sets after bending into molding dies of a forming machine;

injecting a synthetic resin for molding into said molding die, and forming a synthetic resin part integrally formed with each of the metal member sets in sequence to form an integral synthetic resin part where a plurality of synthetic resin parts are connected by said coupling portions; and cutting off said coupling portions to manufacture said plurality of synthetic resin parts.

2. The method according to claim 1, wherein groove portions are formed in adjacent side surfaces of each of said synthetic resin parts, part of each of said coupling portions is positioned within a corresponding groove portion, and said part positioned within the groove portion is cut to cut off the synthetic resin part.

3. The method according to claim 1, wherein at least two of metal members which are to be in non-contact state are connected by a connection portion, and said connection portion of said at least two of metal members is also cut off when said coupling portions are cut off.

4. The method according to claim 2, wherein at least two of metal members which are to be in non-contact state are connected by a connection portion, and said connection portion of said at least two of metal members is also cut off when said coupling portions are cut off.

5. The method according to claim 1, wherein before said synthetic resin is injected into said molding dies, at least one kind of metal members is pressed against one of said molding dies through the other by a press pin.

6. The method according to claim 2, wherein before said synthetic resin is injected into said molding dies, at least one kind of metal members is pressed against one of said molding dies through the other by a press pin.

7. The method according to claim 3, wherein before said synthetic resin is injected into said molding dies, at least one kind of metal members is pressed against one of said molding dies through the other by a press pin.

8. The method according to claim 1, wherein said synthetic resin is ABS resin.

9. The method according to claim 1, wherein said metal members are formed of a metal material having conductivity and elasticity.

\* \* \* \* \*